(12) United States Patent
Ando et al.

(10) Patent No.: US 7,190,663 B2
(45) Date of Patent: Mar. 13, 2007

(54) OPTICAL RECORDING MEDIUM, INFORMATION REPRODUCTION APPARATUS, AND INFORMATION RECORDING/REPRODUCTION APPARATUS

(75) Inventors: Hideo Ando, Hino (JP); Kazuo Watabe, Yokohama (JP); Hiroharu Sato, Tokyo (JP); Toshihiro Sugaya, Kitasoma-gun (JP); Chosaku Noda, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 395 days.

(21) Appl. No.: 10/233,671

(22) Filed: Sep. 4, 2002

(65) Prior Publication Data
US 2003/0048722 A1    Mar. 13, 2003

(30) Foreign Application Priority Data
Sep. 7, 2001   (JP) .............................. 2001-271895

(51) Int. Cl.
GIIB 7/00 (2006.01)

(52) U.S. Cl. ................. 369/275.3; 369/44.13

(58) Field of Classification Search ............... 369/47.1, 369/47.22, 47.27, 275.3, 44.13, 47.28
See application file for complete search history.

(56) References Cited

U.S. PATENT DOCUMENTS

| | | | |
|---|---|---|---|
| 5,333,126 A | | 7/1994 | Fukuda et al. |
| 5,587,991 A | | 12/1996 | Nabeshima et al. |
| 5,850,382 A | * | 12/1998 | Koishi et al. ............ 369/275.3 |
| 6,208,603 B1 | * | 3/2001 | Ishida et al. ............. 369/59.25 |
| 6,292,625 B1 | | 9/2001 | Gotoh et al. |
| 6,327,240 B1 | * | 12/2001 | Tobita et al. ............ 369/53.19 |
| 6,434,091 B1 | * | 8/2002 | Kuribayashi ............. 369/44.13 |
| 6,452,897 B1 | * | 9/2002 | Van Den Enden ....... 369/275.1 |
| 6,587,417 B2 | * | 7/2003 | Okamoto et al. ......... 369/59.22 |
| 6,621,772 B2 | * | 9/2003 | Asano et al. ............ 369/44.26 |
| 6,628,584 B1 | * | 9/2003 | Heemskerk et al. ....... 369/47.1 |
| 6,631,114 B1 | * | 10/2003 | Kobayashi ............... 369/275.4 |

FOREIGN PATENT DOCUMENTS

CN       1175760 A      3/1998
EP    0 729 151 A2      8/1996

(Continued)

OTHER PUBLICATIONS

Chinese Office Action dated May 13, 2005 for Appln. No. 02151416X.

(Continued)

*Primary Examiner*—Nabil Hindi
(74) *Attorney, Agent, or Firm*—Pillsbury Winthrop Shaw Pittman, LLP

(57) ABSTRACT

User data recording areas and intermediate areas are alternately arranged on a disk. The intermediate area records at least information for synchronization.

13 Claims, 39 Drawing Sheets

FOREIGN PATENT DOCUMENTS

| | | |
|---|---|---|
| EP | 0 820 063 A2 | 1/1998 |
| JP | 6-176504 | 6/1994 |
| JP | 7-154385 | 6/1995 |
| JP | 8-251571 | 9/1996 |
| JP | 9-27127 | 1/1997 |
| JP | 2000-057581 A | 2/2000 |
| JP | 2000-112673 | 4/2000 |
| JP | 2000-276843 | 10/2000 |
| JP | 2000-311448 A | 11/2000 |
| JP | 2003-512693 | 5/2003 |

OTHER PUBLICATIONS

U.S. Appl. No. 09/835,822, filed Apr. 17, 2001, Ando et al.
U.S. Appl. No. 09/666,460, filed Sep. 21, 2000, Ando et al.
U.S. Appl. No. 10/170,226, filed Jun. 13, 2002, Ando et al.
U.S. Appl. No. 10/210,880, filed Aug. 2, 2002, Ando et al.
Korean Office Action dated Mar. 29, 2005 for Appln. No. 10-2002-0053995.
European Search Report dated Oct. 18, 2005 for Appln. No. 02019659.8-2233.

* cited by examiner

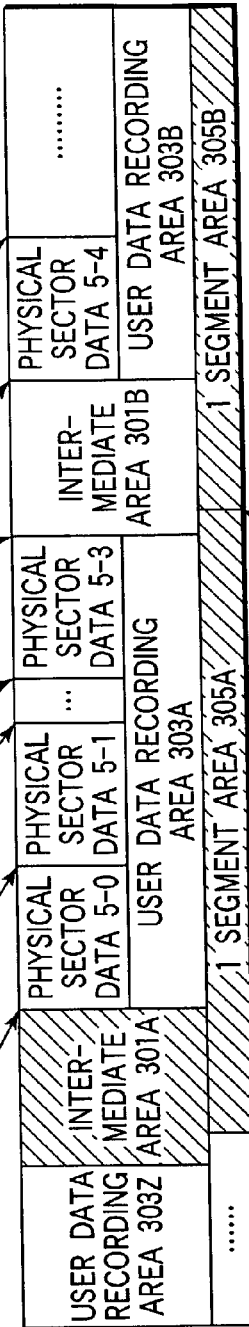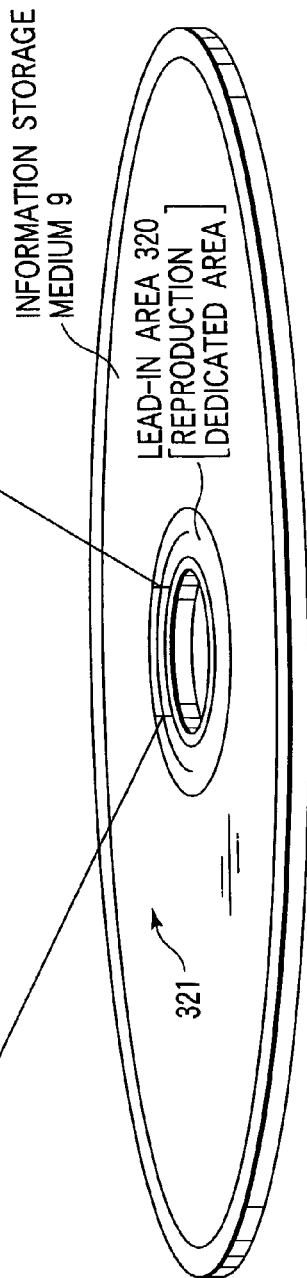

| SEGMENT (1 SEGMENT AREA 305) | | | | | |
|---|---|---|---|---|---|
| VFO AREA 312 | PS AREA 313 | DATA AREA (USER DATA RECORDING AREA 303) | | | PA AREA 311 |
| | | PHYSICAL SECTOR DATA 5-0 | PHYSICAL SECTOR DATA 5-1 | PHYSICAL SECTOR DATA 5-2 | PHYSICAL SECTOR DATA 5-3 |
| 1056 CHANNEL BITS | 36 CHANNEL BITS | 116064 CHANNEL BITS | | | 24 CHANNEL BITS |

F I G. 3

| SEGMENT (1 SEGMENT AREA 305=CONTINUOUS DATA RECORDING UNIT 110) | | | | | | |
|---|---|---|---|---|---|---|
| VFO AREA 312 | PS AREA 313 | DATA AREA (USER DATA RECORDING AREA 303) | | | | VFO AREA 312 (PATTERN IS DIFFERENT AT POSITION IN ECC BLOCK) |
| | | PHYSICAL SECTOR DATA 5-0 | PHYSICAL SECTOR DATA 5-1 | PHYSICAL SECTOR DATA 5-2 | PHYSICAL SECTOR DATA 5-3 | |
| | | | | | | PA AREA 311 |
| SIZE IS DIFFERENT IN THE EMBODIMENT | 36 CHANNEL BITS | 116064 CHANNEL BITS | | | | 24 CHANNEL BITS |
| | | | | | | SIZE IS DIFFERENT IN THE EMBODIMENT |

F I G. 6

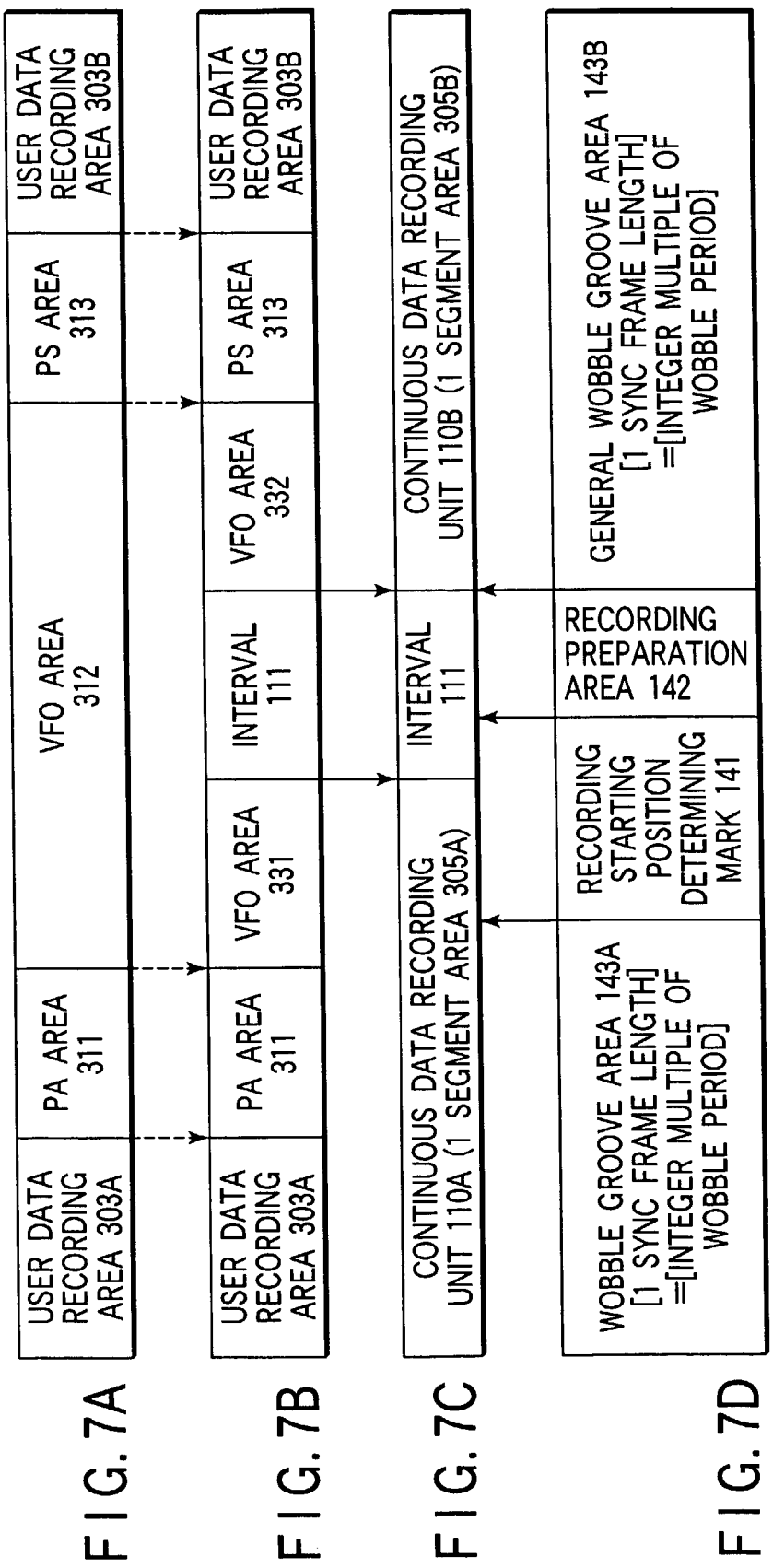

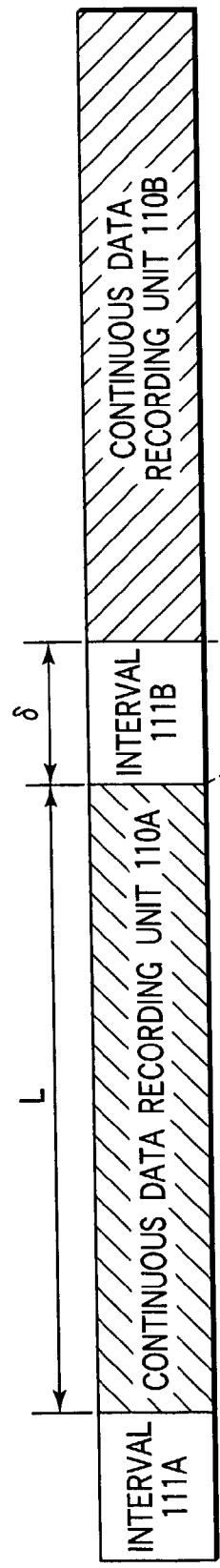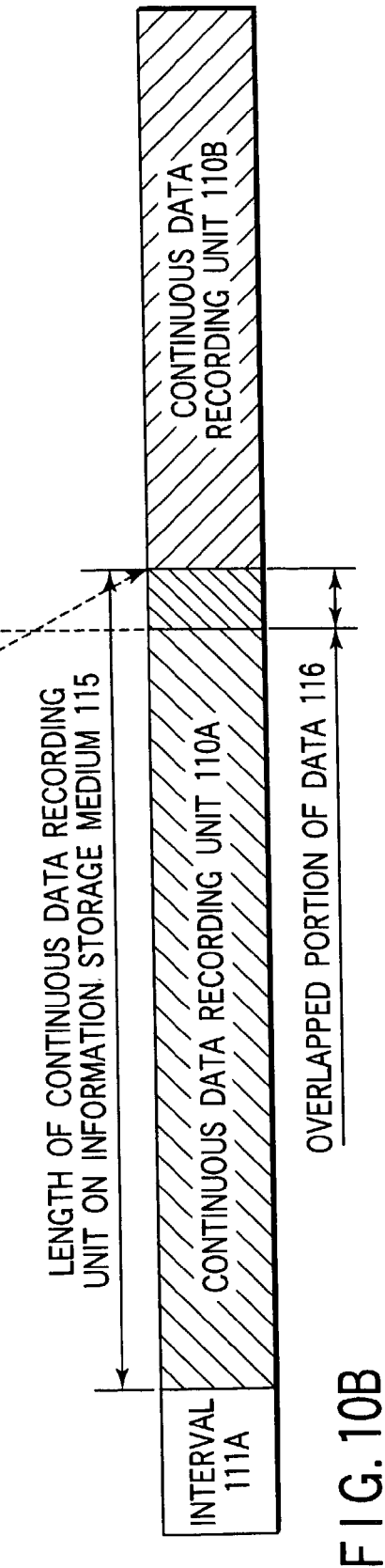
F I G. 10A
F I G. 10B

《 DATA STRUCTURE OF REPRODUCTION DEDICATED INFORMATION STORAGE MEDIUM OR 》
《 REPRODUCTION DEDICATED AREA OF INFORMATION STORAGE MEDIUM FOR COMPARISON 》

FIG. 11A | USER DATA RECORDING AREA 303A | PA AREA 311 | VFO AREA 312 | PS AREA 313 | USER DATA RECORDING AREA 303B |

FIG. 11B | USER DATA RECORDING AREA 303A | PA AREA 311 | INTERVAL 111 | VFO AREA 333 | PS AREA 313 | USER DATA RECORDING AREA 303B |

FIG. 11C | CONTINUOUS DATA RECORDING UNIT 110A (1 SEGMENT AREA 305A) | INTERVAL 111 | CONTINUOUS DATA RECORDING UNIT 110B (1 SEGMENT AREA 305B) |

FIG. 11D | WOBBLE GROOVE AREA 143A | RECORDING STARTING POSITION DETERMINING MARK 141 | RECORDING PREPARATION AREA 142 | GENERAL WOBBLE GROOVE AREA 143B [1 SYNC FRAME LENGTH] =[INTEGER MULTIPLE OF WOBBLE PERIOD] |

[1 SYNC FRAME LENGTH]=[INTEGER MULTIPLE OF WOBBLE PERIOD]

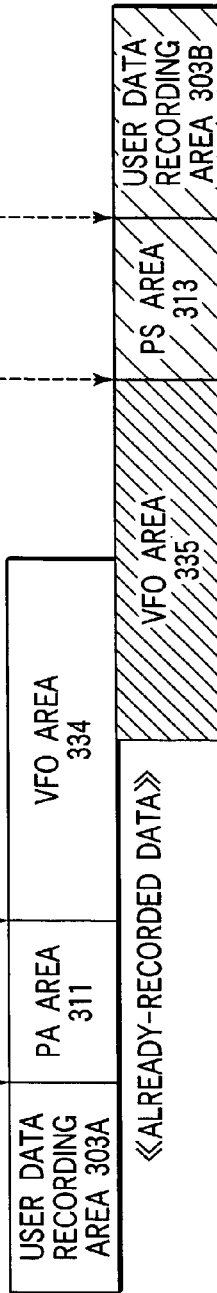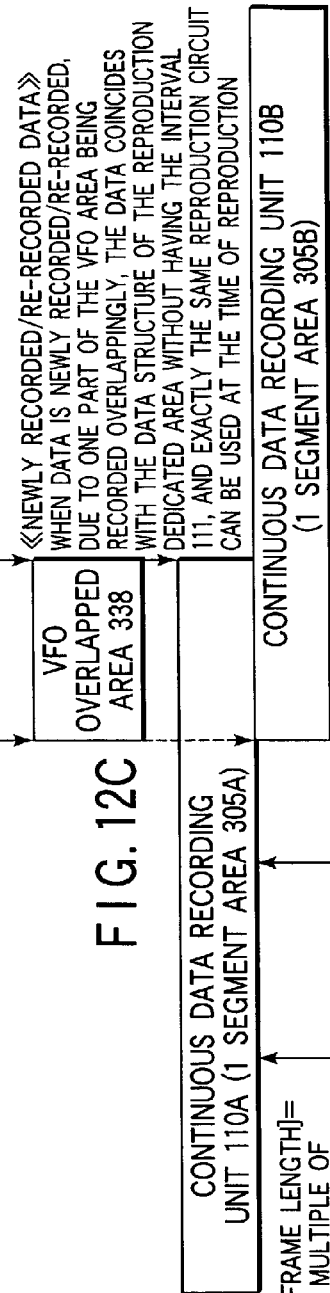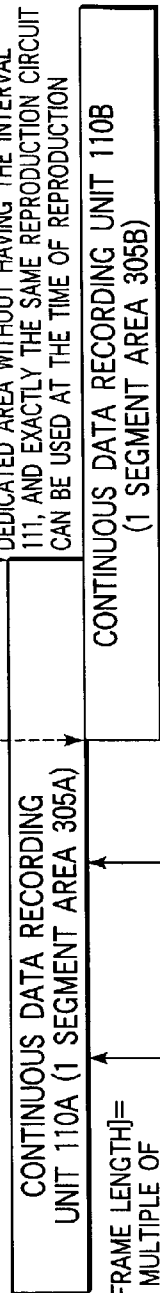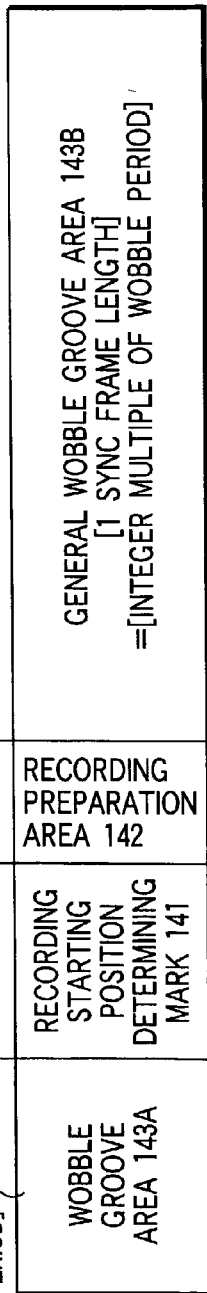

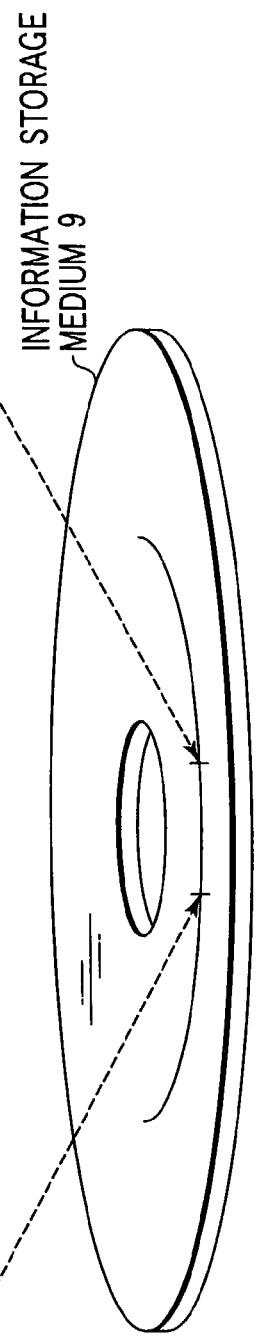

| | | | | | |
|---|---|---|---|---|---|
| VIDEO PACK 101C | LOGICAL SECTOR INFORMATION 103-31 | PO INFORMATION PO 0-0-1 | | PO 0-0 | DATA 2-0-0 |
| | | PO INFORMATION PO 0-0-0 | | | PO 1-1 |
| | | PI INFORMATION PI 0-0-11 | PI 0-0-11 | | ... |
| | | LOGICAL SECTOR INFORMATION AFTER SCRAMBLING 104-0-0-11-1 | DATA 0-0-11 | | DATA 1-1-1 |
| VIDEO PACK 101B | LOGICAL SECTOR INFORMATION 103-30 | ⋮ | ⋮ | | PI 1-1-0 |
| | | PI INFORMATION PI 0-0-1 | PI 0-0-1 | | DATA 1-1-0 |
| VIDEO PACK 102A | LOGICAL SECTOR INFORMATION 103-1 | LOGICAL SECTOR INFORMATION AFTER SCRAMBLING 104-0-0-1-1 | DATA 0-0-1 | | PO 0-0 |
| | | LOGICAL SECTOR INFORMATION AFTER SCRAMBLING 104-0-0-1-0 | | | PI 0-0-11 |
| | | PI INFORMATION PI 0-0-0 | PI 0-0-0 | | DATA 0-0-11 |
| VIDEO PACK 101A | LOGICAL SECTOR INFORMATION 103-0 | LOGICAL SECTOR INFORMATION AFTER SCRAMBLING 104-0-0-0-1 | DATA 0-0-0 | | ... |
| | | LOGICAL SECTOR INFORMATION AFTER SCRAMBLING 104-0-0-0-0 | | | DATA 0-0-1 |
| | | CPR_MAI OR RESERVE AREA 8-0 | | | PI 0-0-1 |
| | | IED 2-0 | | | DATA 0-0-0 |
| | | DATA ID 1-0 | | | PI 0-0-0 |

F I G. 14A  F I G. 14B  F I G. 14C  F I G. 14D  F I G. 14E

F I G. 15A

F I G. 15B

F I G. 15C

F I G. 15D

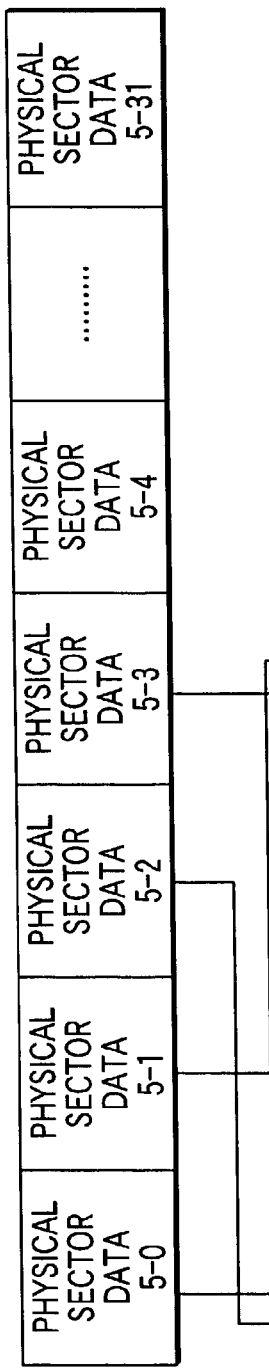
FIG. 16A
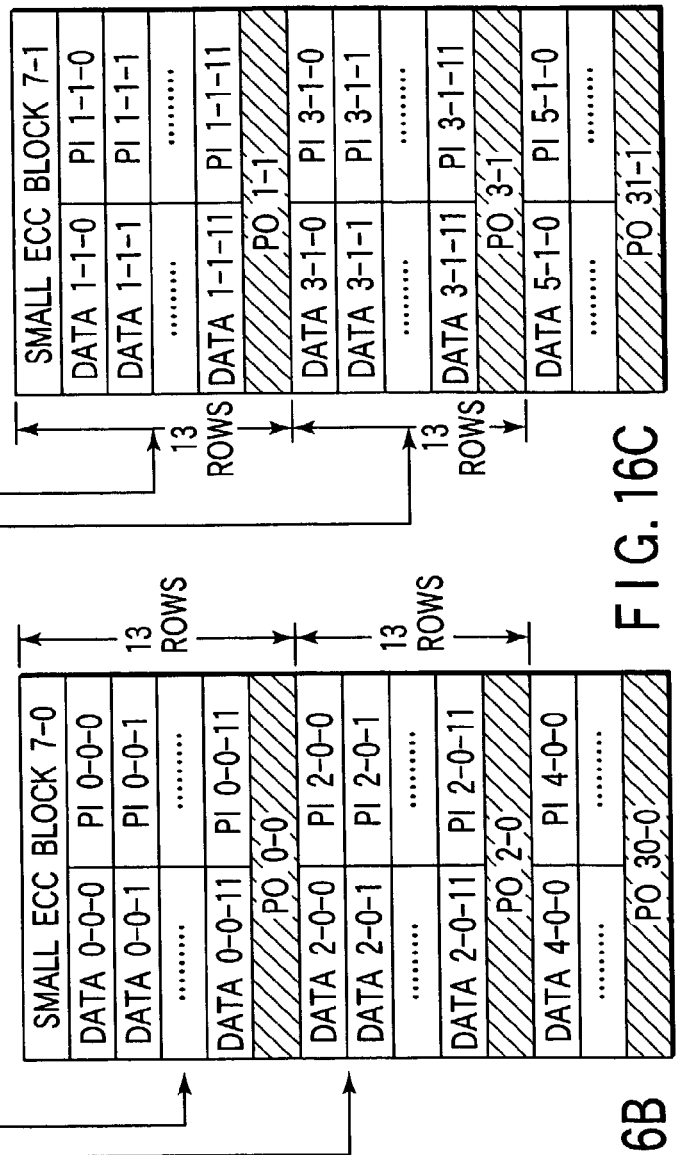
FIG. 16B
FIG. 16C

| FIG. 17A | FIG. 17B | FIG. 17C | FIG. 17D |
|---|---|---|---|
| ... VIDEO PACK 101C | ... LOGICAL SECTOR INFORMATION 103-31 | PO INFORMATION PO 0-0-1 | SYNC FRAME DATA 105-25 |
| | | PO INFORMATION PO 0-0-0 | SYNC FRAME DATA 105-24 |
| | | PI INFORMATION PI 0-0-11 | SYNC FRAME DATA 105-23 |
| ... VIDEO PACK 101B | ... LOGICAL SECTOR INFORMATION 103-30 | LOGICAL SECTOR INFORMATION AFTER SCRAMBLING 104-0-0-11-1 | |
| | | ... | ... |
| | | PI INFORMATION PI 0-0-1 | SYNC FRAME DATA 105-3 |
| ... VIDEO PACK 102A | ... LOGICAL SECTOR INFORMATION 103-1 | LOGICAL SECTOR INFORMATION AFTER SCRAMBLING 104-0-0-1-1 | |
| | | LOGICAL SECTOR INFORMATION AFTER SCRAMBLING 104-0-0-1-0 | SYNC FRAME DATA 105-2 |
| | | PI INFORMATION PI 0-0-0 | SYNC FRAME DATA 105-1 |
| VIDEO PACK 101A | LOGICAL SECTOR INFORMATION 103-0 | LOGICAL SECTOR INFORMATION AFTER SCRAMBLING 104-0-0-0-1 | |
| | | LOGICAL SECTOR INFORMATION AFTER SCRAMBLING 104-0-0-0-0 | SYNC FRAME DATA 105-0 |
| | | CPR_MAI OR RESERVE AREA 8-0 | |
| | | IED 2-0 | |
| | | DATA ID 1-0 | |

FIG. 19A

| SYNC FRAME DATA AFTER MODULATION 106-25 |
| SYNCHRONOUS CODE 110-25 |
| SYNC FRAME DATA AFTER MODULATION 106-24 |
| SYNCHRONOUS CODE 110-24 |
| SYNC FRAME DATA AFTER MODULATION 106-23 |
| SYNCHRONOUS CODE 110-23 |
| ⋮ |
| SYNC FRAME DATA AFTER MODULATION 106-3 |
| SYNCHRONOUS CODE 110-3 |
| SYNC FRAME DATA AFTER MODULATION 106-2 |
| SYNCHRONOUS CODE 110-2 |
| SYNC FRAME DATA AFTER MODULATION 106-1 |
| SYNCHRONOUS CODE 110-1 |
| SYNC FRAME DATA AFTER MODULATION 106-0 |
| SYNCHRONOUS CODE 110-0 |

FIG. 19B

SYNC FRAME (FIXED LENGTH) 308
SYNC FRAME (FIXED LENGTH) 308
SYNC FRAME (FIXED LENGTH) 308

FIG. 19C

| VARIABLE CODE AREA 112 | VARIABLE CODE AREA 113 | FIXED CODE AREA 111 |

FIG. 19D

| CONVERSION TABLE SELECTING CODE AT THE TIME OF MODULATION 122 | FOR IDENTIFYING SYNC FRAME POSITION 123 | POLARITY REVERSING PATTERN FOR SUPPRESSING DC 124 | SYNCHRONIZING POSITION DETECTING CODE 121 |

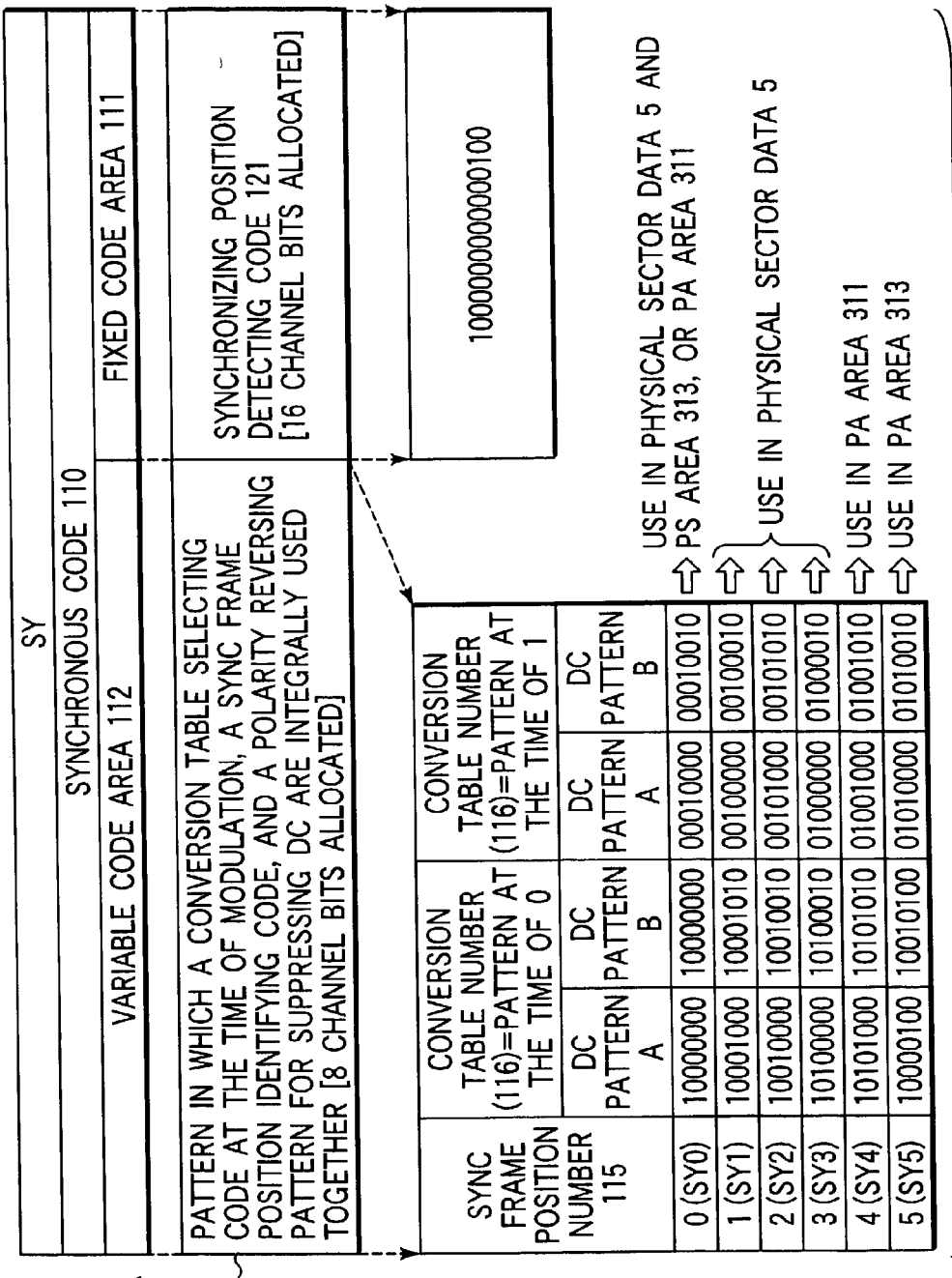

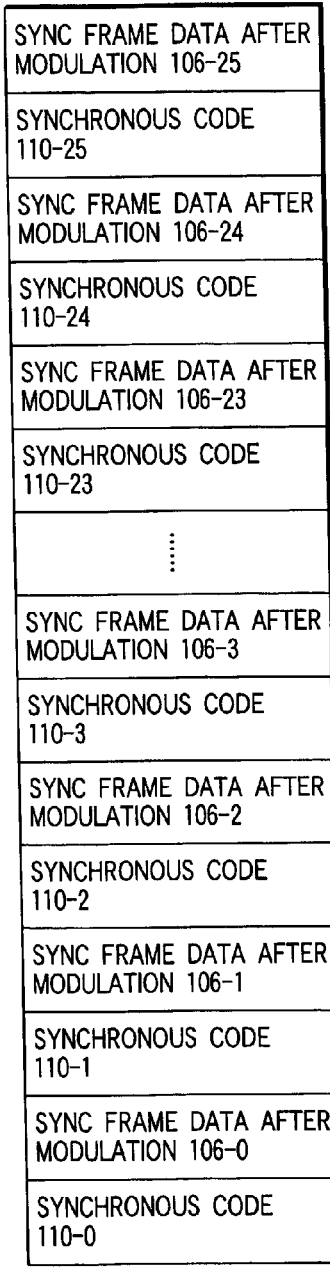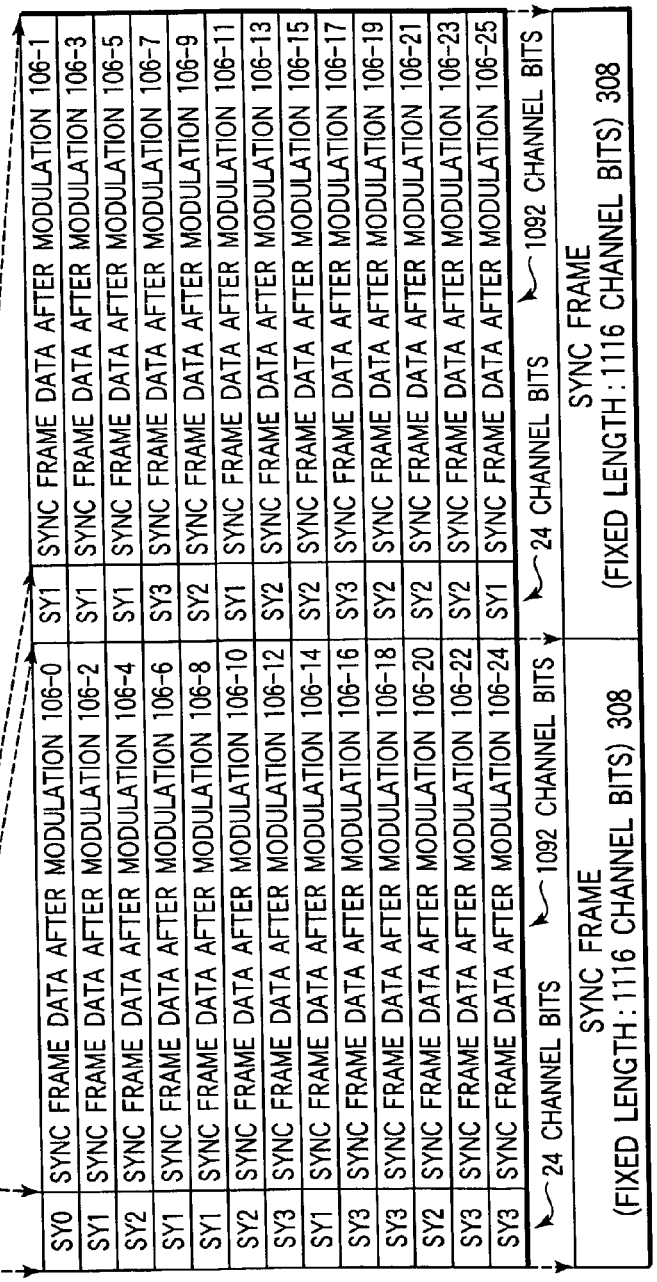
F I G. 21A  F I G. 21B  F I G. 21C

OPTICAL RECORDING MEDIUM, INFORMATION REPRODUCTION APPARATUS, AND INFORMATION RECORDING/REPRODUCTION APPARATUS

CROSS-REFERENCE TO RELATED APPLICATIONS

This application is based upon and claims the benefit of priority from the prior Japanese Patent Application No. 2001-271895, filed Sep. 7, 2001, the entire contents of which are incorporated herein by reference.

BACKGROUND OF THE INVENTION

1. Field of the Invention

The present invention relates to an optical recording medium, an information reproduction apparatus, and an information recording and reproduction apparatus.

2. Description of the Related Art

In recent years, in the field of optical disks whose recording density is high, various types of formats are proposed. Read only information storage media (DVD-ROM), recordable information storage media (DVD-R), and re-recordable information storage media (DVD-RW or DVD-RAM) have been developed as optical disks.

In the field of optical disks in which various types of formats are present as described above, there are inconveniences for both the users and the manufacturers in the purchasing and manufacturing of reproduction apparatus, recording apparatus, and the like.

BRIEF SUMMARY OF THE INVENTION

The present invention is directed to an apparatus that substantially obviates one or more of the problems due to limitations and disadvantages of the related art.

According to an embodiment of the present invention, there is provided a read only storage medium comprising user data recording areas and intermediate areas which are alternately arranged, the intermediate areas recording at least information for synchronization.

According to another embodiment of the present invention, there is provided an information storage medium comprising sectors each of which is a first unit of information for recording; segments each of which is formed of at least one the sectors and is a second unit of information for recording, the segments recording information for synchronization; and an error correction block which is formed of at least one of the segments, has the same division point as a block division point of error correction, and is a third unit of information for recording.

Additional objects and advantages of the present invention will be set forth in the description which follows, and in part will be obvious from the description, or may be learned by practice of the present invention.

The objects and advantages of the present invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the present invention and, together with the general description given above and the detailed description of the embodiments given below, serve to explain the principles of the present invention in which:

FIGS. 1A, 1B, 1C, and 1D are an explanatory diagram for explanation of a data arranging method within a read only information storage medium or a read only area of an information storage medium, according to an embodiment of the present invention;

FIG. 3 is an explanatory diagram for explanation of one segment area (a continuous data recording unit) within the read only information storage medium or the read only area of the information storage medium;

FIG. 6 is an explanatory diagram showing one segment area (a continuous data recording unit) within a recording area (recordable area or re-recordable area) of a recordable information storage medium according to the embodiment of the present invention;

FIGS. 7A, 7B, 7C, and 7D are an explanatory diagram showing an example of a user data recording method within the recording area (recordable area or re-recordable area) of the recordable information storage medium according to the embodiment of the present invention;

FIGS. 10A and 10B are an explanatory diagram relating to the necessity of interval areas shown in FIG. 8 according to the embodiment of the present invention;

FIGS. 1A, 1B, 1C, and 1D are an explanatory diagram showing a second example of a user data recording method within the recording area (recordable area or re-recordable area) of the recordable information storage medium according to the embodiment of the present invention;

FIGS. 12A, 12B, 12C, 12D, and 12E are an explanatory diagram showing a third example of a user data recording method within the recording area (recordable area or re-recordable area) of the recordable information storage medium according to the embodiment of the present invention;

FIGS. 13A, 13B, 13C, 13D, and 13E are a diagram for explanation of the relationship between a physical sector and a logical sector applied to the data structure of the read only area, the recordable area, and the re-recordable area of the information storage medium according to the embodiment of the present invention;

FIGS. 14A, 14B, 14C, 14D, and 14E are a diagram for explanation of the relationship between the physical sector and the logical sector applied to the data structure of the read only area, the recordable area, and the re-recordable area of the information storage medium according to the embodiment of the present invention, and information after scrambling;

FIGS. 15A, 15B, 15C, and 15D are a diagram for explanation of an ECC block applied to the data structure of the read only area, the recordable area, and the re-recordable area of the information storage medium according to the embodiment of the present invention;

FIGS. 16A, 16B, and 16C are a diagram for explanation of the relationship between the ECC block and the physical sector applied to the data structure of the read only area, the recordable area, and the re-recordable area of the information storage medium according to the embodiment of the present invention;

FIGS. 17A, 17B, 17C, and 17D are a diagram for explanation of an arrangement of synchronous frame data applied to the data structure of the read only area, the recordable area, and the re-recordable area of the information storage medium according to the embodiment of the present invention;

FIGS. 19A, 19B, 19C, and 19D are an explanatory diagram showing an example of the structure of the synchronous code according to the embodiment of the present invention;

FIGS. 20A, 20B, and 20C are an explanatory diagram showing a detailed example of the structure of the synchronous code according to the embodiment of the present invention;

FIGS. 21A, 21B, and 21C are an explanatory diagram showing an example of an arrangement pattern of the synchronous frame data and the synchronous code according to the embodiment of the present invention;

DETAILED DESCRIPTION OF THE INVENTION

Figures 2A, 2B, 2C, 2D:
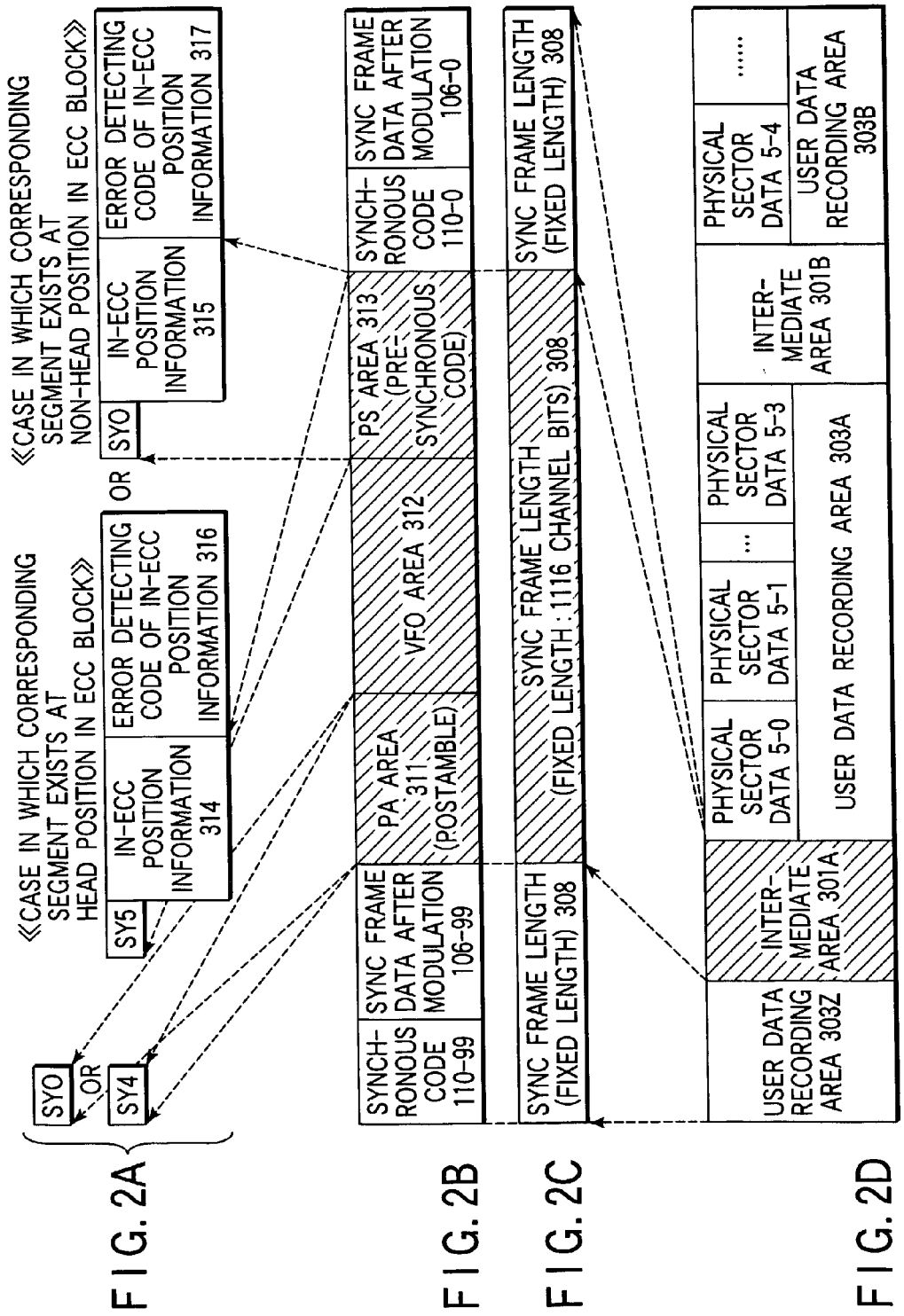
FIGS. 2A, 2B, 2C, and 2D are an explanatory diagram for explanation of the data arranging method within the read only information storage medium or the read only area of the information storage medium, relating to FIG. 1.

An embodiment of an information recording/reproduction apparatus according to the present invention will now be described with reference to the accompanying drawings.

Firstly, in order to easily understand the embodiment of the present invention, the data structure and the reproduction mechanism or the recording mechanism in current optical disks will be described.

DVD (Digital Versatile Disk) specifications have been described in specifications book issued by a DVD forum. Here, all of a method of scrambling main data, a data structure in a sector, a method of structuring an ECC (Error Correction Code) block, and a pattern of a sync code (Synchronous Code: a synchronization code at the time of reproduction) and a method of inserting the sync code common to a read only information storage medium (DVD-ROM), a recordable information storage medium (DVD-R), and a re-recordable information storage medium (DVD-RW or DVD-RAM), and compatibility of the formats at the time of reproduction is ensured.

In the embodiment of the present invention, as described above, an information storage medium in which a recording format (a data structure of information to be recorded on an information storage medium) is made common to the read only information storage medium (DVD-ROM), the recordable information storage medium (DVD-R), and the re-recordable information storage medium (DVD-RW or DVD-RAM), and compatibility of the formats at the time of reproduction is ensured, is defined as a multi-purpose information storage medium (Digital Versatile Disk) (which means being able to be adapted to the respective aims which are a read only aim, a recording aim, and a re-recording aim).

[Points of Interest for Various Types of Disks]

Here, the various types of optical disks will be described, and the problems thereof as well will be described.

(A) DVD-R exists as recordable information storage media.

In a DVD-R, data is recorded in the same format as a DVD-ROM which is a read only information storage medium. A Next Border Marker is recorded as the original data before scrambling/modulation at the ending position of a series of recording, and a "border-out" area in which repeated data of "00" is recorded for a long range is recorded after recording.

Thereafter, when new information is recorded, after a "border-in" area is recorded after the "borderout" area, user information (in the same format as a DVD-ROM) is recorded, and a "border-out" area is recorded again after ending of recording of the user information.

When such a method is adopted, if recording of the user information is frequently carried out on one information storage medium, recording areas of Borderout/Borderin, which are unnecessary from the standpoint of the user information, increases and a problem arises in that the amount of user information which can be recorded on one information storage medium decreases (a deterioration of recording efficiency occurs).

As reasons necessary for recording the Borderin/Borderout for each recording in this way, there are reasons (A1) and (A2) as follows.

Reason (A1): for ensuring tracking stability at the time of accessing

After standardizing and manufacturing of DVD-ROM, standardizing and manufacturing of DVD-R were carried out. It is necessary that information recorded on a DVD-R disk (recordable-type information storage medium) can be reproduced by a read only information reproduction apparatus for the previously-manufactured DVD-ROM disks. Currently, a DPD (Differential Phase Detection) method is used for most track offset detecting methods carried out at the time of reproducing a DVD-ROM disk.

A pregroove is continuously formed on the DVD-R disk in an unrecorded state, and a Push-Pull method is used as a track offset detecting method at unrecorded places. At the recorded area of the DVD-R disk, track offset detection is possible by the DPD method from the above-described reason.

Accordingly, the track offset detecting methods are different on the recorded areas and the unrecorded areas in the DVD-R disk. In such a situation, for example, when reproduction of data of a recorded area is attempted from immediately after carrying out rough accessing in which the reproduction position is moved by moving the entire optical head, the optical head moves to the unrecorded area by mistake at the stage of rough accessing. A problem arises in that, if tracking is attempted, tracking cannot be carried out because track offset detection by DPD is impossible. Thus, due to the Borderin/Borderout being recorded, tracking is stabilized.

Reason (A2): for solving the problem of synchronization offset between the data of the recorded area and the recorded data A problem when other data is recorded in accordance with the format of the DVD-ROM from immediately after a recorded area on the DVD-R disk will be described. In this case, the frequency and the phase of a reference clock for use in preparing a recording pulse in the information recording reproduction apparatus cannot completely coincide with the frequency and the phase of a (past) reference clock at the time of recording data in the recorded area which exists immediately therebefore. Therefore, synchronization offset between the data of the recorded area before recording and the data after recording arises. Accordingly, when it is recorded in this way, a phase shift arises between the data before and after a boundary which is the recording head position, and bit shift errors easily occur. Therefore, when data is newly recorded, the "border-out" area is arranged after the recorded area before recording, and at the recording position, due to the "border-in" area being arranged before recording user data, the physical distance between the user data before and after the boundary which is the recording head position increases. By carrying out synchronizing of the information reproduction apparatus again in the "border-in" area, the accuracy of the synchronizing at the user data positions before and after the boundary which is the recording head position is ensured.

(B) DVD-RW exists as re-recordable information storage medium.

There is a recording method called "restricted overwrite" as an information re-recording method at DVD-RW. This method is a recording method in which the next data can be recorded or re-recorded from after the previously recorded data without recording the above-described "border-in/border-out" area.

However, because the recording method by "restricted overwrite" destroys one part of the previously recorded data and carries out re-recording of new data, the reliability of the recorded data markedly deteriorates. When the recording method by "restricted overwrite" is used in this way, the reason (problem) for destruction of one part of the recorded data is as follows.

Reason (B1): In a DVD-ROM, there is no synchronizing preparation area which is necessary for reproducing recorded or re-recorded information.

Namely, in current DVD-ROM, since reproduction of AV (Audio & Video) information or installing of a program is the main object, the demands for high speed access and the demands for shortening the time until the reproduction starting time are not that strong. Accordingly, as the data structure of the data recorded in a current DVD-ROM, a data structure, in which there is no recorded area of a VFO (Variable Frequency Oscillator) used as information for specific synchronizing and the user data is continuously recorded, is adopted.

When an information reproduction apparatus reproduces information from a DVD-ROM disk, the optical head accesses an appropriate position, and synchronizing is carried out by using a reproduction signal from the user data already recorded. Accordingly, since the synchronizing is not completed for the reproduction data immediately after accessing in this method, decoding for the user data cannot be carried out. After completing accessing, after a while, the reproduction/decoding of the user data becomes possible from the point where the synchronizing is completed. If recording or re-recording of the data in a unit of sector is attempted in a state corresponding to the data structure of the DVD-ROM, as described in aforementioned reason (A2), synchronization offset occurs between the data of the recorded sector and the sector data recorded or re-recorded immediately thereafter that, and it is impossible to continuously and steadily reproduction before and after that.

As a provisional, proposed solution for the above-described problem, a method as follows is adopted. Namely, in the "restricted overwrite" mode in the DVD-RW, a VFO for synchronizing at the DVD-ROM does not exist. Instead, as the synchronizing preparation area (running period), one part of the recorded sector data immediately before the recording head position is crushed. The synchronizing preparation area is detected, and the recording head position is determined, and it is possible to accurately reproduce from the recording head position.

The "restricted overwrite" method is a method in which an advance synchronizing is completed such that it is possible to reproduce/decode data from the recording head position of the part at which newly recording or re-recording is carried out.

However, in this method, the recorded data immediately before newly starting recording or re-recording is destroyed (in order to prepare the preparation area for synchronizing), and the reliability of the reproduction operation at the broken part is greatly lacking.

(C) DVD-ROM exist as read only information storage media.

(C1) In a DVD-ROM, data is recorded in a unit of sector, and when a desired point is accessed, information of identification data (which corresponds to data ID 1 of the present embodiment) recorded at the head position of each sector is reproduced. Thus, it becomes a mechanism by which the position (address) information of each sector can be identified. However, because 16 sectors together structure one ECC block (Error Correction Code) in a current DVD-ROM, there is need to reproduce the information successively from the sector positioned at the head of the ECC block. Currently, there is no method which directly find the head position of the ECC block, and there is no way except carrying out reproduction successively for each sector while successively decoding the identification data of the sectors, and it takes much time to access to the head position of the ECC block.

Thus, an object of an embodiment of the present invention is to enable recording of data in a unit of segment without destroying recorded user data in a next-generation DVD-R, while ensuring the compatibility of next-generation DVD-ROM and the next-generation DVD-R.

Namely, if the above-description are expressed in more detailed words, the object is to provide a read only information storage medium ensuring the compatibility with information storage media which can record or re-record information in a unit of segment. Further, even if recording or re-recording in a unit of segment is carried out in the above-described recordable or re-recordable information storage medium, high reliability for the recorded data can be ensured without destroying the data in recorded areas.

The embodiment of the present invention provides a data structure of the information storage medium (recording format), or a method of recording information onto the information storage medium, a method of reproducing information from the information storage medium, an information recording and reproduction apparatus, and an information reproduction apparatus.

Further, an object of an embodiment of the present invention is to provide a data structure of a information storage medium (recording format), a method of recording information onto the information storage medium and a method of reproducing information from the information storage medium suitable for the data structure, or an information recording and reproduction apparatus and information reproduction apparatus, in which it is possible to make accessing of the head position of the ECC block high speed even for next-generation DVD-ROM.

[Description of Outline Shown in the Respective Drawings]

Contents shown in the respective drawings will be described.

FIGS. 1A to 1D, and 2A to 2D explain the basic way of thinking of the embodiment of the present invention. FIG. 3 explains one segment area (one recording unit of continuous data) in the read only information storage medium or the read only area of the information storage medium according to the embodiment of the present invention.

Figure 4:
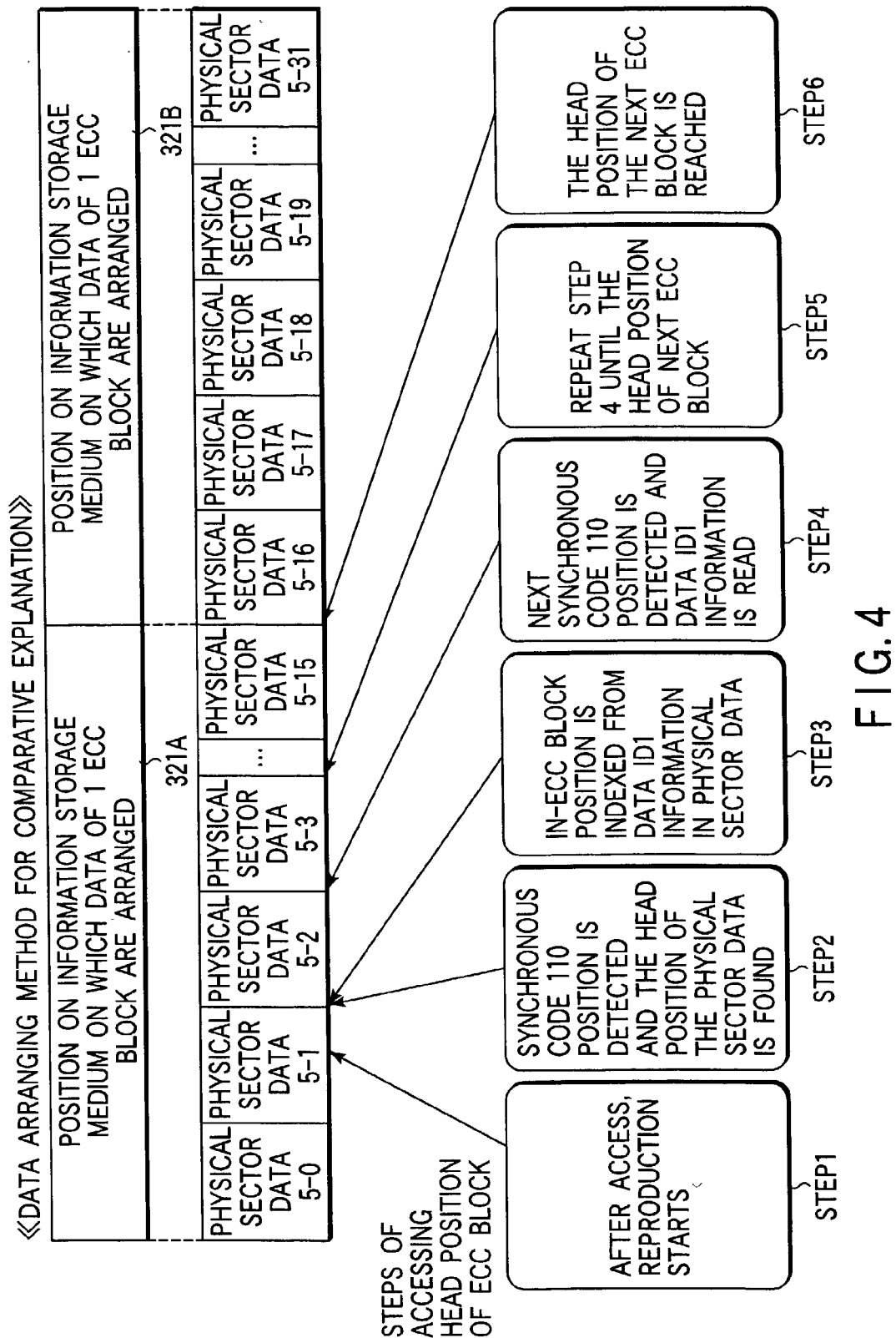
FIG. 4 is an explanatory diagram, for comparison, which explains effects of the data arranging method on the information storage medium according to the embodiment of the present invention.
Figure 5:
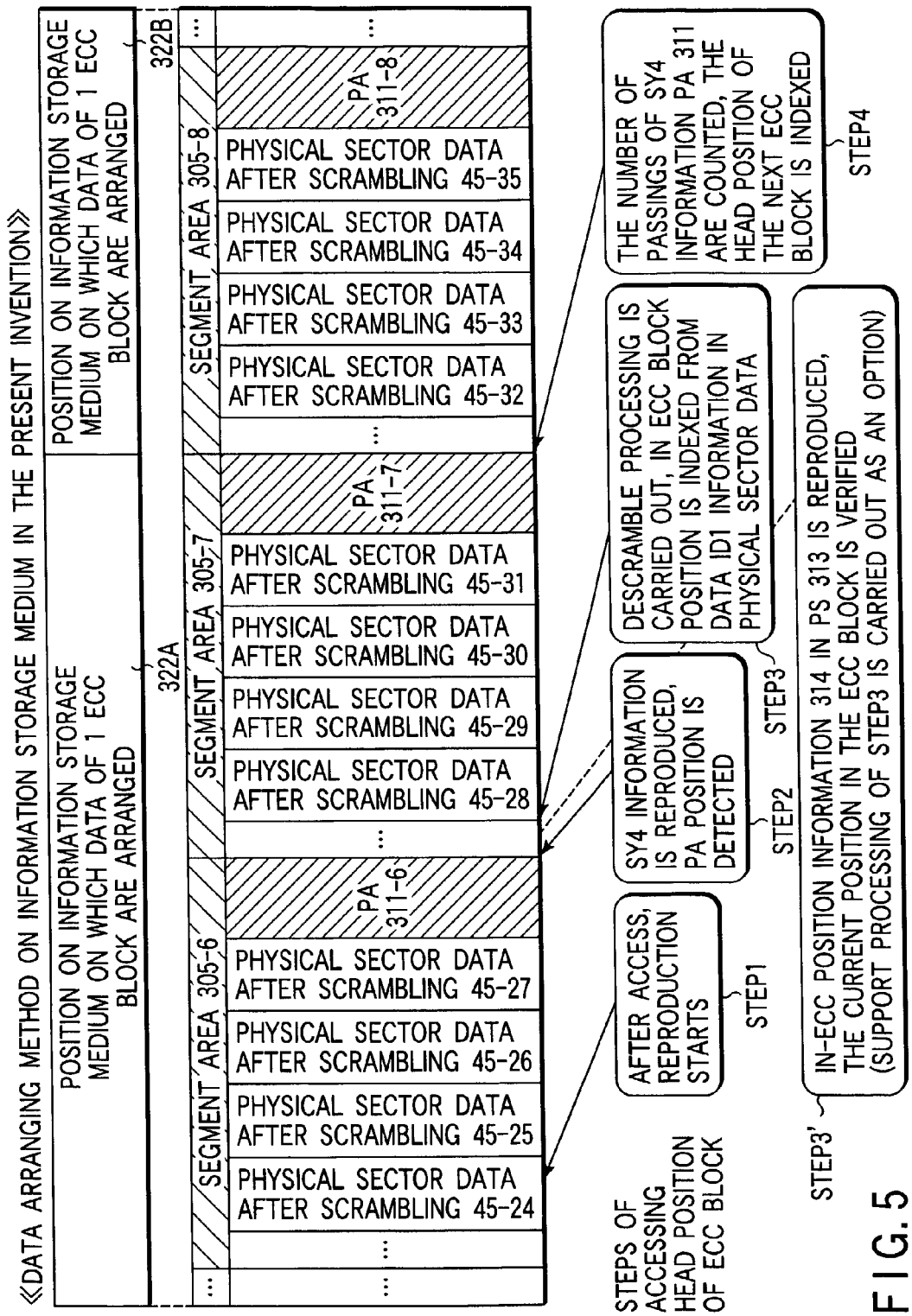
FIG. 5 is an explanatory diagram explaining effects of the data arranging method on the information storage medium according to the embodiment of the present invention.
Figure 8:
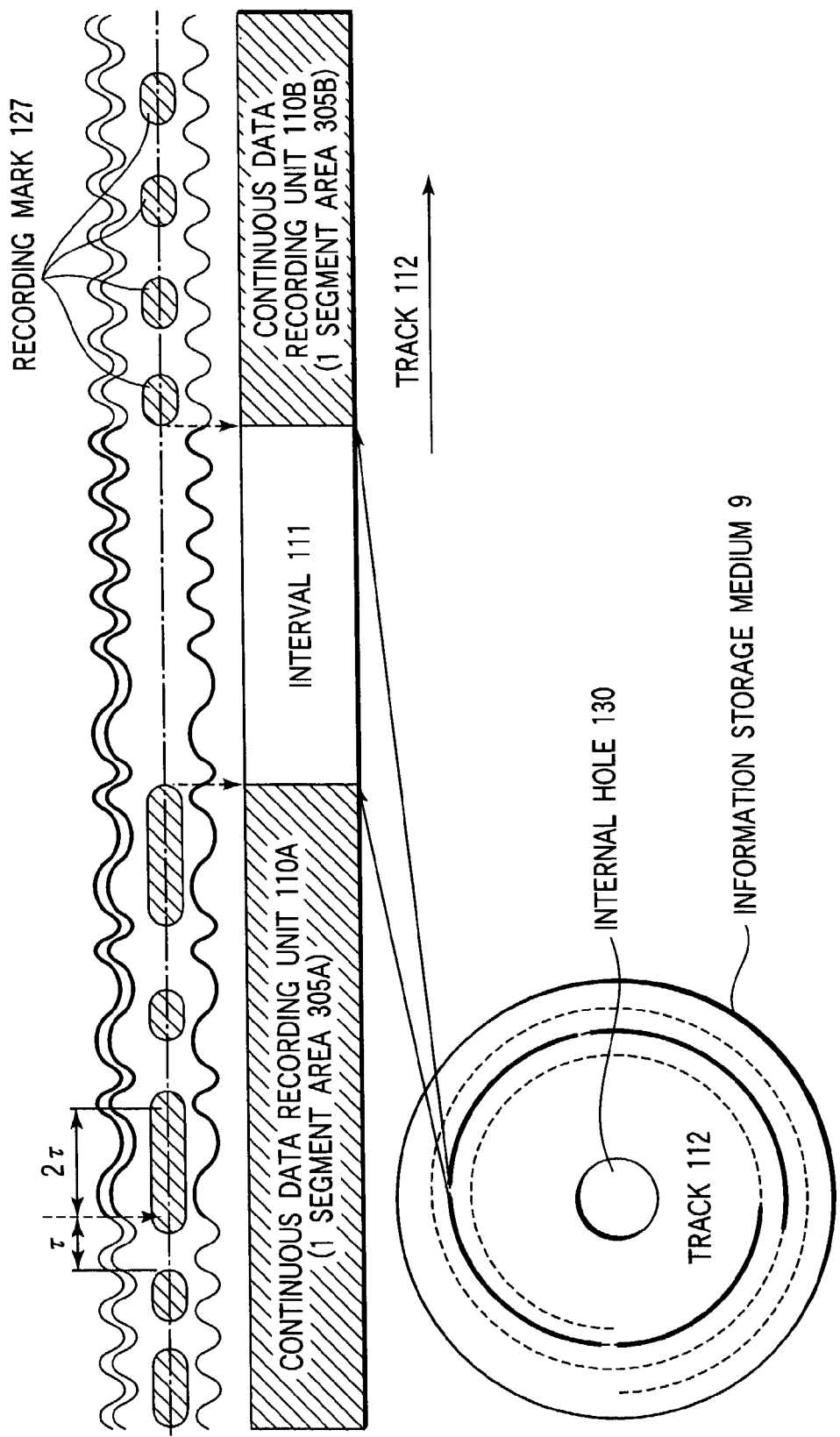
FIG. 8 is a diagram explaining the structure of the recordable information storage medium according to the embodiment of the present invention, and the user data recording method shown in FIG. 7.
Figure 9:
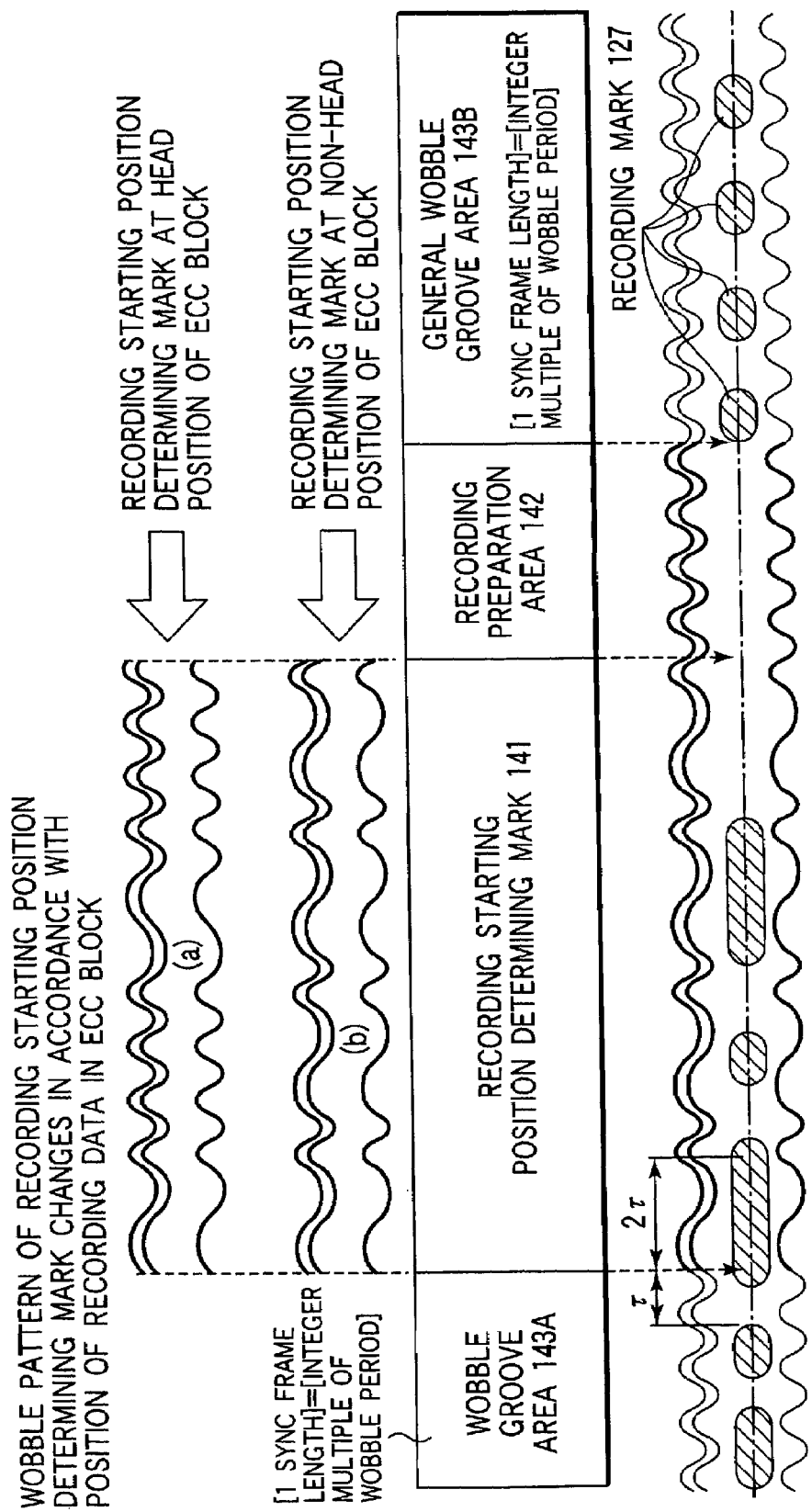
FIG. 9 is a diagram shown for explanation, in relation to FIG. 8, of the structure of the recordable information storage medium according to the embodiment of the present invention, and the user data recording method shown in FIG. 7.

FIGS. 4 and 5 explain the advantage in accordance with the data arranging method on the information storage medium according to the embodiment of the present invention. FIG. 6 explains one segment area (one recording unit of continuous data) in the recording area (recordable area or re-recordable area) of the recordable information storage medium according to the embodiment of the present invention. FIG. 7 shows a first example of a user data recording method in the recording area (recordable area or re-recordable area) of the recordable information storage medium according to the embodiment of the present invention. FIGS. 8 and 9 explain a structure on the recordable information storage medium and the user data recording method shown in FIG. 7. In FIGS. 8 and 9, an example in which a wobble modulation pattern is changed at a starting position and a non-starting position of an ECC block is shown. However, in a mark for determining a recording starting point, information (for example, segment ID information or the like) showing an existing position showing where this mark (or segment) is positioned in the ECC block may be recorded in advance.

FIGS. 10A and 10B explain the necessity of an interval area shown in FIGS. 8 and 9. Moreover, FIGS. 11A to 11D, and 12A to 12E show second and third examples of the user data recording method in the recording area (recordable area or re-recordable area) of the recordable information storage medium according to the embodiment of the present invention.

FIGS. 13A to 13E, 14A to 14E, 15A to 15D, and 16A to 16C explain the ECC block in the embodiment of the present invention. FIGS. 17A to 17D, 18A to 18C, and 19A to 19D explain a synchronous frame structure in one physical sector data. FIGS. 20A to 20C explain a synchronous code according to the embodiment of the present invention. In FIGS. 20A to 20C, a pattern of a synchronous position detecting code 121 is determined as follows: (i) the space between "1" and "1" is longer than a maximum length which can be generated by a modulation rule (in the example of the figure, k+3 "0"s are continuous), and (ii) the space between "1" and "1" does not include the most dense (shortest) length which can be generated by the modulation rule.

Figure 22:
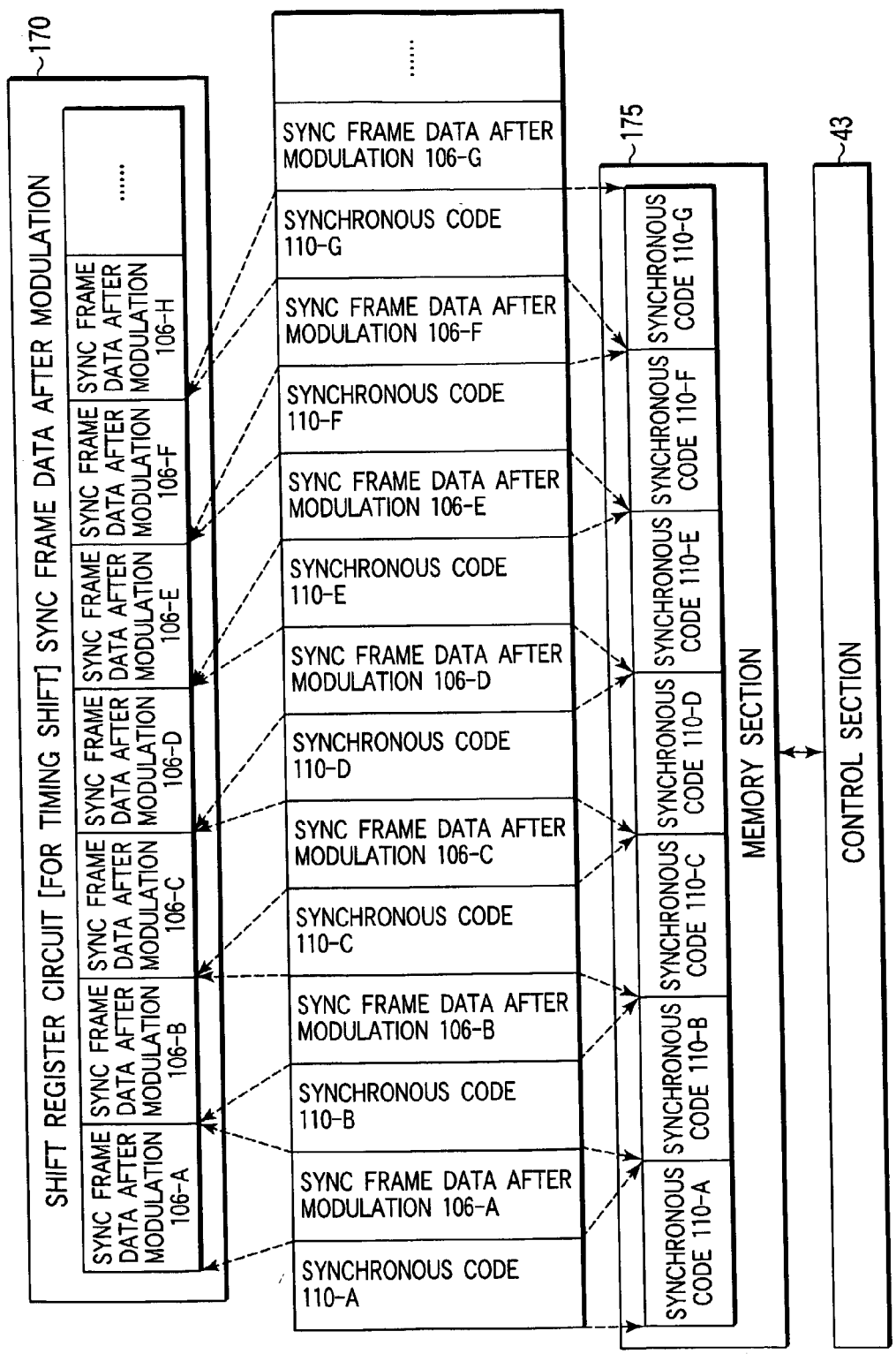
FIG. 22 is an explanatory diagram showing a method of indexing synchronous frame positions within one physical sector from the order in which the codes for synchronous frame position identification are aligned within the synchronization code.
Figure 23:
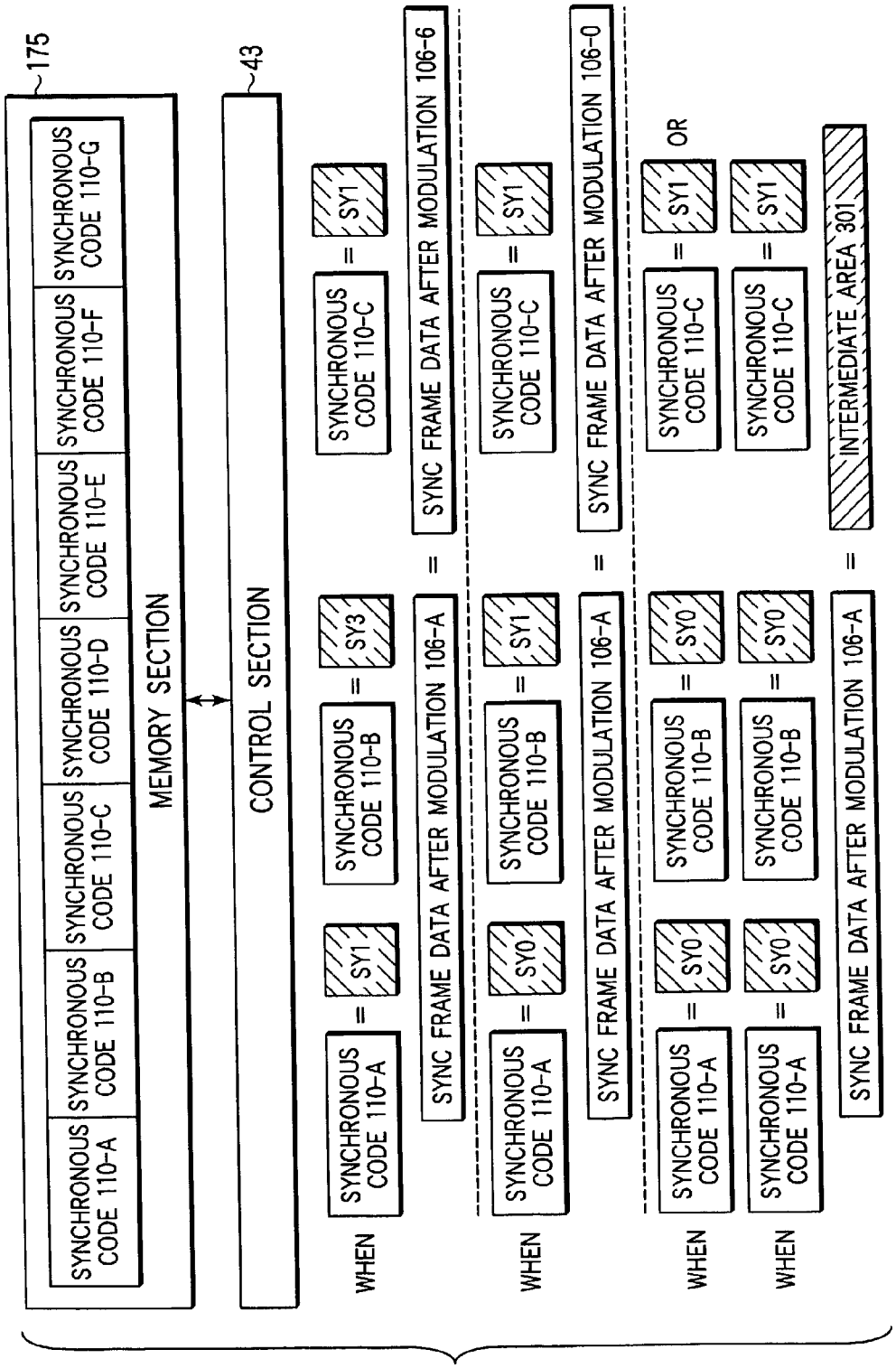
FIG. 23 is a similar explanatory diagram showing a method of indexing synchronous frame positions within one physical sector from the order in which the codes for synchronous frame position identification are aligned within the synchronization code.

FIGS. 21A to 21C show an arrangement example of the synchronous codes in one physical sector. As this arrangement structure, the same arrangement structure is adopted in the read only area and the recording area. FIGS. 22 and 23 explain a method for indexing a synchronous frame position in one physical sector data from the order of alignment of the synchronous frame position identification codes in the synchronous code.

FIGS. 24 to 27 explain another example of a common data structure recorded on the information storage medium of the embodiment of the present invention.

Figure 28:
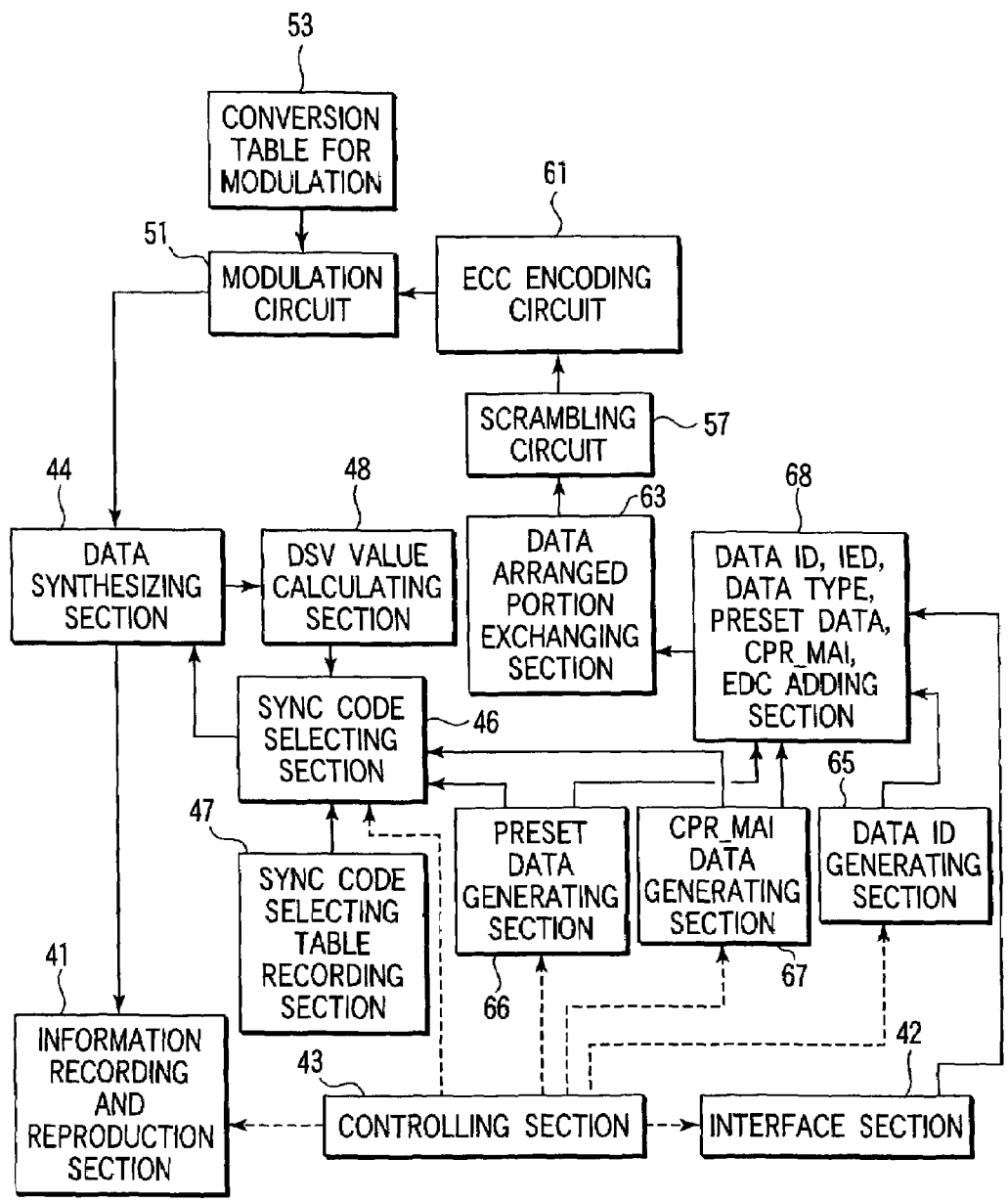
FIG. 28 is a diagram showing a recording system in an information recording and reproduction apparatus according to the embodiment of the present invention.
Figure 29:
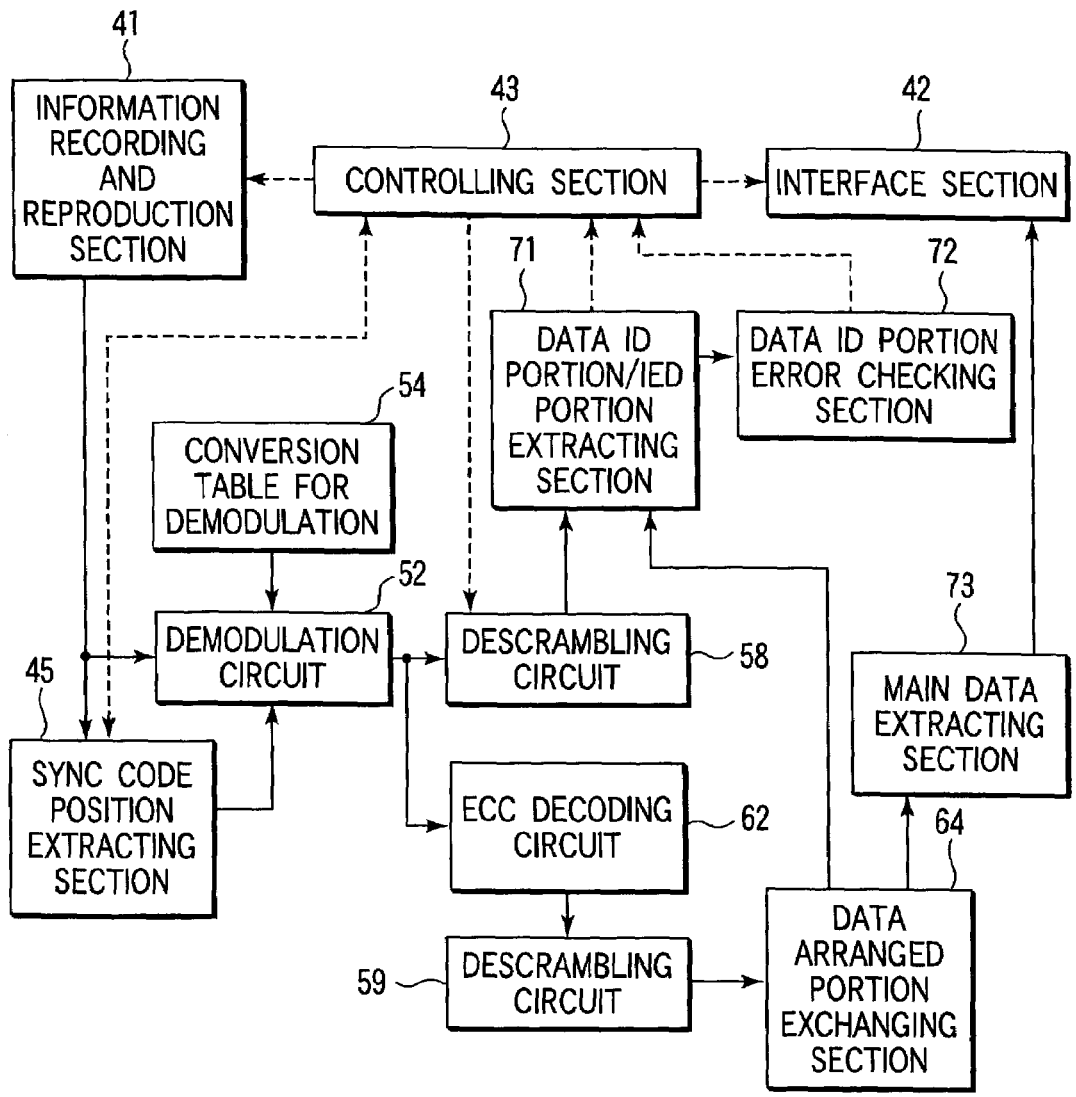
FIG. 29 is a diagram showing a reproduction system in the information recording and reproduction apparatus according to the embodiment of the present invention.
Figure 30:
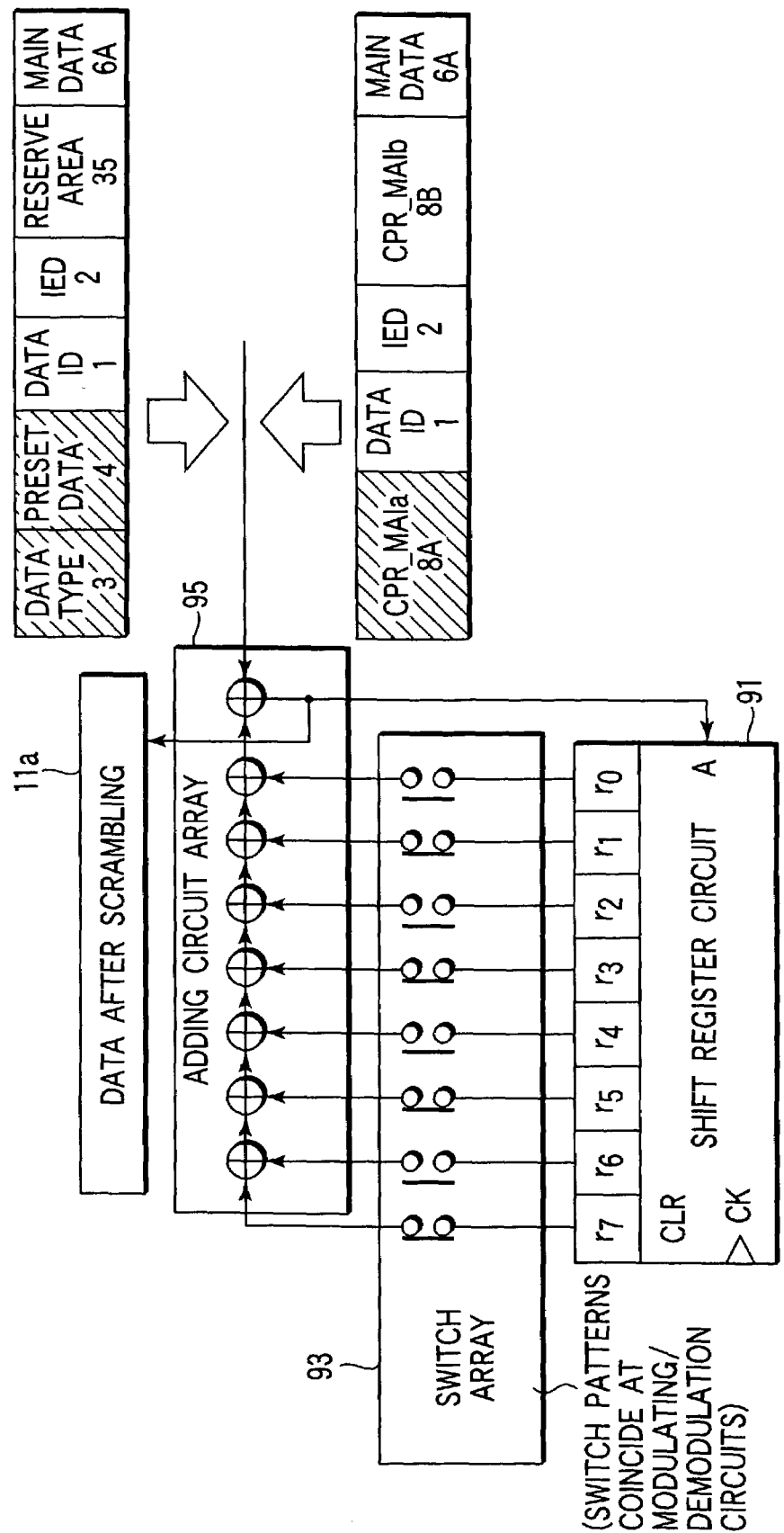
FIG. 30 is a diagram showing a structural example of a scrambling circuit according to the embodiment of the present invention.
Figure 31:
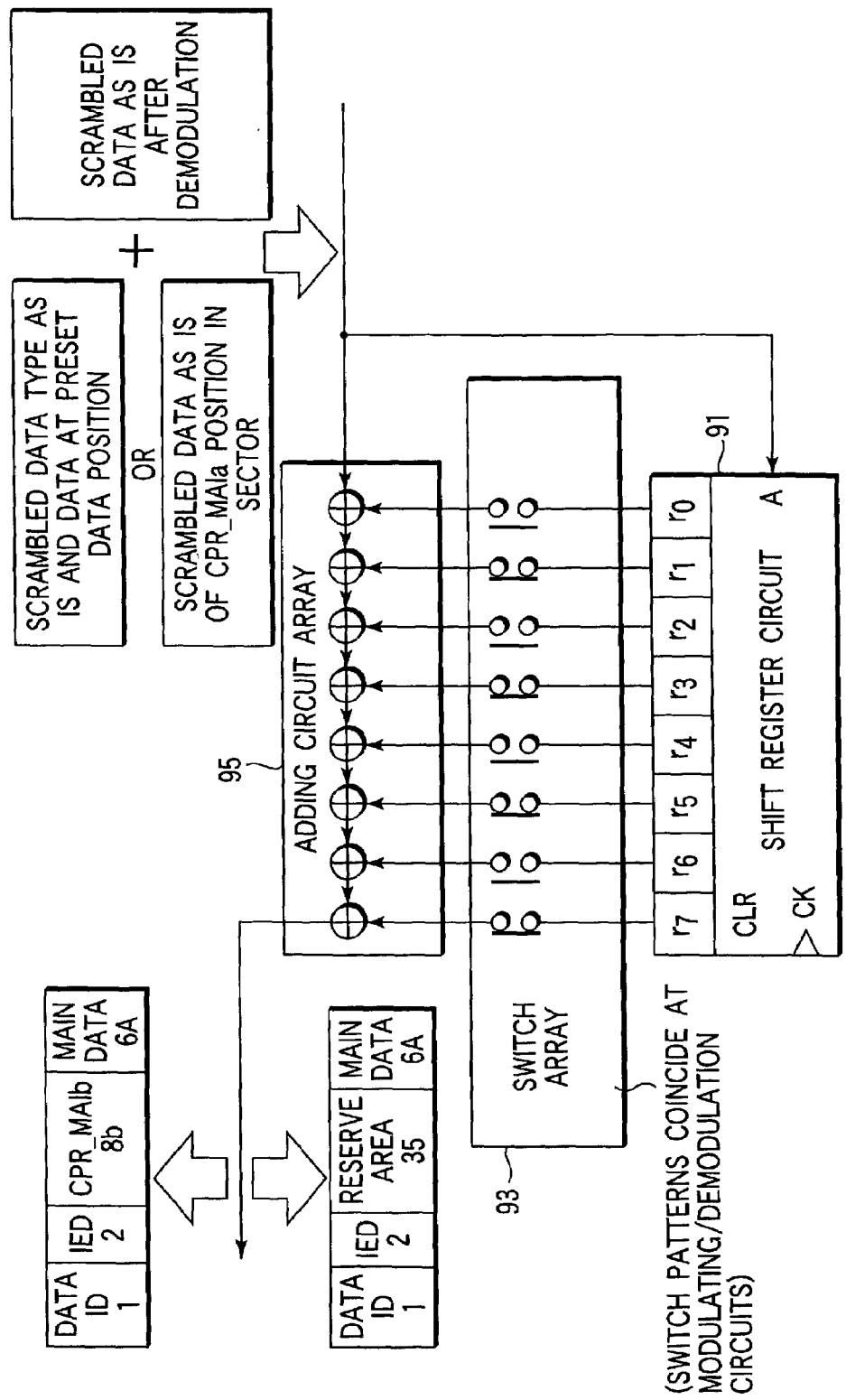
FIG. 31 is a diagram showing a structural example of a descrambling circuit according to the embodiment of the present invention.

FIG. 28 shows a structure of a recording system of the information recording and reproduction apparatus. FIG. 29 shows a structure of a reproduction system of the information recording and reproduction apparatus. FIG. 30 shows an internal structure of a scrambling circuit. FIG. 31 shows an internal structure of a descrambling circuit.

Figure 36:
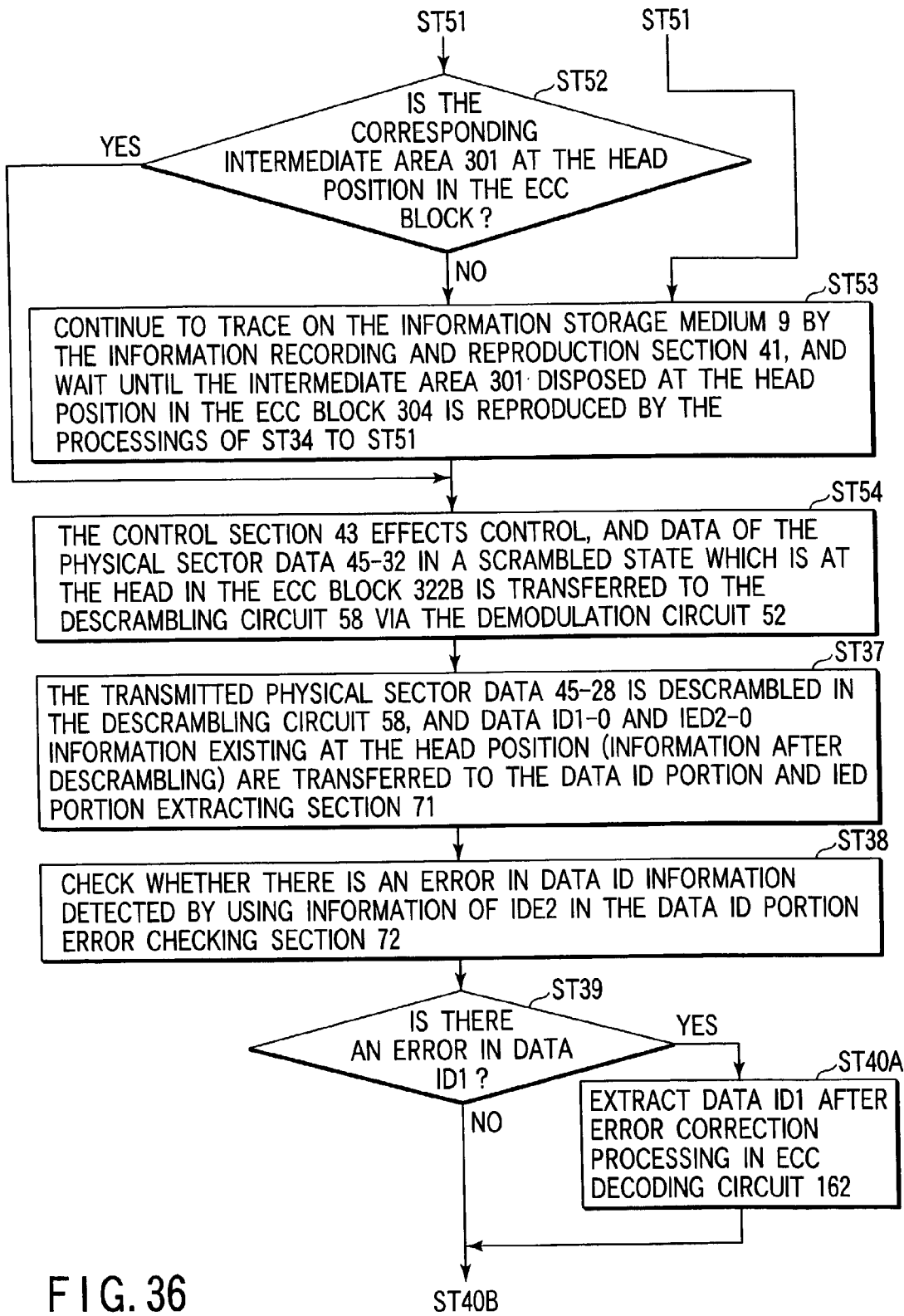
FIG. 36 is a flowchart showing the continuation of FIG. 35.
Figure 37:
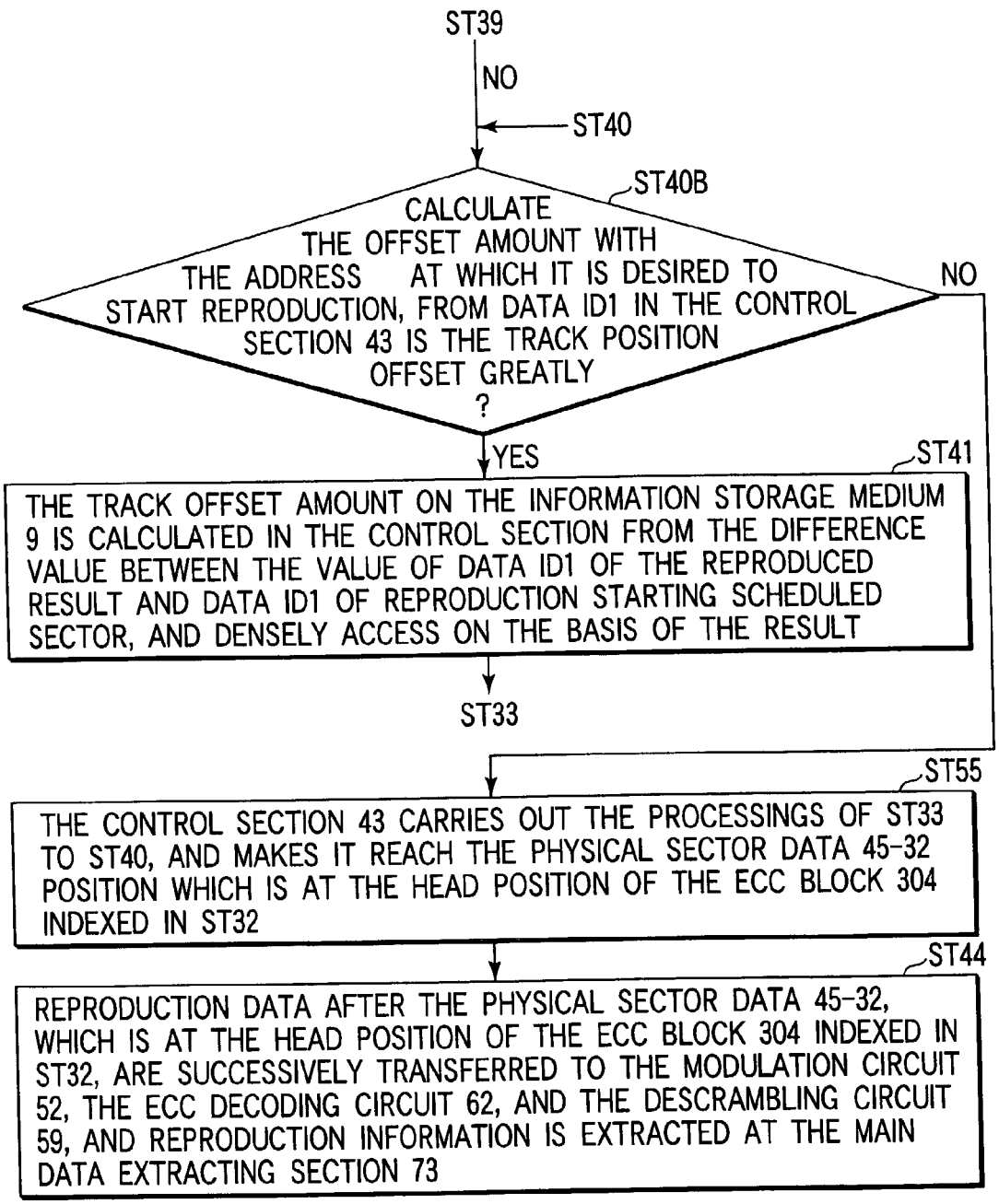
FIG. 37 is a flowchart showing the continuation of FIG. 36.
Figure 38:
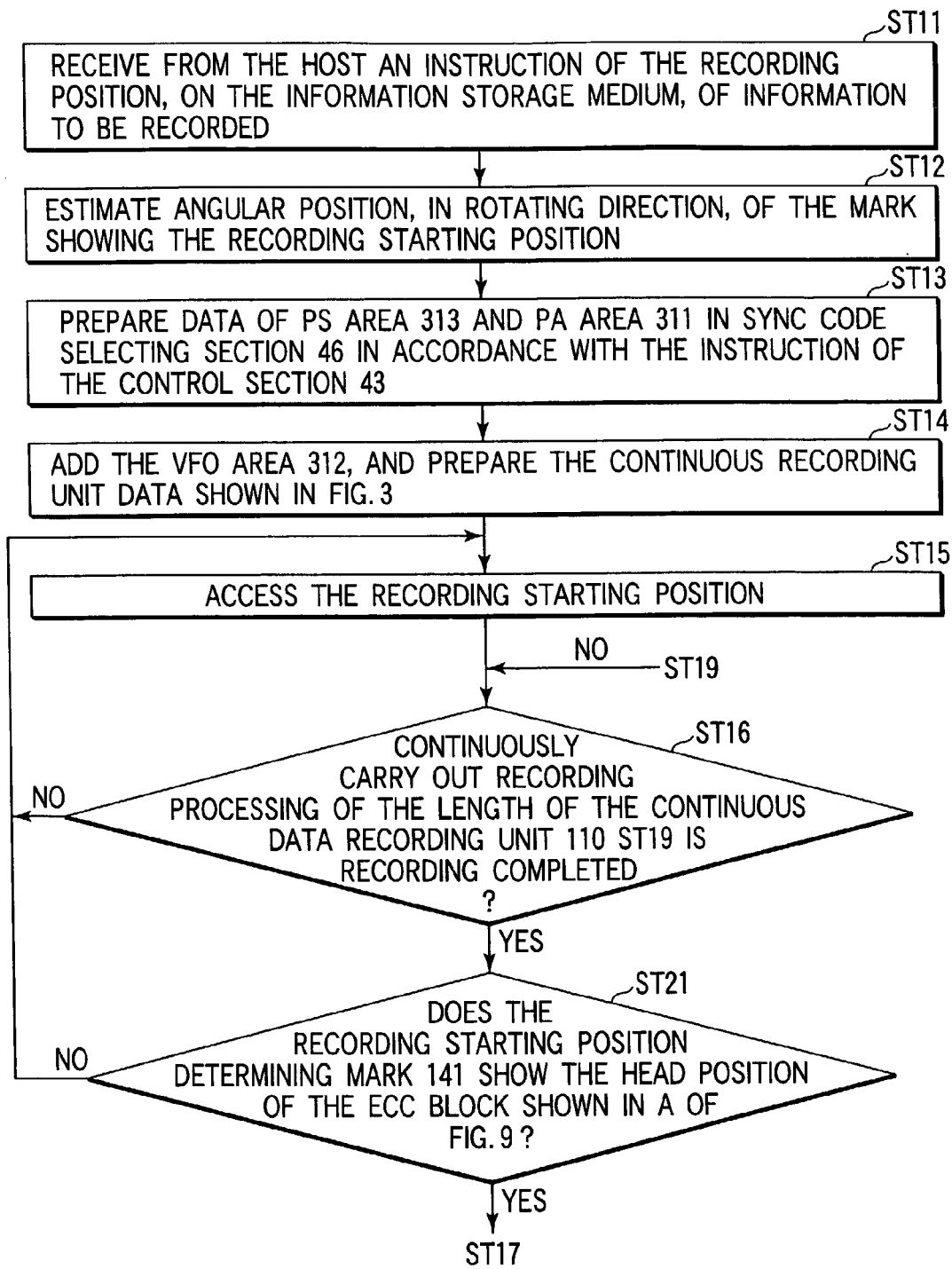
FIG. 38 is a flowchart for explanation of a recording method or a re-recording method in the information recording and reproduction apparatus according to the embodiment of the present invention.
Figure 39:
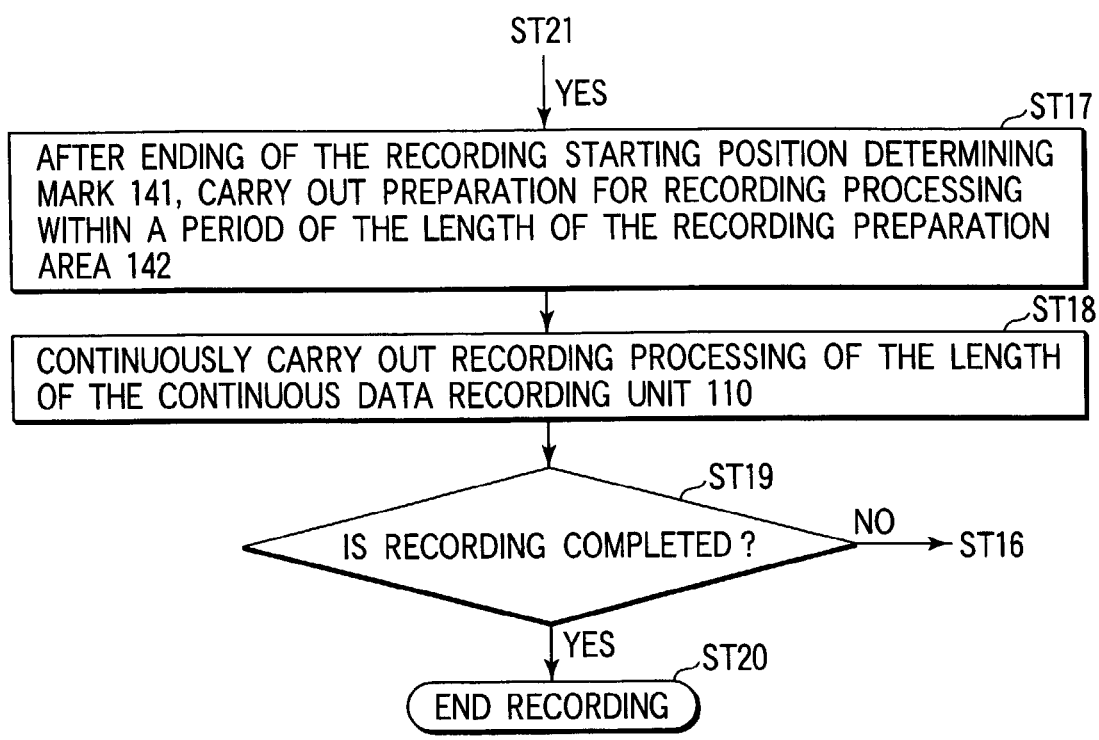
FIG. 39 is a flowchart showing the continuation of FIG. 38.

FIGS. 32 to 37 show a flowchart showing a controlling method when the information recording and reproduction apparatus accesses a predetermined position on the information storage medium. FIGS. 38 and 39 show a flowchart of a recording method or a re-recording method in the information recording and reproduction apparatus.

[Description of Main Points]

Next, concretely, main portions of the embodiment will be compactly described.

First, with regard to the topic of ensuring tracking stability at the time of accessing of reason (A1), among read only information storage media (next-generation DVD-ROM) and recordable information storage media, a physical shape of a "lead-in" area and a data structure of the "lead-in" area are made to have similar shapes (made to be in common), and the track offset detecting method in the "lead-in" area is made to be in common for information storage media which can record only one time (next-generation DVD-R) and re-recordable information storage media (next-generation DVD-RW or next-generation DVD-RAM).

In accordance therewith, regardless of the type of the information storage medium, in the "lead-in" area, a method in which the track offset correction is stably carried out (for example, a DPD (Differential Phase Detection) method is used for track offset detection) and an extremely high reliability reproduction signal and identifying information thereof can be obtained. Moreover, media identifying information showing the type of the above-described information storage medium is recorded in the "lead-in" area.

In this way, the type of the information storage medium is stably detected, an optimal track offset detecting method in the user data area (for example, the DPD method is used for a read only information storage medium and a DPP (differential Push-Pull) method is used for a recordable information storage medium) is selected at the information reproduction apparatus side in accordance with the type of the information storage medium, and tracking can be stably carried out for the user data area.

Further, the measures as follows are carried out with respect to the topic of eliminating synchronization offset between data in a recorded area before recording and data after recording of the above-described reason (A2) and a countermeasure for the point that a synchronizing preparation area necessary for reproducing the recorded or re-recorded information does not exist a DVD-ROM of the above-described reason (B1).

An intermediate area is arranged between the user data recording area and the next user data recording area which is configured in a unit of segment, and data used for synchronizing (VFO data) is recorded in the intermediate area, and the intermediate area is utilized as a synchronizing preparation area for the user data recording area to be recorded next.

As a result, in the embodiment of the present invention, it is possible to record or re-record information in a unit of segment without destroying the recorded user data. Further, the embodiment of the present invention can provide an information storage medium and a data structure thereof or an information recording method and an information recording and reproduction method, and provide an information reproduction method and an information reproduction apparatus for an information storage medium recorded in the data structure, in which this structure is commonly used for a recordable information storage medium and a read only information storage medium, and even a recordable information storage medium having the same data structure as a read only information storage medium is not affected by synchronization offset between segments (a countermeasure to the topic of reason (A1)), and the data of other segments in a recorded state is not destroyed (a countermeasure to the topic of reason (B1)).

With respect to the problem of the above-described reason (C1) that time is required to access the head position of the ECC block in the read only information storage medium, the following measure is taken. A segment comprises collecting a plurality of sectors together in one ECC block, and information (a PA/PS area) detecting the intermediate position is arranged in an intermediate area 301 in each segment. In accordance therewith, the place of the intermediate position 301 can be detected, thereby access to the head position of the ECC block is easier than in the current method.

As the method of accessing the head position of the ECC block, an access control is easier by grouping a plurality of sectors together and detecting in a unit of segment, than successively reproduction identification data at the head of the sectors as in the current way.

[Effective Points, Functions, Effects and the Like in the Embodiment]

Next, particularly effective points and functional effects in the present embodiment will be first described.

[1] The user data recording area and the intermediate area are alternately arranged in the read only information storage medium or the read only area (the "lead-in" area 320 in FIG. 1 or the like) in the recordable information storage medium, and at least data used for synchronizing is recorded in the intermediate area [corresponding to the contents described in FIGS. 1A to 2D].

Effective point: Because detecting of the boundary position of the ECC block is easy and processings up to the start of error correction processing using the ECC block are simplified, it is possible to make the control high-speed, and to lower the frequency of occurrence of bugs, and to make the apparatus low-cost.

Namely, detection of the position of the ECC block boundary is first possible when information of the synchronous code 110 arranged at 26 places in one physical sector 105 (FIG. 21A) is decoded and the head position of one physical sector 103 is searched for, and the information of the data ID 1 recorded at the head position of the physical sector 103 is reproduced (the method shown in FIG. 4). As compared with this, in the embodiment of the present invention (which corresponds to the contents described by FIG. 5), when the position of the intermediate area is detected, the position of the data ID 1, in which is described address information which is arranged behind the intermediate area and is discrete at a segment interval (has jumped by the number of the sectors existing in one segment), is immediately known. Accordingly, in the present embodiment, the boundary position of the ECC block can be easily detected.

In particular, in the present embodiment, as shown in FIGS. 24, 25, 26, and 27, in order to increase the number of re-recordings, the data ID 1 portion is also scrambled. Accordingly, it takes much time to reproduce the data ID 1. Namely, in the data structure of the present embodiment, if the data ID 1 in the physical sector data is reproduced/decoded one by one, it takes more time to access data than in a current system.

Accordingly, when a method of scrambling such as the present embodiment is adopted, firstly, detecting of the position of the intermediate area 301 is carried out, and data accessing has a better effect for shortening the accessing time.

[1a] The data size of the intermediate area described in [1] is made to match an integer multiple of the size of one synchronous frame (which corresponds to the description of FIGS. 1A to 1D).

Figures 18A, 18B, 18C:
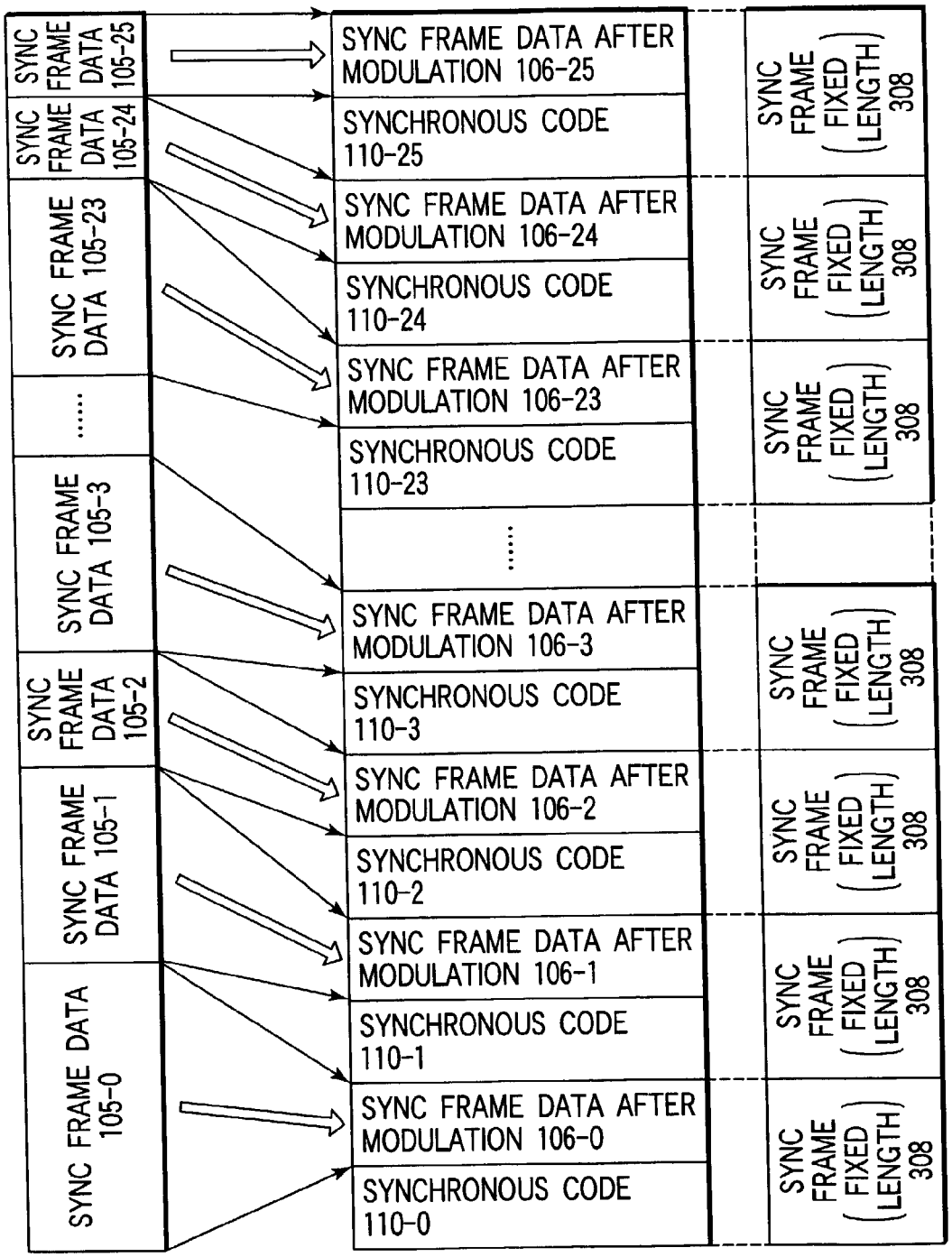
FIGS. 18A, 18B, and 18C are an explanatory diagram showing the relationship between the synchronous frame data and a synchronous code, and a synchronous frame length.

As shown in FIGS. 18A to 18C, the synchronous code 110 is arranged at the head position of the fixed length synchronous frame 308. Similar, the size of the intermediate area 301 coincides with the synchronous frame 308 as shown in FIGS. 2C and 2D, and a PA (postamble) area 311 having a structure similar to the synchronous code 110 is arranged in the same synchronous frame 308, as shown in FIG. 2B.

Effective Point (1a-1) Because a synchronous frame interval in the user data recording area is held in the intermediate area as well, detection of the position of the synchronous code is easy.

Namely, as shown in FIGS. 2A to 2D, in the physical sector data 5, the synchronous code 110 is arranged at the head position of the fixed length synchronous frame 308, and the PA area 311 is arranged at the head position of the intermediate area 301 having a size matching the synchronous frame 308. Thus, the arrangement intervals of the PA area 311 and the synchronous code 110 always coincident over the entire area in the information storage medium 9 (regardless of any of the read only area and the recordable area).

As a result, if the synchronous code 110 or the PA area 311 is detected once, it is possible to estimate the timing in which the synchronous code 110 or the PA area 311 will be detected since the synchronous code 110 or the PA area 311 is arranged at a uniform interval.

Therefore, not only is the detection of the synchronous code 110 or the PA area 311 easy, but also, the detecting accuracy of the synchronous code 110 or the PA area 311 is improved.

(1a-2) Continuity of the wobble group can be ensured.

Namely, a wobble continuous groove (pregroove) is formed as shown in FIGS. 8 and 9 in the user data recording area of the recordable information storage medium. As shown in FIG. 7D, FIG. 1D, and FIG. 12D, the physical length of one synchronous frame is an integer multiple of a wobble period of the above-described continuous groove.

Therefore, since the data size of the intermediate area is made to match an integer multiple of one synchronous frame size, it is possible for the physical length of the intermediate area to match an integer multiple of a wobble period. This means that it is possible for the wobble phases at the starting position and the ending position of the user data recording area to be always made to coincide.

[1b] Relative address information (in-ECC position information 314/315 shown in FIG. 2A) is recorded in the intermediate area described in [1].

Effective Point

As a result, the position of each segment in the ECC block is known. At the time of reproduction, the head position of the ECC block is always searched for, and error correction processing is carried out in a unit of ECC block from the head position of the ECC block. Accordingly, as the present embodiment, by using a structure in which relative address information is recorded in the intermediate area and the position of each segment in the ECC block is known, the head position of the ECC block is quickly found, and an attempt can be made to shorten the processing time up to the error correction processing.

[1c] At least one part (the PA area 311 and SY0 or SY5 in the PS area) among the synchronous code 110 in the user data recording area is used for (at least one part of) the synchronous code in the intermediate area (which corresponds to SY0, SY4, SY5 of the synchronous frame position number 115 shown in FIG. 20).

Effective Point

As shown in FIG. 20, a specific synchronous code 110 pattern is arranged in accordance with the position in the physical sector data 5. Therefore, in a sync code position extracting section 45 shown in FIG. 29, the position in the physical sector data 5 can be detected by using the connection of the synchronous codes 110 detected as shown in FIGS. 21A to 21C and 22 to 23. By determining whether it is SY0 or SY5 in the PA area 311 or PS (pre-synchronous) area, the same structure/function as the synchronous code 110 can be realized. In accordance therewith, in the sync code position extracting section 45 of FIG. 29, two types of position extractions, which are the position extraction of the intermediate area 301 and the position extraction of the intermediate area 301 in the ECC block 304, are carried out. Therefore, the circuit structure of the information recording and reproduction apparatus or the information reproduction apparatus can be simplified, and it is possible to simplify the processings as described in FIGS. 32 to 37.

[1d] The pattern content is changed between the synchronous code 110 in the user data recording area and the synchronous code in the intermediate area (corresponding to the description of FIGS. 20A to 20C and 2A to 2D).

Effective Point

The pattern content is changed between the synchronous code 110 in the user data recording area and the synchronous code in the intermediate area, thereby it is possible to quickly detect whether the detecting information is a position information in the physical sector data 5 or a position information of the intermediate area 301, in the sync code position extracting section 45 in FIG. 29.

[2] The recording position of the intermediate area is detected by using the data pattern recorded in the intermediate area described in [1]. Namely, the recording position of the intermediate area is detected by detecting the synchronous code recorded in the intermediate area.

Effective Point

Because ECC block boundary position detection is easy, and the processings up to the start of error correction processing by using the ECC block are simplified, it is possible to make the control high-speed, to decrease the frequency of occurrence of bugs, and to make the apparatus low-cost.

In current DVDs, it is possible to first detect the ECC block boundary position when the head position of one physical sector 103 is searched for by decrypting the information of the synchronous code 110 arranged at 26 places in one physical sector 103, and the information of the data ID 1 recorded at the head position of the physical sector 103 is reproduced (the method shown in FIG. 4).

As compared with thus, in the embodiment of the present invention (the description shown in FIG. 5), when the position of the intermediate area is detected, the position of the data ID 1 which is arranged behind the intermediate area and has described therein an address information discrete at a segment interval (has jumped by the number of the sectors existing in one segment), is immediately known. Therefore, detection of the position of the ECC block boundary is easy.

[3] In a recordable information storage medium and a read only area of a read only information storage medium (or recordable information storage medium), the arrangement intervals of the user data recording areas and the intermediate areas from the standpoint of the arranged states or the number of data bits are made to coincide.

Namely, as is clear in comparison with FIGS. 3 and 6, the arrangement states or the numbers of data bits in the user data recording area and the intermediate area substantially coincide in the re-recordable information storage medium and the read only area in the read only information storage medium (or recordable information storage medium), and only the size of the VFO area is different.

Effective Point (a) Compatibility between the read only storage medium and the recordable information storage medium can be maintained. Because a processing circuit for reproducing can be used for both a read only information reproduction apparatus and a recordable information recording and reproduction apparatus, it is possible to make the apparatus low-cost.

(b) There is no need to form the current "borderout" area, and it is possible to record or re-record in a unit of segment without carrying out "restricted overwrite". Therefore, recording and re-recording at small units (segment units) in the recordable or re-recordable information storage medium can be carried out (because the areas in which unnecessary "borderout/border-in" information are recorded become unnecessary), the usage efficiency at the time of recording onto an information storage medium is improved.

[4] The user data recording area and the intermediate area, which are continuous in a unit of segment, are alternately arranged for the recordable information storage medium. The recording or re-recording of the user data is carried out in a unit of segment, and the recording start is carried out from a midway position of the above-described intermediate area at the time of recording/re-recording. The recording end processing is carried out at a midway position of the intermediate area (which corresponds to the description shown in FIGS. 1D, 7B, 7C, 11B, 11C, 12B, and 12D).

Effective Points

The recording head position which is the leading end of the continuous data recording unit 110 and the recording end position which is the trailing end of the continuous data recording unit 110 are within the VFO areas 312, and 331 to 335. The VFO areas exist outside of the user data recording field 303 at which the physical sector data 5 is arranged. Thus, the destruction of user data in a case where the recording method in accordance with "restricted overwrite" is used as described in (B), does not occur, and even if overwrite recording is carried out many times, high reliability of the information within the user data recording field 303 can be maintained.

[5] Address information, which is arranged discretely (dispersedly inserted) into one data recording unit (segment) with respect to the recordable information storage medium, is recorded at plural places (corresponding to the description shown in FIGS. 1A to 2D).

In other words, a plurality of sectors, which contain one or more data ID 1 including the address information, are collected, so as to form one data recording unit (segment).

Effective Points (a) The recording efficiency improves.

(b) High speed of access is obtained.

Namely, even when reproduction starts from midway in the recording unit (one segment) for data recorded in recording units (segment units), the place which is currently being reproduced can be detected by identifying the data ID information reproduced immediately after start of reproduction. This enables a shortening of the total access time, because the time until the re-access processing is shortened.

[6] The recordable information storage medium has a structure in which a recordable recording area and an emboss area, such as a "lead-in" area at which information is recorded in advance by minute convex and concave configurations, exist within the same plane. The recordable data structure in the recording area and the data structure of the data recorded in advance in the emboss area have a data structure in which the user data recording areas and intermediate areas are arranged alternately (the description shown in FIGS. 1A to 2D).

Effective Points (a) In a recordable (including both a one time only recordable and a re-recordable) information storage medium, the recorded data structure coincides at the recordable recording area and the emboss area. Thus, the reproduction circuit which reproduces information from the recording area and the reproduction circuit which reproduces information from the emboss area can be used in common, and the reproduction circuit can be simplified and made lower cost.

(b) In a read only information storage medium, in the same way as with a recordable information storage medium, there are many cases in which a "lead-in" area is provided. By combining this point and the point of [3], the data structure at the "lead-in" area can be used in common for read only information storage media and recordable information storage media. As a result, (a1) At an information reproduction apparatus which can reproduce data from both read only information storage media and recordable information storage media, the reproduction processing circuit for the "lead-in" area can be used in common for both information storage media. The information reproduction apparatus can be simplified and made lower cost.

(b1) The structure of the "lead-in" area can be made the same for the read only information storage medium and the recordable information storage medium. Thus, not only the reproduction signal processing circuit in the "lead-in" area, but also the track offset detecting method can be used in common. The media information is recorded in the "lead-in" area for a read only information storage medium (ROM disk), and an R disk which is a recordable information storage medium and can be recorded only one time, and a re-recordable RAM disk. Thus, the data from the "lead-in" area is reproduced at a reproduction signal processing circuit common to a track offset detecting method common to a different type of information storage medium, and the media identification information can be reproduced easily and reliably.

[Specific Explanation of the Embodiment]

Next, more specific explanation will be given with reference to the drawings.

FIG. 1D shows an outline of the information storage medium 9.

In the recordable or re-recordable information storage medium 9, the recordable recording area and the emboss area such as a "lead-in" area 320 or the like in which information is recorded in advance by minute convex and concave configurations, exist within the same plane. Identification information showing the type of the information storage medium (e.g., a next-generation DVD-ROM, a next-generation DVD-R, a next-generation DVD-RW, a next-generation DVD-RAM) is recorded in the "lead-in" area 320.

The data structure for recording the data to the recording area and the data structure of the data recorded in advance in the emboss area both have a data structure in which the user data recording areas and the intermediate areas are alternately arranged.

Thirty-two items of physical sector data 5 (FIG. 1B) are collected to form one ECC block 304 (FIG. 1A). The arrangement within the ECC block is shown in FIGS. 13A to 13E, 14A to 14E, 15A to 15D, and 16A to 16C, as described later.

Here, four items of physical sector data are arranged within one segment area 305, and form a user data recording field 303 (FIG. 1C).

Further, the intermediate area 301 exists in one segment area 305.

The size of the intermediate area 301 is an integer multiple (FIG. 2C) of a synchronous frame 308. A PA (Postamble) area 311, a VFO (Variable Frequency Oscillator) area 312, and a PS (Pre-Synchronous code) area 313 exist within the intermediate area 301, as shown in FIG. 2B.

Information of SY0 or SY4 to be described later is recorded in the PA area 311, as shown in FIG. 2A. Information of SY0 or SY5, in-ECC position information 314 or 315, and the error detection code 316 or 317 thereof are recorded in the PS area 313, as shown in FIG. 2A.

FIGS. 1A to 2D show the structure of the read only information storage medium or the read only area within the recording medium. The structure is made to substantially coincide with the data structure of the recording area at a recordable or re-recordable information storage medium.

As the data structure of the recording area, data recording or re-recording in a unit of segment area 305 is possible. As shown in FIG. 2D, recording can start from a midway position of the intermediate area 301a, and recording can end at a midway position of the intermediate area 301b.

FIG. 3 is a diagram in which the data structure within the segment area 305 shown in FIG. 1C is redrawn so as to be easily understood.

In a next-generation DVD-ROM, VFO area 312, PS area 313, and PA area 311 are arranged in one segment of data 305 such that the total of the synchronous frames within one segment area 305 becomes one synchronous frame size (a fixed length). Four items of continuous information (data size of one sector 5 is 2048 bytes) are in the data field 303 of FIG. 3, and form one segment of data 305. For each segment of the data, VFO area 312 and PS area 313 are arranged immediately therebefore, and PA area 311 is arranged immediately thereafter.

The functions or effects of the data structure of the present embodiment shown in FIGS. 1A to 3 will be explained by using FIGS. 4 and 5.

In the data structure of current DVD-ROM, DVD-R, and DVD-RW, there is no intermediate area 301 as in the present embodiment. In the data structure of current DVD-ROM, DVD-R, and DVD-RW, one ECC block comprises 16 items of physical sector data 5. One ECC block occupies a position 321 on the information storage medium at which data is arranged.

Further, the position within one physical sector data 5 is detected from the information contents of the synchronous code 110, and the position is detected from the ID information recorded at the head position of the physical sector data 5. Data access control is thereby possible.

An access control method for current DVD-ROM and DVD-R/RW is shown in FIG. 4.

(a-1) First, rough access to an estimated position on the information storage medium 9 is carried out, and data reproduction at the accessed position started by an information recording and reproduction section 41 (FIG. 28).

(a-2) The position of the synchronous code 110 is detected, and the head position of the physical sector data is detected.

(a-3) The in-ECC block position 321 is indexed from the data ID 1 (or ID) information within the physical sector data 5.

(a-4) The position of the next synchronous code 110 is detected, and the data ID 1 (or ID) information is read, and thereafter, (a-5) the operation of (a-4) is repeated until the next ECC block head position.

As a result, (a-6) the information recording and reproduction section 41 accesses the next ECC block head position on the information storage medium 9, and information reproduction and error correction are started therefrom. In this sway, currently, there is the need to always reproduce the physical sector data information (data ID 1) until the head position of the ECC block, which starts information reproduction/error correction, is accessed.

As in the present embodiment, as explained in FIGS. 24 to 31, when the data ID 1 (or ID) information is scrambled, the following problem occurs. Namely, at the time of reproduction, if the scrambled data ID 1 (or ID) information is descrambled, even more time is required until the head position of the ECC block is accessed. Namely, the problem arises that the access time becomes even slower.

In contrast, in the method of the present embodiment, plural items of physical sector data 5 are gathered to form the segment area 305, and access control is carried out by using the segment area 305 as a unit. Thus, access processing is easy, and the access time is shortened.

The structure of the information recording and reproduction apparatus or information reproduction apparatus in the present embodiment is shown in FIGS. 28 and 29. Details of the information reproduction apparatus will be described later.

The access processing method for the data structure of the present embodiment shown in FIG. 5 is shown in FIGS. 32 to 37.

When an instruction of a data range to be reproduced is received from the interface section 42 (ST31), the value of the data ID 1 within the physical sector data 5 having the reproduction head position of the ECC block 304 is calculated (ST32). At the information recording and reproduction section 41, reproduction is started from the roughly-accessed position (ST33).

At the information recording and reproduction section 41, data in which is mixed in the intermediate area 301 having the PA area 311 at the head (FIG. 2B), is reproduced. The reproduced data is supplied as is to a sync code position extracting section 45 (ST34). At the sync code position extracting section 45, the order of alignment of the codes for identifying the synchronous frame position, or the pattern of SY4 is directly detected, and the position of the PA area 311 is detected. The place of the intermediate area 301 is detected from the results thereof (ST35).

Figure 32:
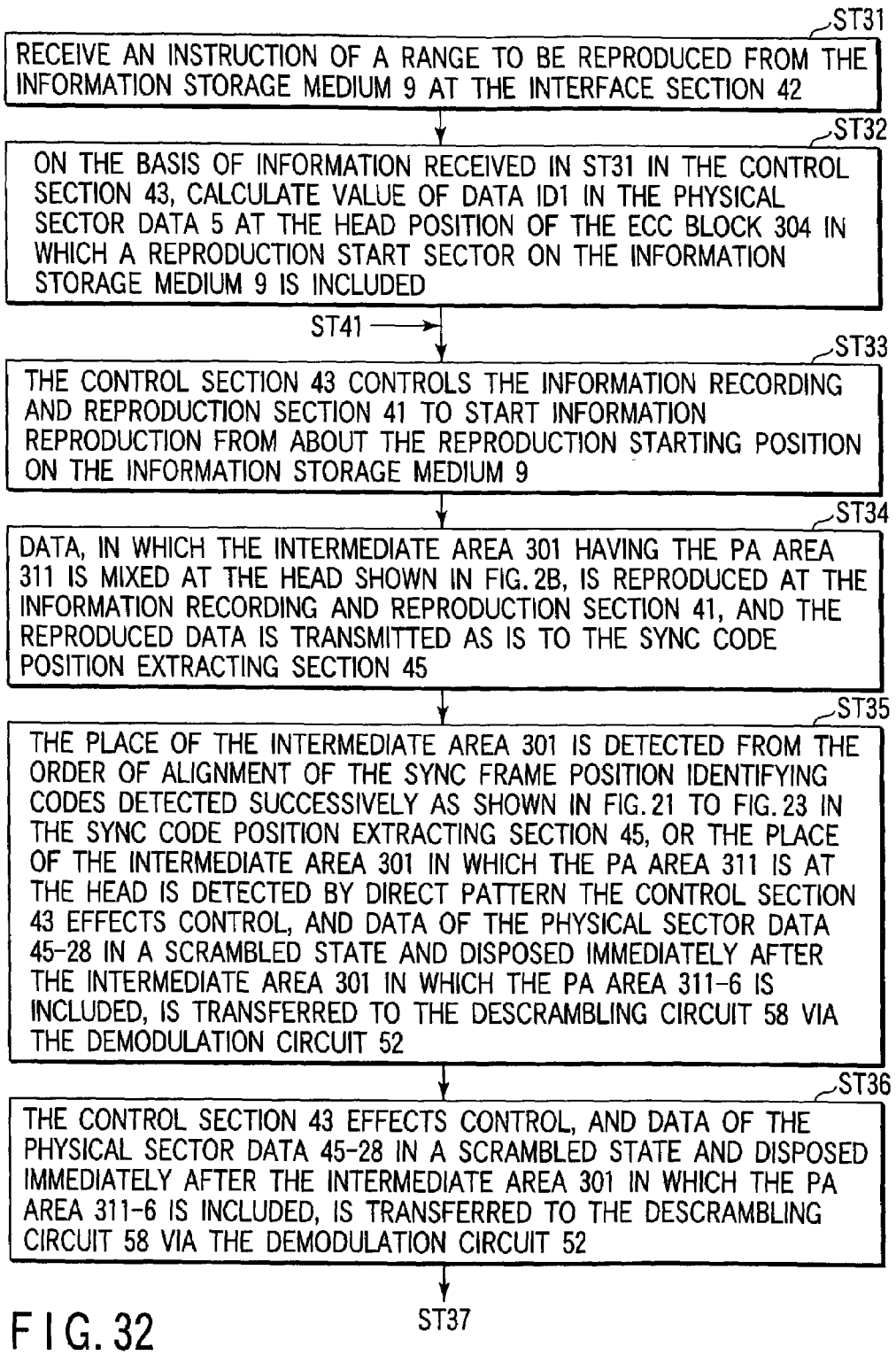
FIG. 32 is a flowchart showing a method of controlling access to a predetermined position by using a PA area in the information recording and reproduction apparatus according to the embodiment of the present invention.
Figure 33:
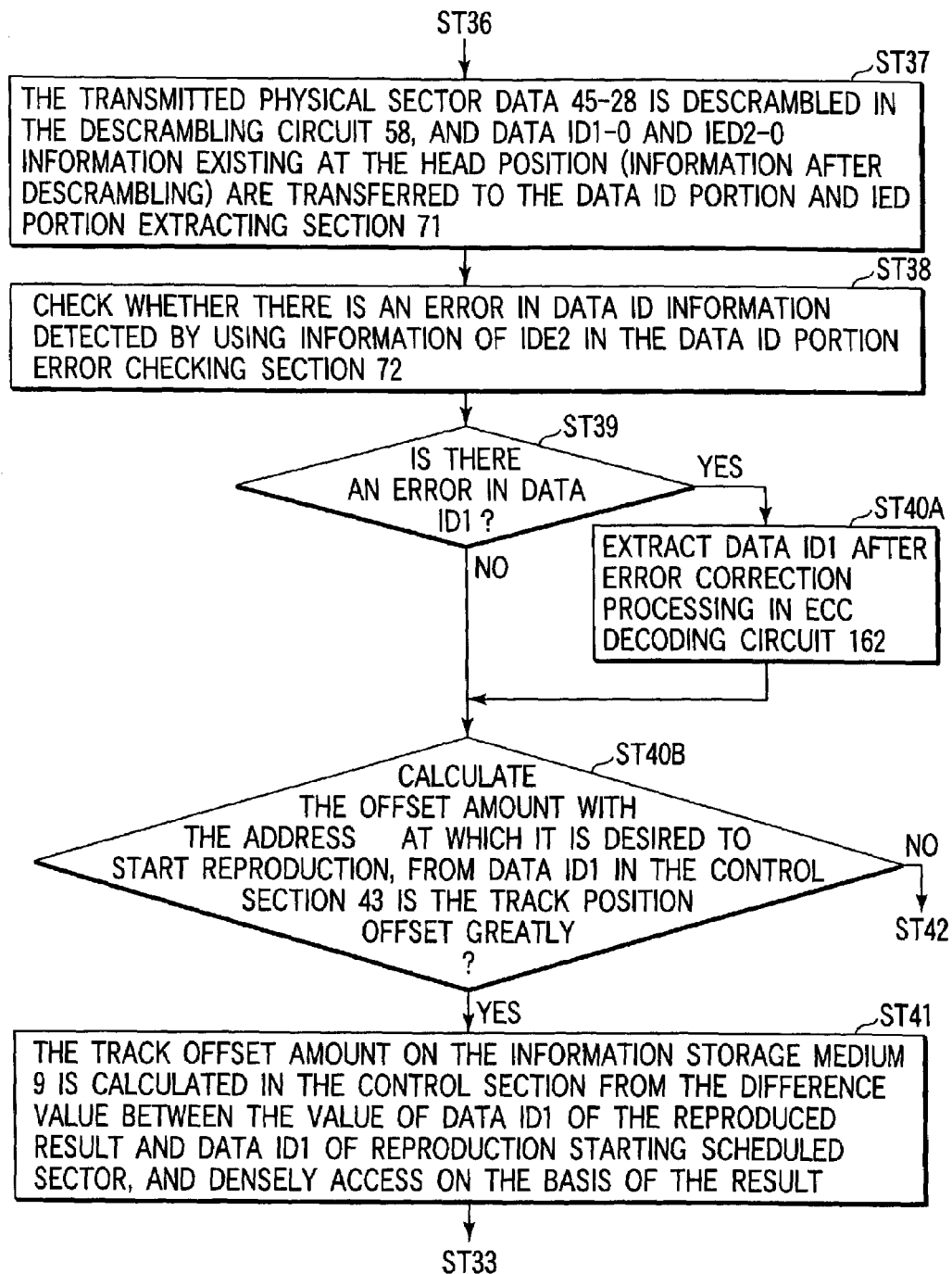
FIG. 33 is a flowchart showing the continuation of FIG. 32.
Figure 34:
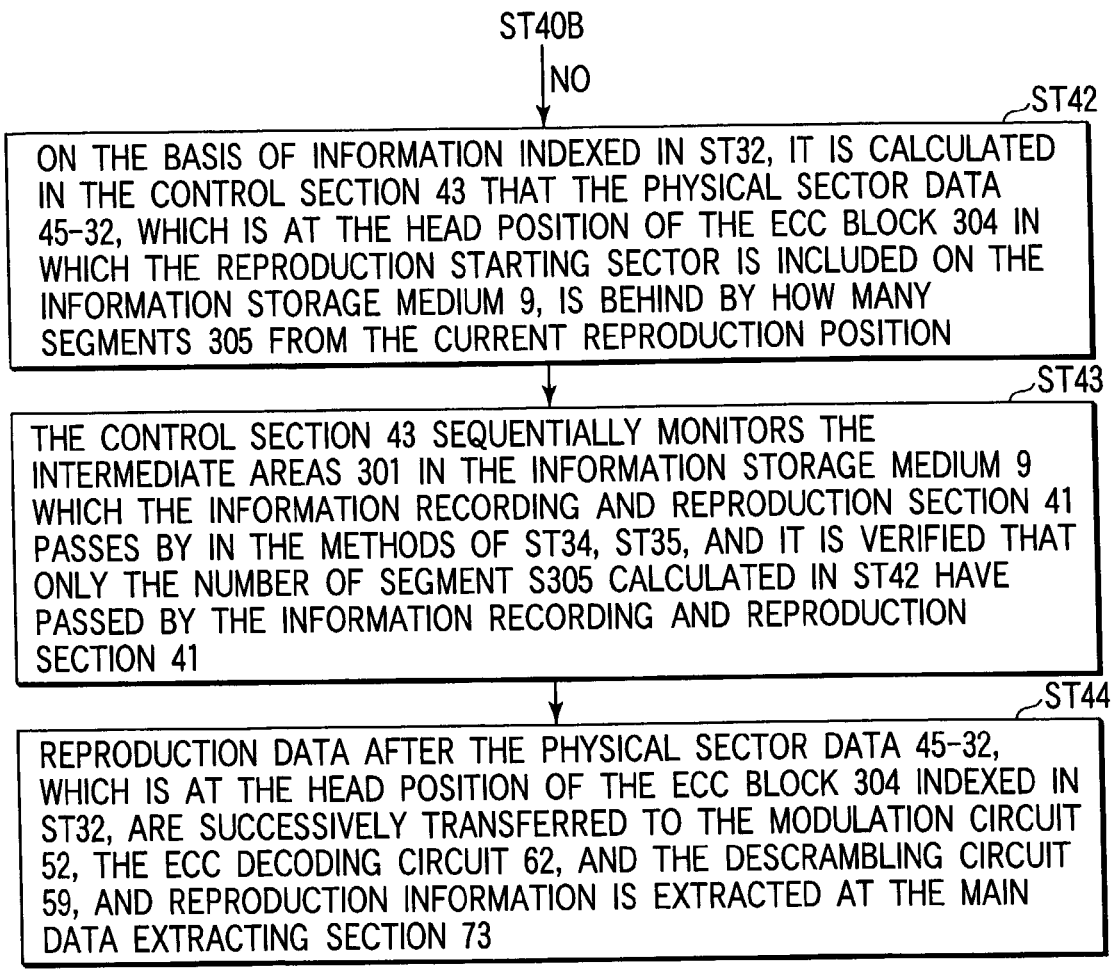
FIG. 34 is a flowchart showing the continuation of FIG. 33.
Figure 35:
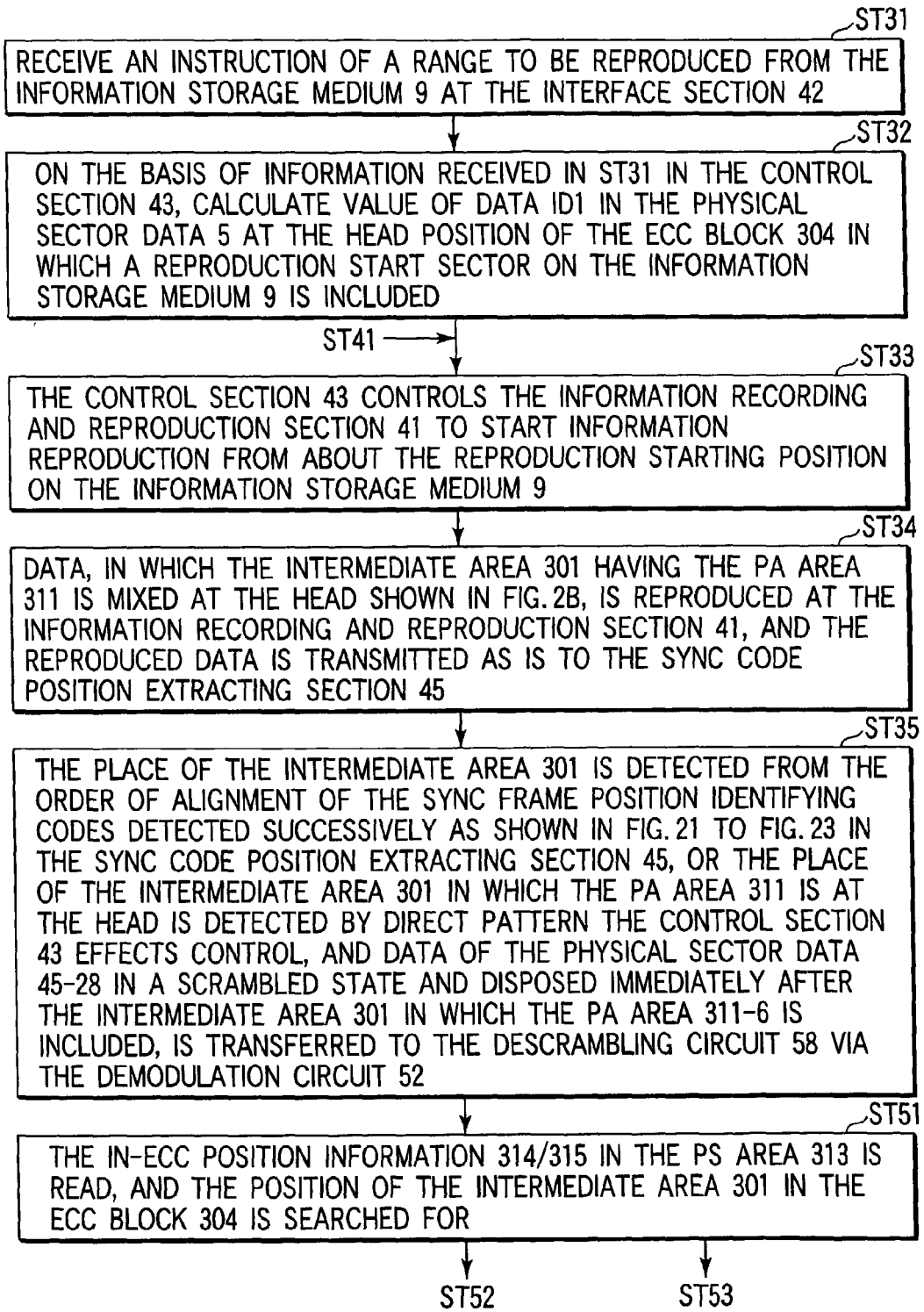
FIG. 35 a flowchart showing a method of controlling access to a predetermined position by using a PS area in the information recording and reproduction apparatus according to the embodiment of the present invention.

FIGS. 32 to 34 show a method for accessing by using only information of the PA area 311. FIGS. 35 to 37 show a method of accessing using also the in-ECC position information 314 or 315 within the PS area 313.

As shown in FIGS. 32 to 34, when accessing by using only the information of the PA area 311, the data of the physical sector data 45-28 (FIG. 5), which is a scrambled state and arranged immediately after the intermediate area 301, is given to a demodulation circuit 52. The demodulated data is supplied to a descrambling circuit 58 (ST36).

The physical sector data 45-28 is descrambled within the descrambling circuit 58. The data ID 1-0 existing at the head position, and the data IED 2-0 (FIG. 14C) information (information after descrambling) are supplied to the ID and IDE extracting section 71 (ST37). At the error checking section 72 of the data ID, by using the information of the TDE2, it is checked whether or not there is an error in the detected data ID 1 (ST38, ST39).

When there is an error, at the ECC decoding circuit 162, the data ID 1 after error correction processing is extracted (ST40a). Within the control section 43, the amount of difference with the address at which it is desired to start reproduction is calculated by using the data ID 1. This difference amount determines whether the current track position is greatly deviated from the desired track position (ST40b). When there is no error in step ST39, the routine moves directly to step ST40b.

If the above-described difference amount is large, a difference between the value of data ID 1 of the results of reproduction and the value of data ID 1 of the sector at which start of reproduction is planned, is obtained. The track offset amount on the information storage medium 9 is calculated within the control section 143, and dense access is carried out on the basis of the results thereof (ST41).

Namely, the data ID 1 information of the physical sector data 45-28 is detected, and the position within the ECC block is detected. Namely, at the descrambling circuit 58, the data ID 1 portion within the physical sector data 45-28 in a scrambled state is descrambled, and the position within the ECC block is indexed (ST36). At this time, when the difference between the detected value of data ID 1 and the value, which is desired to be accessed and is indexed in ST32, is great (ST40b), dense access is carried out again (ST41).

In step ST40b, when it is clear that there is no great track offset, the routine moves on to step ST42. Immediately after the detected value of data ID 1, the control section 43 calculates how many segments the value indexed in step ST32 (showing the place desired to be reached) is after the current position. This after position corresponds to the physical sector data 45-32 of the head of the next ECC block 322b (ST42). Next, the control section 43 confirms (ST43) that the segment has passed by the number of segments 305 calculated in step ST42, while the information recording and reproduction section 41 always monitors the intermediate area within the passing information storage medium 9 by the methods of steps ST34 and ST35. Namely, the information recording and reproduction section 41 passes by a number of segments, which number is the calculated number (or ST43).

When the information recording and reproduction section 41 reaches the head position of the desired ECC block 322b, in the reproduction data, the intermediate area 301 is deleted, and only the data within the user data recording field 303 is successively supplied to the demodulation circuit 52, the ECC decoding circuit 62, and the descrambling circuit 59. At a main data extracting section 73, the user data is extracted and is supplied to the exterior via the interface section 42 (ST44).

FIGS. 35 to 37 show the processes in a case of accessing a desired position by using the in-ECC position information 314 and 315 of the PS area 313. Processes from step ST31 to step ST35 are the same as in the case of FIGS. 32 to 34.

Namely, as shown in FIG. 35 or FIG. 5, when access is carried out by using the in-ECC position information 314 or 315 of the PS area 313 within the ECC block, the position of the PA area 311 is indexed, and the place of the intermediate area 301 is detected from the results thereof (ST35). Next, the position information 314 or 315 of the PS area 313 within the ECC block is read, and the current position of the intermediate area within the ECC block 304 is searched for (ST51).

Next, it is determined whether or not the corresponding intermediate area 301 is the head position of the ECC block (ST52). As this method, the information of the PS area 313 positioned at the rear portion is detected. It is determined whether the head information of the PS area 313 is SY0 or SY5 (ST52).

As shown in FIGS. 2A to 2D, when the head information is SY5, it is known that the intermediate area 301 exists at the head of the ECC block. Further, if the head information is SY0, the in-ECC position information 315 immediately thereafter is detected, and it is determined which position within the ECC block 304 the corresponding segment is at.

When the corresponding intermediate area 301 is not at the head position of the ECC block, by the processings of steps ST34 to ST51, it waits until the intermediate area 301 arranged at the head position of the ECC block 304 is reproduced (ST53).

In actuality, what segments must be passed until the head position of the next ECC block 322b is calculated, and the information recording and reproduction section 41 is made to pass in the tracking direction by the calculated segment number (ST53). This portion is a different point of the processings shown in FIGS. 32 to 34, and in FIGS. 35 to 37.

When the corresponding intermediate area 301 is at the head position of the ECC block, the data of the physical sector data 45-32 in the scrambled state at the head position of the ECC block 322b is supplied to the demodulation circuit 52 and demodulated. The demodulated data is supplied to the descrambling circuit 58. This processing is obtained on the basis of control of the control section 43 (ST54).

From steps ST37 to ST41, the processes are the same as the processes shown in FIGS. 32 to 34. In step ST55 which is executed after step ST40b, the processings from step ST33 to step ST40b are executed, and the access position reaches the position of the physical sector data 45-32 which is the head position of the ECC block 304 determined in step ST32. After the access position has reached the desired position, the routine moves on to step ST44.

The data arrangement structure of the one segment area of FIG. 3 which is described previously is a structure of a read only area. In contrast, FIG. 6 shows the data arrangement structure of one segment area in a recordable area or a re-recordable area.

The data structure of a recordable next-generation DVD-R or a re-recordable next-generation DVD-RAM basically follows the structure of FIG. 3. Accordingly, in the same way as the example shown in FIG. 3, the VFO area 312, the PS area 313, the user data recording field 303, and the PA area 311 are included in one segment area. However, at the one segment area of FIG. 6, the size of the VOF area differs due to the embodiment. Namely, the size of the VFO area differs due to the embodiment.

For example, FIGS. 7A to 7D and 11A to 11D show an example of a method of recording user data on a recordable area or a re-recordable area. Here, in the embodiment shown in FIGS. 7A to 7D, a gap 111 (Mirror Field) exists between the VFO areas 331 and 332. Further, in the embodiment shown in FIGS. 11A to 11D, the gap 111 (Mirror Field) exists immediately before the VFO area 333. Namely, in the embodiment of FIGS. 11A to 11D, it means that the VFO area size immediately after the PA area 311 is "0", and the gap 111 is arranged immediately after the PA area 311. The gap 111 is provided, and the effects of fluctuations in the recording end position due to irregular rotation of the spindle motor can be removed.

FIGS. 8 and 9 shows the method of recording the user data shown in FIGS. 7A to 7D, and the relationship with the physical structure of the information storage medium. As shown in FIGS. 8 and 9, the recording area is a structure in which a meandering (wobbling) continuous groove (pre-groove) is provided in a spiral shape, and recording marks 127 are formed on the continuous groove (pregroove).

At the recordable information storage medium or the re-recordable information storage medium 9, there is formed a mark 141 for showing the recording head position of the continuous recording unit 110 which is the unit of the segment area 305 along the continuous groove (pregroove). A wobbling pattern different than that of a general wobble groove area 143 is formed in advance for the mark 141. Further, in the present embodiment, the pattern differs due to the position within the ECC block. Namely, the pattern at the head position and at the non-head position of the ECC block changes, and therefore, it is a structure in which the ECC block head position can be detected at an even higher speed. Further, a recording preparation area 142 of a length of a wobble period determined in advance, exists adjacent to the mark 141 for recording head positioning.

When recording starts at the continuous data recording unit 110, first, after the mark 141 for recording head positioning is detected, recording is started after a wobble detection signal is counted for the length of the recording preparation area 142.

As shown in FIGS. 8 and 9, in a next-generation recordable DVD-R or a next-generation re-recordable DVD-RAM, recording of the segment unit is possible from immediately after the gap 111. The gap 111 divides the phase offset between the phase of recorded data and subsequent recording data to be recorded by recording processing to be carried out thereafter, and functions to eliminate the effects of phase offset between the before and after data processings. As a result, recording in a unit of segment is possible without recording "border-in" and "border-out" data at the next-generation DVD-R.

In the above-described method, the recording head position of the continuous data recording unit 110 is fixed. However, as shown in FIGS. 10A and 10B, there are cases when the actual length of a continuous data recording unit 110a changes due to irregular rotation of the spindle motor rotating the information storage medium 9, and crosses over the gap 111 and a data overlap portion 116 is generated. Even when the data overlap portion 116 (FIG. 10B) is generated in this way, in the present embodiment, the data of the user data area 303 is not destroyed. This is because, as shown in FIG. 6, the VFO area 312 is always arranged at the head of the segment area 305 (the overlap area 116 is set so as to always be contained within the VFO area 312).

Another embodiment of the present invention which permits the data overlap portion 116 in the worst case as shown in FIG. 10B, is shown in FIGS. 12A to 12E.

As shown in FIG. 12B, the sizes of the VFO areas 334 and 335 are set to be large in advance, and a VFO overlap area 338 (FIG. 12C) is arranged so as to exist even when there is no irregular rotation of the spindle motor. FIG. 12B shows the positional relationship of the time axis direction between data already recorded and data to be newly recorded or re-recorded. Data is newly recorded or re-recorded in this way, and a portion of the VFO area is overlappingly recorded. In this way, the data structure of the present embodiment can be made to coincide with the data structure of a read only area which dose not have the gap 111. This means that the data of the read only area and the recordable or re-recordable area can be reproduced by the same reproduction circuit.

FIGS. 38 and 39 show the method of recording or re-recording in a unit of segment on the recording-type or re-recording-type information storage medium 9.

The recording-type or re-recording-type information storage medium 9 in the present embodiment employs a CLV (Constant Linear Velocity) method. Thus, the angle of the recording position at the segment unit differs in the radial direction of the information storage medium 9.

Accordingly, when a designation of the recording position is received (ST11), the angular position in the rotation direction of the mark 141 for recording head positioning shown in FIGS. 8 and 9 must be estimated (ST12). Further, since information of the PS area 313 and the PA area 311 shown in FIG. 6 is not included in the information inputted from the interface section 42, this data is prepared in a sync code selecting section 47 (ST14).

After rough access, it is determined whether or not the mark 141 for recording head positioning is detected at the estimated angular position on the information storage medium 9 (ST16). On the basis of these results, it is determined whether or not the information reproduction position of the reproduction apparatus has reached the estimated track.

As shown in FIG. 9, the wobble pattern of the pregroove differs due to the position within the ECC block. Thus, the difference in the wobble pattern is detected, and the head position of the ECC block is determined (ST21), and preparations for recording processing are carried out. After the information recording and reproduction section 41 has passed the final end portion of the mark 141 for recording head positioning on the information storage medium 9, the number of wobbles within the recording preparation area 142 is counted, and preparations for recording processing are carried out (ST17). Here, when it has passed the wobble by a predetermined count number, immediately thereafter, recording is carried out for each segment unit (ST18).

It is determined whether or not recording is completed (ST19), and when recording is not completed, the routine returns to step ST16. If recording is completed, the routine moves on to step ST20.

As shown in FIGS. 20A to 20C, the patterns of the PA area 311 and the PS area 313 within the intermediate area 301 are set by a synchronous pattern different than the synchronous code 110 within the physical sector data 5 (see FIGS. 13A to 13E, 14A to 14E, and 15A to 15C). As shown in FIG. 20C, as the synchronous frame position number 115, SY0 to SY3 are used as the synchronous code 110 within the physical sector data 5.

As shown FIG. 2A, SY0 or SY4 is used as the pattern of the PA area 311. Further, when the segment is at the head position of the ECC block, the pattern of SY5 is used as the pattern of the head position of the PS area 313, and when the segment is at a non-head position, the pattern of SY0 is used.

Moreover, in the present embodiment, as shown in FIG. 21B, the specific pattern contents of SY0 to SY3, coincide with the contents shown in FIG. 20C. In the synchronous code arranging method shown in FIGS. 21A to 21C, SY0 is arranged only at one place within one physical sector data 5, and is arranged at the head position of the same physical sector data 5. In this way, there is the effect that the head position of the physical sector data 5 can be easily known merely by detecting SY0. Further, as compared with a conventional DVD-ROM, DVD-R, DVD-RW, and DVD-RAM, the number of synchronous patterns can be reduced to four types which are SY0 to SY3, and the position detecting processing within the physical sector data 5 using the pattern of the synchronous code is simplified.

Further, as shown in FIG. 21C, the synchronous frame 308, which is a data size combining the synchronous code 110 and the synchronous frame data 106 after modulation, is always constant and is 116 channel bits. The fixed-length synchronous frame 308 and the data size of the intermediate area 301 coincide with each other.

In the present embodiment, as shown in FIGS. 22 and 23, combinations of three continuous synchronous codes 110 arbitrarily extracted in FIG. 21A all differ in accordance with the position within the same physical sector data. By using this technique, it is possible to extract not only the position within the same physical sector data 5 using the order of alignment of each synchronous code 110 including the PA area 311, but also the position of the intermediate area 301.

An example of the position detecting method is shown in FIGS. 22 and 23. For example, as shown in FIG. 23, when the order of alignment of SY1→SY→SY1 is detected, it can be found, from the order of alignment shown in FIG. 21B, that the modulated synchronous frame data immediately after SY1 is 106-6. Further, when SY0→SY0→SY1, i.e., SY0 continue continuously two times, it is found, from FIG. 2A or FIGS. 20A to 20C, that the initial SY0 belongs to the intermediate area 301. Further, when SY4→SY0→SY1, i.e., the pattern SY4 which cannot exist within the physical sector data 5 are detected, without investigating the connection of the three patterns, it can immediately be determined that SY4 shows the pattern of the PA area 311 within the intermediate area 301.

Next, with reference to FIGS. 13A to 13E, FIGS. 14A to 14E, and FIGS. 15A to FIG. 31, explanation will be given of the ECC block (FIGS. 13A to 16C), the synchronous frame structure within one physical sector data (FIGS. 17A to 19D), the synchronous code 110 (FIG. 20A), the arrangement example of the synchronous codes within one physical sector (FIG. 21A), and the method of indexing the synchronous frame position within one physical sector data, from the order of alignment of the synchronous frame position identifying code within the synchronous code (FIGS. 22 and 23).

Further, another example of a common data structure recorded on the information storage medium (FIGS. 24, 25, 26, and 27), the structure of a recording system of the information recording and reproduction apparatus (FIG. 28), the structure of a reproduction system of the information recording and reproduction apparatus (FIG. 29), the internal structure of the scrambling circuit (FIG. 30), and the internal structure of the descrambling circuit (FIG. 31) will be described.

The array of the physical sector data 5-0, 5-1, . . . of the information storage medium 9 shown in FIG. 1C is shown in FIG. 13D. One physical sector data includes data 0-0-0, 0-0-1, 0-0-2, . . . as a plurality of rows, and inner-code parities PI 0-0-0, PI 0-0-1, PI 0-0-2, . . . added to the respective rows, and an outer-code parity PO 0-0 added to the next one row after the twelve rows. The other physical sector data have similar data structures. Here, the above-described respective physical sectors are defined as sectors corresponding to logical sector information 103-0, 103-1, 103-3, . . . as shown in FIGS. 13B to 13D. Moreover, the logical sector information is defined as information corresponding to one video pack or audio pack, as shown in FIGS. 13A to 13C. FIG. 13A shows a pack array of video pack 101a, audio pack 102a, . . . , and the like. FIG. 13B shows logical sector information 103-0, 103a-1, 103-2, . . . corresponding to the respective packs.

The contents of the data shown in FIG. 13C is described more detail in FIGS. 14A to 14E. The data 0-0-0 is data corresponding to the first row. The data 0-0-1 corresponds to the next row.

FIG. 14C shows the state in which one logical sector information 103-0 is scrambled, and the scrambled logical sector information is divided into information of 12 rows, and PI information is added to each row (12 rows in this example). Data ID, IED, CPR_MAI are added to the first row. Further, the final row (the 13$^{th}$ row) of the logical sector is PO information.

FIGS. 15A to 15C and 16A to 16C show the relationship between the physical sector data and the ECC blocks. The ECC block is a unit to which an error correction code is added when data is recorded at the information storage medium 9, and is a unit used when data is reproduced from the information storage medium 9 and error correction is carried out.

Figures 15A, 15B, 15C, 15D:
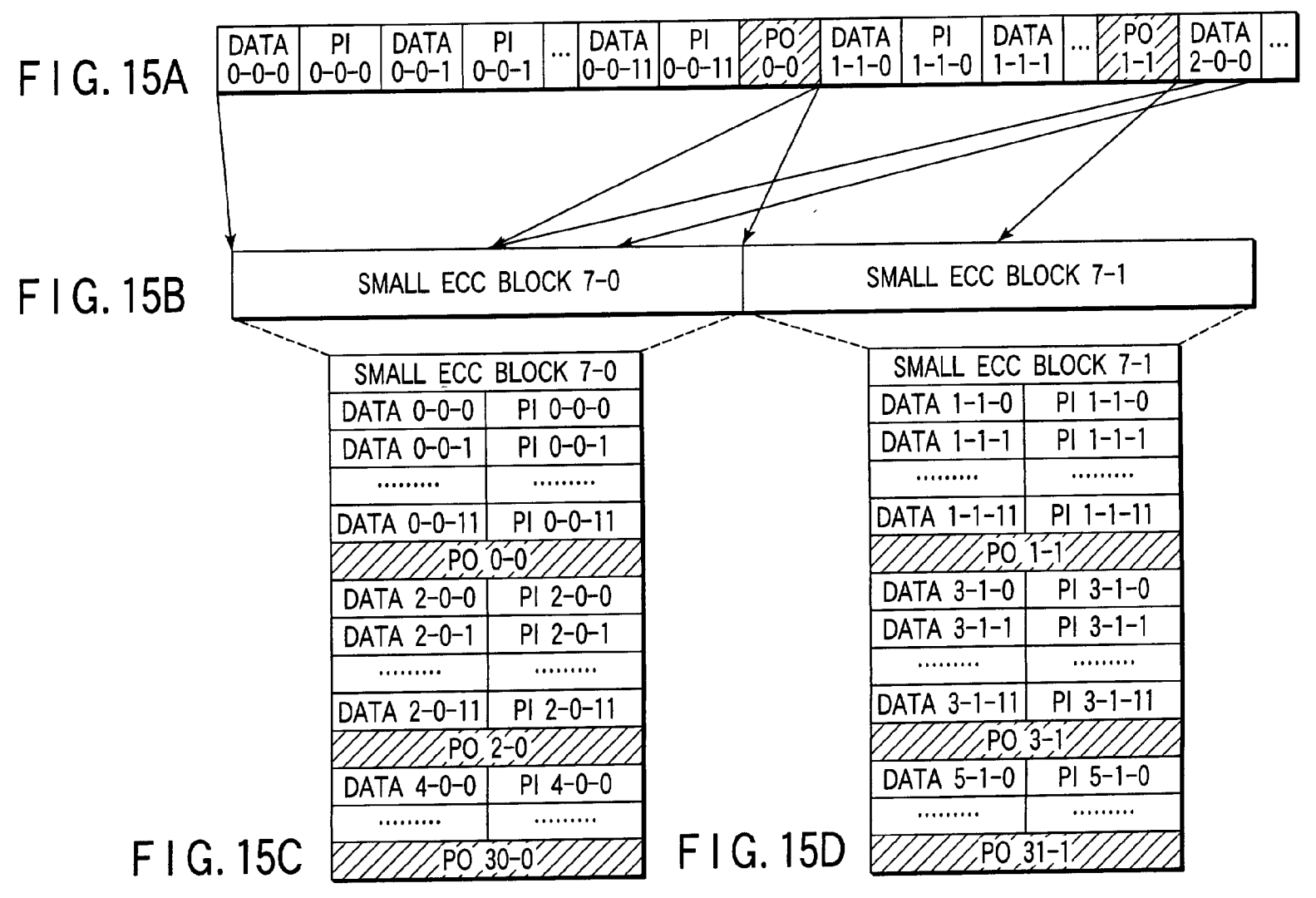

The data array shown in FIG. 15A (corresponding to FIG. 14E and FIG. 1B) shows a state in which it is organized as an ECC block. Every other physical sector data is selected, and is allocated to a first small ECC block 7-0 and a second small ECC block 7-1 (see FIGS. 16A to 16C).

With this example, one physical sector data is formed from 13 rows. Among these, one row is the portion of the PO information. The respective rows of the ECC block are-recorded as data 0-0-0, 0-0-1, 0-0-2, . . . One small ECC block is formed from 31 physical sector data. The 62 physical sector data (the two small ECC blocks) are, for example, divided into even-numbered sector data and odd-numbered sector data. PO information is prepared for each of the blocks by the even-numbered sector data and the blocks by the odd-numbered sector data. The PO information is prepared in units of 1 ECC block organized by a plurality of physical data, and are dispersed one row by one row at the respective physical sectors. Namely, the PO information of 31 rows is prepared in small ECC block units, and the PO information is dispersed one row by one row at the 31 data blocks. One data block contains data of 12 rows.

FIGS. 17A to 17D, 18A to 18C, and 19A to 19D are diagrams explaining the structure of a synchronous frame within one physical sector data.

The sector block (corresponding to data of 13 rows (including the one row of PO information) shown in FIG. 17C is divided into synchronous frame data 105-0, 105-1, . . . (there are 26 (13×2) altogether), as shown in FIG. 17D. A synchronous code to be described later is added between the synchronous frame data. Namely, a synchronous code is added to the head of each synchronous frame data.

Namely, as shown FIGS. 18A and 18B, a synchronous code 110 is inserted between the synchronous frame data 106. As shown in FIG. 19C, the synchronous code 110 is formed from, for example, a variable code area 112, a fixed code area 111, and a variable code area 113. Each area has contents such as shown in FIG. 19D.

A description of the data structure is as follows.

As shown in FIG. 17A, image data is recorded on the information storage medium 9 in the form of video pack 101 and audio pack 102 in 2048-byte units. The 2048-byte recording unit is treated as logical sector information 103, as shown in FIG. 17B.

In current DVD specifications, data ID 1-0, IED 2-0, CPR_MAI 8-0 are added to this data. Data, to which is added PI (Parity of Inner-code) information and PO (Parity of Outer-code) information corresponding to the ECC structure shown in FIGS. 16A to 16C, is equally divided into 26 portions, so as to form synchronous frame data 105-0 to 105-25, as shown in FIG. 17D. In this case, the PO information also is divided in two. As shown in FIG. 17C, the PO information is divided in two and shows as PO 0-0-0 and PO 0-0-1.

Each synchronous frame data 105 is modulated, and as shown in FIG. 19A, synchronization codes 110 are inserted between the modulated synchronous frame data 106. The method of modulation is generally expressed by (d,k; m,n). These letters mean that original data of m bits is converted into n channel bits, and the number of continuous "0"s is d (at minimum) and k (at maximum).

The present embodiment shows a case where the modulation method shown in U.S. Pat. No. 6,300,886 is employed. In this modulation method, d=1, k=9, m=4, and n=6.

The synchronization code 110 is divided into the fixed code area 111 and the variable code areas 112 and 113, and the variable code areas 112 and 113 are structured so as to be more finely divided into a recording position of a conversion table selection code 122 at modulation, a recording position of a synchronous frame position identifying code 123, and a recording position of a DC suppressing polarity reversing pattern 124 (partially including combination/sharing of recording positions), as shown in FIG. 19D.

Modulation here means converting input data into modulation data in accordance with the above-described modulation rule. In this case, for the conversion processing, a method is used of selecting modulation data corresponding to the input data, from among the large number of modulation data recorded in the conversion table. Here, a plurality of conversion tables are prepared. Accordingly, information, expressing that the modulation data is modulation data converted by using which table at the time of modulation, is needed. This information is the conversion table selection code 122 at modulation. This shows the conversion table which generates the modulation data which will come next of the modulation data immediately before the synchronization code.

The synchronous frame position identifying code 123 is a code for identifying the frame of which position within the physical sector is the synchronous frame. In order to identify the frame, the frame can be identified by an arrangement pattern of a plurality of synchronous frame position identifying codes before and after.

An example of specific contents of the synchronous position detecting code 121 is shown in FIGS. 20A to 20C.

A code, which cannot exist within the synchronous frame data 106 after modulation, is arranged within the synchronous position detecting code 121 in order to facilitate detection of the position of the synchronous code 110. Because the modulated synchronous frame data 106 is modulated in accordance with the (d,k; m,n) modulation rule, it is not possible that k+1 "0"s are continuous within the modulated data. Accordingly, it is preferable to provide a pattern, in which k+1 or more "0"s are continuous, as the pattern within the synchronous position detecting code 121.

However, if a pattern, in which k+1 or more "0"s are continuous, is provided as the pattern within the synchronous position detecting code 121, at the time of reproduction of the modulated synchronous frame data 106, when one bit shift error arises, there is the fear that it will be misdetected as the synchronous position detecting code 121. Accordingly, it is preferable to provide a pattern, in which k+2 "0"s are continuous, as the pattern within the synchronous position detecting code 121. However, if the pattern in which the "0"s are continuous continues for too long, a phase offset at the PLL circuit 174 easily arises.

In current DVDs, a pattern in which k+3 "0"s are continuous is utilized (the modulation rule for current DVDs is (2,10; 8,16). Accordingly, in order to suppress the occurrence of bit shift errors and ensure the reliability of synchronous code position detection and information reproduction more than in current DVDs, the length by which "0"s are continuous in the present embodiment must be k+3 or less, and preferably k+2.

As is shown in FIG. 8 of U.S. Pat. No. 6,229,459 and the explanatory description thereof, the DSV (Digital Sum Value) value changes due to the modulated bit pattern. If the DSV value is greatly offset from 0, the DSV value can be made to approach 0 by changing the bit from "0" to "1" at the optimal bit pattern position.

Accordingly, the DC suppressing polarity reversing pattern 124, having a specific pattern for making the DSV value approach 0, is provided within the synchronous code 110.

Further, when the modulation method shown in U.S. Pat. No. 6,300,886 is used, the following must be considered. Namely, demodulation of the 6 channel bits which are the object of demodulation must be carried out by using the "selection information of the conversion table used when modulating the 6-channel bit modulated data" existing immediately after the 6-channel bit modulated data which is the object of demodulation.

Accordingly, the selection information of the conversion table of the 6 channel bits which should come after the final 6 channel bits of the modulated synchronous frame data 106 arranged immediately before the synchronous code 110, are recorded within the "conversion table selection code 122 at modulation" of the head within the synchronous code 110. Namely, the conversion table selection code 122 at modulation exists within the synchronous code 110.

This conversion table selection code 122 at modulation is conversion table selection information for the 6 channel bits which should come after the final 6 channel bits of the immediately previous modulated synchronous frame data 106. By referring to this conversion table information, the conversion table which should be used can be determined at the time of demodulating the next data.

Next, a specific example of the synchronous code 110 will be described.

FIGS. 20A to 20C show a specific example of the synchronous code 110. The synchronous code 110 has the variable code area 112 and the fixed code area 111. In the variable code area 112 is arranged the data structure shown in FIGS. 19A to 19D in which the conversion table selection code 122 at modulation, the synchronous frame position identifying code 123, and the DC suppressing polarity reversing pattern 124 are integral.

For example, 0 to 5 are prepared as numbers for synchronous frame position identification. The numbers 0 to 5 correspond to the syncs YS0 to YS5. In order to express the modulation table selection code at the time of modulation, a conversion table number 116 is prepared. For the pattern when the conversion table number=1 and the pattern when the conversion table number=0, the respective cases are broadly classified and patterns A and B for DC suppression are prepared.

For example, with this example, when 8 channel bits are allotted and the synchronous frame expresses synchronous frame SY0, "10000000", or "10000000", or "00010000", or "00010010" exists as the synchronous code. This means that, when it is "10000000", conversion table number=0 is used, and when it is "00010000" or "00010010", conversion table number=1 is used. This synchronization pattern is selected and used in accordance with the DSV.

For example, 16 channel bits are allotted, and the synchronous position detecting code 121 is "1000000000000100".

The mode of selection of the synchronization pattern used in the intermediate area 301 is explained with reference to FIG. 1C.

Namely, according to the present embodiment, a synchronous pattern, which is different from the synchronous code 110 within the physical sector data 5, is set as the synchronous pattern of the PA area 311 and the PS area 313 within the intermediate area 301. As shown in FIG. 20C, as the synchronous frame position number 115, SY0 to SY3 are used as the synchronous code 110 within the physical sector data 5.

As shown in FIG. 2A, SY0 or SY4 is used as the synchronous pattern of the PA area 311. Further, as the head pattern of the PS area 313, the pattern of SY5 is used when the corresponding segment is the head position of the ECC block, and the pattern of SY0 is used when it is not the head position.

FIGS. 21A to 21C show an arrangement example of the synchronous code within one physical sector data.

The synchronous code is 24 channel bits as the total of the synchronous pattern of the 8 channel bits and the synchronous position detecting code 121 of 6 channel bits, as described previously. One row of the modulated synchronous frame data is 1092 channel bits. FIG. 21B makes it easy to see the synchronous code position, by rearranging the modulated frame data 106-0, 106-1, in a matrix form, within the data array of FIG. 21A (the same as the data array of FIG. 19A). The channel bit length of the synchronous code and modulated synchronous frame data is synchronous frame 308 (a fixed length of 116 channel bits) (this state is shown in FIG. 2C as well).

The specific pattern contents of SY0 to SY3 shown in FIG. 21B are selected from the pattern shown in FIG. 20C. According to the synchronous code arranging method shown in FIG. 21B, SY0 is arranged only at one place within 1 physical sector data 5, and is arranged at the head position of the same physical sector data 5.

In this way, there is the effect that, by merely detecting SY0, the head position of the physical sector data 5 can easily be known. Further, the number of the synchronous pattern is reduced to the four types which are SY0 to SY3, as compared with a current DVD-ROM, DVD-R, DVD-RW, and DVD-RAM, and position detection processing within the physical sector data 5 can be carried out by using the pattern of the synchronous code. Thus, the position detecting processing is simplified.

Further, as shown in FIG. 21C, the synchronous frame 308, which is a data size combining the synchronous code 110 and the modulated synchronous frame data 106, is always constant and is 1116 channel bits. Further, the fixed-length synchronous frame 308 and the data size of the intermediate area 301 coincide with each other.

Next, with reference to FIGS. 22 and 23, explanation will be given of the method of detecting the synchronous code and determining at what position within the physical sector the currently reproduced data is at.

As shown in FIG. 22, the modulated synchronous data reproduced by the information recording and reproduction section 41 from the information storage medium is supplied to the synchronous code position extracting section 45, and is made to be the object of synchronous code position detection. At the synchronous position extracting section 45, the position of the synchronous position detecting code 121 (the code of the fixed code area in FIG. 20A) is detected by, for example, a pattern matching method.

In this way, the synchronous code position can be detected, and the synchronous code can be extracted. The information of the detected synchronous code 110 is, via the control section 43, successively held in a memory section 137 as shown in FIGS. 22 and 23. When the position of the synchronous code 110 is known, the position of the modulated synchronous frame data is also known. Therefore, the synchronous frame data is successively stored in the shift register circuit 170 as shown in FIG. 22.

By inspecting the order of alignment of the synchronous code, it can be determined at what position of the matrix system of FIG. 21B the modulated synchronous frame data is at. This is because the synchronous code is arranged in the pattern shown in FIG. 21B (SY0→SY1→SY1→SY1→SY2→SY1→SY1→SY3→SY1→SY2→SY2→SY1→SY3→SY2→SY1→SY2→SY3→SY3→SY3→SY2→SY2→SY2→SY3→SY2→SY3→SY1).

Combinations of three continuous synchronous codes 110 arbitrarily extracted in FIG. 23 all differ in accordance with the position within the same physical sector data. By using this feature, it is possible to extract not only the data position within the same physical sector data 5 using the order of alignment of each synchronous code 110 including the PA area 311, but also the data position within the intermediate area 301.

An example of the position detecting method is shown in FIG. 22. For example, as shown in FIG. 23, when the order of alignment of SY1→SY3→SY1 is detected, it can be known, from the order of alignment shown in FIG. 21B, that the modulated synchronous frame data immediately after SY1 is 106-6.

Further, when SY0→SY0→SY1 is detected, i.e., SY0 continue continuously two times, it is known that the agreement shown in FIG. 2A, or the initial SY0 from the information of FIG. 20C, belongs to the intermediate area 301. Further, when SY4→SY0→SY1 is detected, i.e., SY4 which cannot exist within the physical sector data 5 is detected, without investigating the connection of the three patterns, it can immediately be determined that SY4 shows the pattern of the PA area 311 within the intermediate area 301.

Further, when the order of alignment of SY0→SY1→SY1 is detected, it is known, from the order of alignment shown in FIG. 21B, that the modulated synchronous frame data immediately after SY0 is 106-1.

Next, another example of the pre-modulation sector data being scrambled will be shown.

Description will be given with the physical sector data being scrambled as shown in FIGS. 13A to 13E and 14A to 14E. In the example shown in FIG. 14C, data ID, IDE, CPR_MAI of the head of the physical sector data are shown as not being scrambled.

Figure 24:
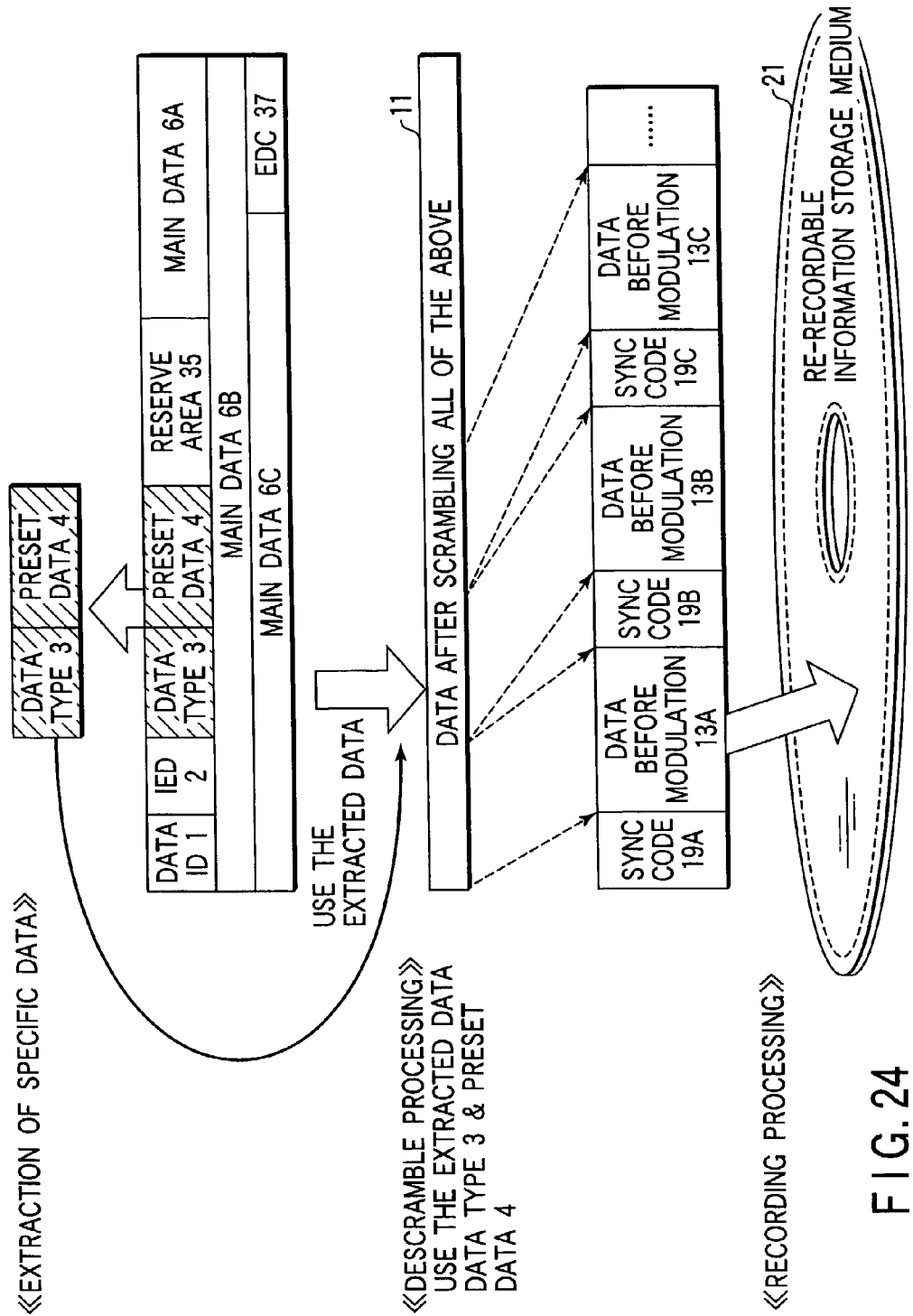
FIG. 24 is an explanatory diagram showing a method of scrambling processing of data to be recorded on the information storage medium according to the embodiment of the present invention.

However, as shown in FIG. 24, all of data ID 1, IED 2, specific data (e.g., data type 3, preset data 4), and main data (including EDC) may be subjected to scrambling processing.

In the example of FIG. 24, specific data (e.g., data type 3, preset data 4) is used as the initial data for executing the scrambling. The specific data is extracted from the main data (sector data). The extracted specific data is used as is as the initial value (or trigger) of the scrambling circuit, and scrambling processing is carried out, and all of the main data (sector data) are scrambled. The scrambled data is modulated in accordance with a predetermined modulation rule, and then, the above-described synchronous code is added. Data, for which this processing is carried out, is recorded onto the re-recordable information storage medium 21.

Figure 25:
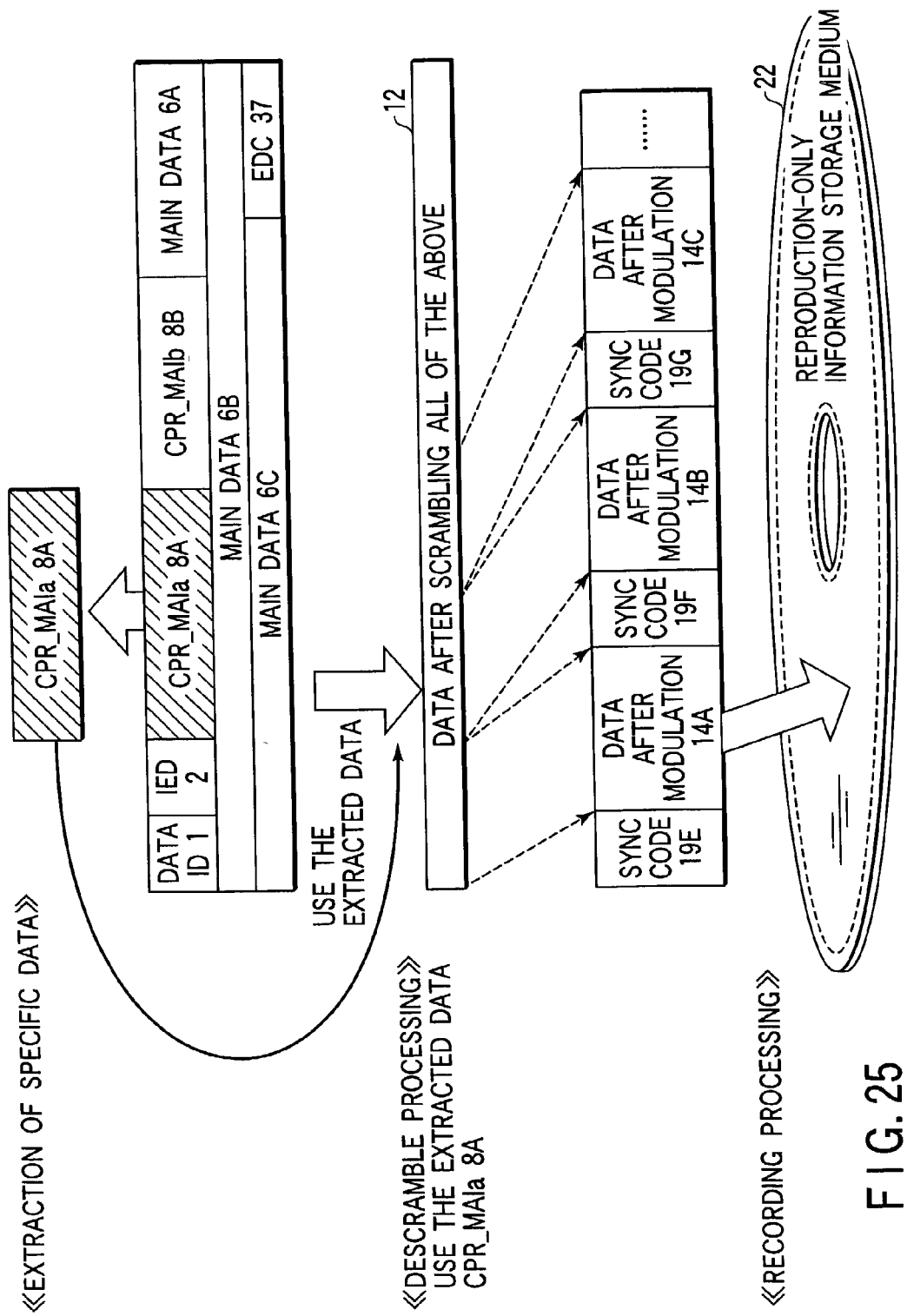
FIG. 25 is an explanatory diagram showing a method of scrambling processing of data to be recorded on the information storage medium according to the embodiment of the present invention.

FIG. 25 is an example in which the aforementioned specific data is replaced by CPR_MAI (copyright managing information) 8a. This is because, at a DVD-ROM, this CPR_MAI is used at the portion of the specific data. Other processings are the same as the example of FIG. 24.

Figure 26:
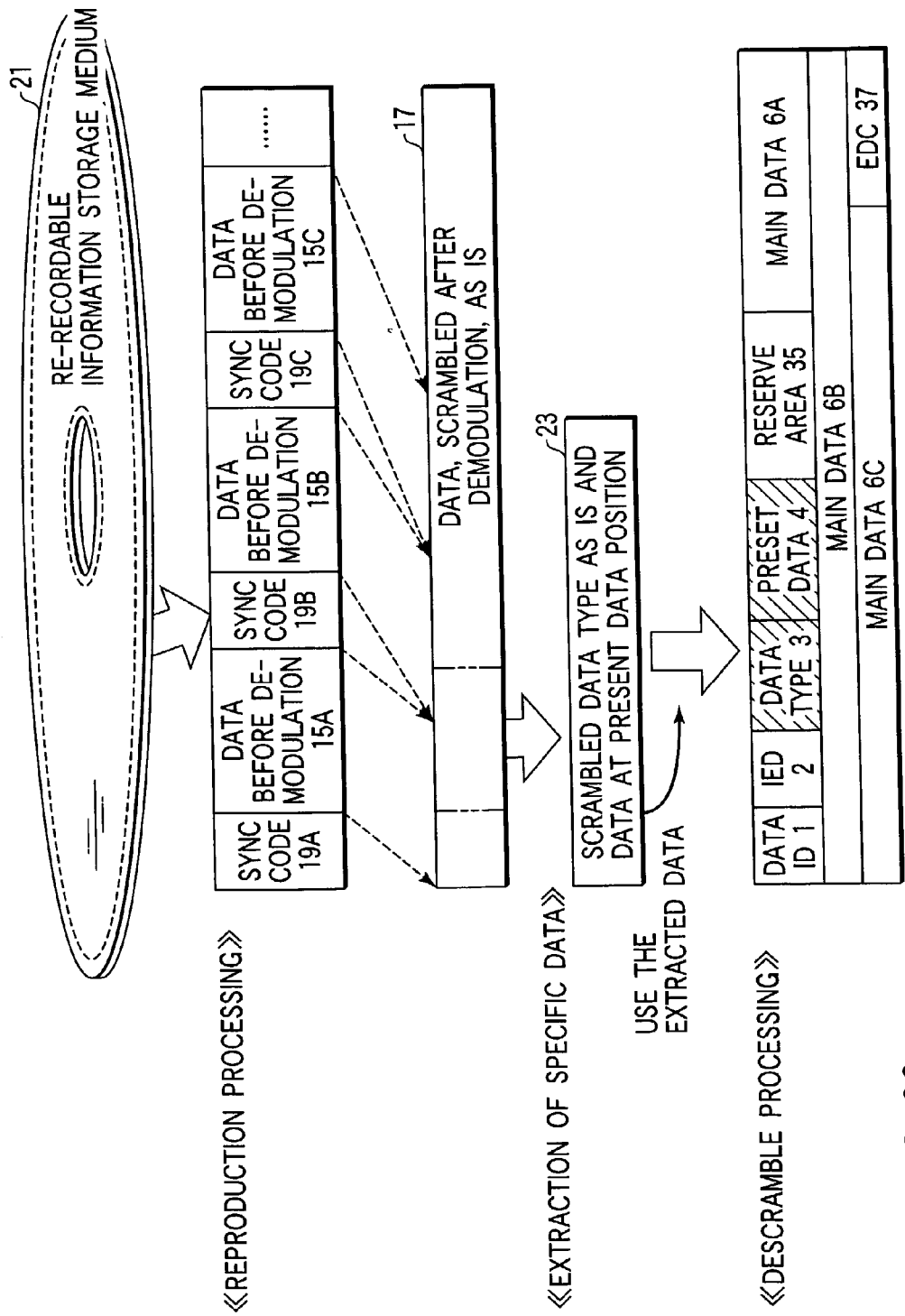
FIG. 26 is an explanatory diagram showing a method by which data recorded on the information storage medium according to the embodiment of the present invention is subjected to descrambling processing.

FIG. 26 is for explanation of the processes in the reproduction processing corresponding to the recording processing of FIG. 24. The data reproduced from the re-recordable information storage medium 21 is formed from the synchronous codes 19a, 19b, 19c, . . . and pre-demodulated data 15a, 15b, 15c, . . . . As described previously, the synchronous codes and the pre-modulated data are separated, and the pre-modulated data is collected. The collected pre-modulated data is demodulated in accordance with a predetermined demodulation rule, and is collected as data 17 which is scrambled as is. As explained in FIG. 24, the specific data is scrambled and contained in the data 17. This scrambled specific data is extracted from a predetermined position arranged in advance. The descrambling section uses the specific data scrambled as is, and descrambles the data 17 scrambled as is as shown in FIG. 26. Due to the descrambling processing, it is made to be data which is the same as the data shown in FIG. 24 (the original data is reproduced).

Figure 27:
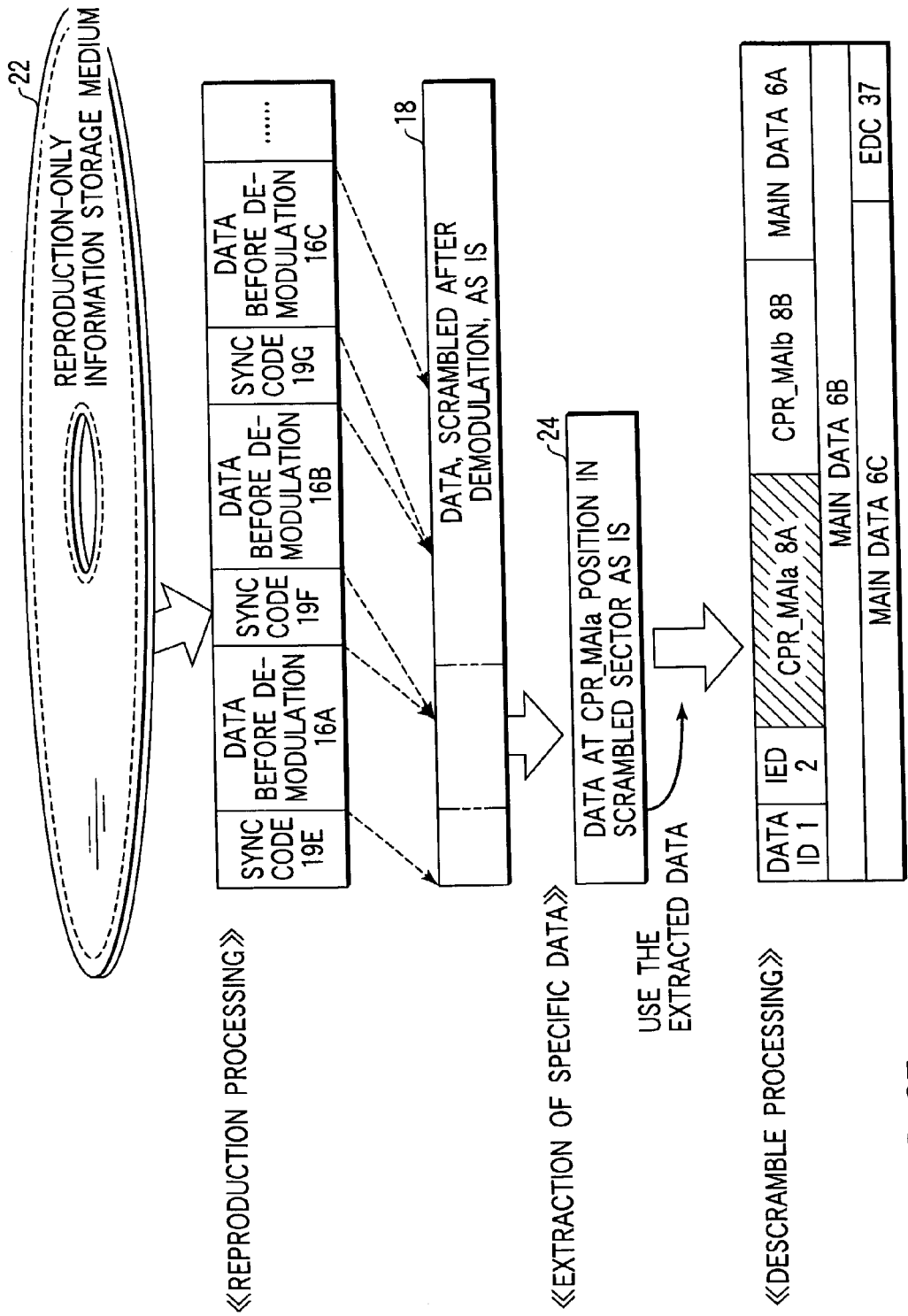
FIG. 27 is an explanatory diagram showing a method by which data recorded on the information storage medium according to the embodiment of the present invention is subjected to descrambling processing.

FIG. 27 is for explanation of the processings in the reproduction processing corresponding to the recording processing of FIG. 25. In this example, the aforementioned specific data is merely replaced by CPR_MAI (copyright managing information) 8a. This is because, at a DVD-ROM, this CPR_MAI is used at the portion of the specific data. Other processings are the same as the example of FIG. 26.

FIG. 28 shows blocks relating to the recording system in particular, in an information recording and reproduction apparatus. This is a block diagram explaining the structure of an information recording system with respect to a re-recordable information storage medium or a read only information storage medium.

Main data for recording (source data or user data) is supplied to a predetermined information adding section 68 via the interface section 42. At the predetermined information adding section 68, the source data is finely divided in a unit of sector, and the finely divided source data is array-stored in the main data 6 portion of FIG. 24 or FIG. 25.

When the medium used in recording is the re-recordable information medium 21, at the predetermined information adding section 68, the ID 1, IED 2, data type 3, present data 4, and reserve area 5 of that sector are added before the main data 6 portion, and the EDC 7 is added after the main data 6 portion. The ID 1 added at this time is obtained from a data ID generating section 65, and the preset data 4 is obtained form a preset data generating section 66. The preset data generating section 66 has a "random number generating function", and can always generate a time-varying random number as the preset data 4. Note that the preset data generating section 66 can also separately generate the lower n bits of the preset data, and sends them to the synchronous code selecting section 46 as one portion of the generated lower n bit synchronous code selection key.

On the other hand, when the medium used in recording is the read only information medium 22, at the predetermined information adding section 68, the ID 1, the IED 2, and the copyright managing information 8 (8a and 8b) of that sector are added before the main data 6 portion, and the EDC 7 is added after the main data 6 portion. The ID 1 added at this time is obtained from the data ID generating section 65, and the copyright managing information 8 (8a and 8b) is obtained from a copyright managing information data generating section 67. Note that the copyright managing information data generating section 67 can also separately generate the lower n bits of the copyright managing information, and sends them to the synchronous code selecting section 46 as one portion of the generated lower n bit synchronous code selection key.

Note that, in the present embodiment, the "n" of the lower n bits is selected from the range of 1 to 8 bits.

The sector data of the data structured shown in FIG. 24 generated at the predetermined information adding section 68 is supplied to a data arrangement portion exchanging section (or data extracting section) 63. The data arrangement portion exchanging section 63 extracts the specific data form the sector data which is supplied in.

The extracted specific data and the entire sector data are supplied to a scrambling circuit 57. The scrambling circuit 57 carries out sampling processing on the entire sector data from the sector head to the sector tail.

The sector data subjected to scrambling processing in this way is successively supplied to an ECC encoding circuit 61. The ECC encoding circuit 61 ECC encodes a predetermined number of the input sector data (e.g., sector data of from 16 sectors to 32 sectors).

The ECC-encoded data is supplied to a modulation circuit 51. The modulation circuit 51, while obtaining necessary information from the conversion table for modulation 53, carries out a predetermined modulation (e.g., 8/16 modulation or the like, although the modulation is not limited to this method) on the data which is supplied to. The modulated data is supplied to a data synthesizing section 44.

The value of the digital sum value (DSV) therefor is calculated at a DSV value calculating section 48 for the modulated data (e.g., 6 channel bits) of the end portion of each sector among the modulated data supplied to the data synthesizing section 44. The calculated DSV value is supplied to a synchronous code selecting section 46.

The synchronous code selecting section 46 selects a specific (optimal) synchronous code from the plural types of synchronous code tables recorded in the synchronous code selection table recording section 47, on the basis of the DSV value calculated at the DSV value calculating section 48, and either the lower n bit data from the preset data generating section or the lower n bit data from the data generating section 67 of the copyright managing information.

Note that, in the present embodiment, four or more types (e.g., eight types) of synchronous code tables for the synchronous code (19a or 19e) at the same place within the sector (e.g., the head position) may be prepared. In this way, a plurality of types (e.g., eight types) of the bit pattern of the synchronous code coming to the head position of each sector (33 or 34) can be used.

The synchronous code within the synchronous code table selected from the synchronous code table recording section 47 by the synchronous code selecting section 46, is, at the data synthesizing section 44, arranged alternately with the modulation data from the modulation circuit 51.

The data which is structured in this way is recorded to a re-recordable information medium 21 (a RAM disk, a RW disk or the like using a change of phase recording method).

On the other hand, when the synthesized data is for a read only information medium, the data is (a) cut at an original plate for ROM disk copying by an original plate recording section of a ROM disk, or (b) printed onto an R disk (a disk using pigment whose reflectance of the recording laser irradiated portions permanently changes) for exclusive use for reproducing after once being recorded, by the information recording and reproduction section 41.

The operation of each block element of the above-described apparatus is controlled in accordance with a control program recording in the ROM within the control section 43, by using the ROM therein as a work area, by an MPU therein.

FIG. 29 is a block diagram for explanation of the structure of an information reproduction system for a re-recordable information storage medium or a read only information storage medium.

In the data structure immediately after reproduction from the information storage medium (21 or 22) from the information recording and reproduction section (or reproduction section not having a recording function) 41, in the case of the example of FIG. 26 for example, pre-modulated data 15a, 15b, . . . and synchronous codes 19a, 19b, 19c, . . . are arranged so as to be mixed together. The reproduced data immediately-after reproduction by the reproduction section 41 is supplied to a synchronous code position detecting/extracting section 45 and a demodulation circuit 52.

The synchronous code position detecting/extracting section 45 uses a pattern matching method, and searches for and detects the synchronous code at the head position of each sector from the reproduced data immediately-after reproduction. After the synchronous code of the head position is detected, the following synchronous code within that sector is also detected and extracted.

The information of the extracted synchronous code is supplied to the demodulation circuit 52. Due to the information of the synchronous code from the synchronous code position detecting/extracting section 45, the demodulation circuit 52 knows the sector head position of the reproduction data from the reproduction section 41, and can also know the synchronous code position within that sector.

Within the demodulation circuit 52, the synchronous code included in the sector is deleted by the synchronous code information from the synchronous code position detecting/extracting section 45. After deletion, the post-modulated data (this is 8/16 modulated) remaining within the sector is demodulated on the basis of demodulation information from a conversion table for modulation 54.

The data demodulated at the demodulation circuit 52 is supplied to the descrambling circuit 58 and the ECC decoding circuit 62. The descrambling processing is explained in FIGS. 26 and 27.

Namely, information of specific data is within a predetermined range of descrambled data. The descrambling circuit 58 first descrambles the data ID, IED portions by using the specific data which is scrambled. The descrambled data ID, IED are extracted at a data ID portion & IED portion extracting section 71. The data ID portion & IED portion extracting section 71 sends the data ID, IED to the control section 43. The control section 43 monitors the successively obtained data IDs.

The MPU of the control section 43 can carry out detection of off-track by the information contents of descrambled ID 1.

When it is detected that there is off-track, reading of information is carried out again within a short period.

The data demodulated at the demodulation circuit 52 is supplied to the ECC decoding circuit 62 as well. The ECC decoding circuit 62 groups together a predetermined number (16 or 32) of sectors into one ECC block, ECC decodes the ECC encoded data, and thereafter, sends it to the descrambling circuits 58 and 59.

At the descrambling circuit 59, descrambling of the entire main data portion is carried out. At this time, the specific data extracted before is used scrambled as is. This processing is carried out when it is detected that there is no off-track.

Note that the identification as to whether the used medium is the re-recordable information medium 21 or the read only information storage medium 22 can be carried out by using medium identifying information (not shown) recorded on a specific portion of the medium (the inner peripheral portion at a disk medium).

The data after descrambling processing is supplied to a data arrangement portion exchanging section 64. The data arrangement portion exchanging section 64 sends, to the data ID portion & IED portion extracting section 71, the specific data within the data after descrambling processing which has been sent in.

The data ID, IED in the descrambled-processed data are detected by the data ID portion & IED portion extracting section 71, and the data ID after error checking is extracted. The main data 6 of a fixed length is extracted by the main data extracting section 73 from the head position of each obtained sector data, and is supplied to the exterior via an interface section 42.

The operations of the respective block elements of the apparatus of FIG. 29 are controlled in accordance with a control program recorded into the ROM inside the control section 43, and by using the RAM therein as a work area, by the MPU therein. Further, the data processing explained in FIGS. 32 to 39 is also carried out in accordance with a control program.

Next, specific examples of the scrambling circuit and the descrambling circuit will be described.

FIG. 30 shows the scrambling circuit 57, and FIG. 31 shows the descrambling circuit 58.

The bit array which is the object of scrambling is processed bit-by-bit in units of 8 bits (1 byte).

The scrambling circuit 57 comprises an 8-bit shift register circuit 91, an 8-bit switch array 93 having a predetermined on/off pattern, and an adding circuit array 95 selectively connected to respective bits r0 to r7 of the shift register circuit 91 via the switch array 93.

The shift register circuit 91 is initially cleared (CLR), and in a state in which there is no input A to the data port (DATA), all of the bits r0 to r7 become "0". The shift register circuit 91 receives, bit-by-bit, the input to the data port DATA at a clock timing of a predetermined clock (CK), and fetches the received bit data while successively bit shifting from bit r0 to r7.

The adding circuit array 95 has seven serially connected 1-bit address connected selectively to the bits r0 to r7 of the shift register circuit 91, and a final-stage 1-bit address (the right end of the array 95) which 1-bit-adds the cumulative added results of the one-bit-adders and the scramble input A, and outputs them. Scramble results (scramble data 11a) is outputted from this final-stage 1-bit-adder.

Note that the on/off pattern of the switch array 93 is the same as the on/off pattern of the switch array 93 of the scramble circuit 59 shown in FIG. 31. This on/off pattern becomes one type of key information for the scrambling/descrambling processing.

The scramble circuit 57 works as follows with respect to input data shown in FIG. 24 or FIG. 25.

<Case of Input Data Shown in FIG. 24>

First, from the head of the specific data (the initial 8 bits of the data type 3 and the preset data 4) extracted from the sector data which is to be scrambled, it is supplied to the data port DATA of the shift register circuit 91 via the final-stage 1-bit-adder (right end of the array 95). This specific data SD-A (a 0/1 bit array of 8 bits) is, bit-by-bit from the head thereof, synchronized with the timing of the clock CK, and fetched successively to bits r0 to r7 of the shift register circuit 91.

The respective bits r0 to r7 of the shift register circuit 91 are connected to the adding circuit array 95, which is formed from eight serially connected 1-bit-adders, via the 8-bit switch array 93 having a predetermined on/off pattern. The adding circuit array 95 1-bit-adds (binarily adds), in real time and cumulatively, the 1-bit data ("0" or "1") which is set (cleared if before setting) at the shift register bits of positions which are on (e.g., bits r7, r5, r3, r1) among the switch array 93, and inputs the added results ("0" or "1" of 1 bit) to the final-stage 1-bit adder (1-bit adder to which the input A is given). The output of the final-stage 1-bit adder (1-bit added result) is the bit of the initial scrambling result with respect to the input A, and is the head of the specific data of scrambled data 11a.

Similarly, synchronously with the timing of the clock CK, the data bits before scrambling are, serially and bit-by-bit, fetched at the shift register 91. Synchronously therewith and in parallel thereto, the scrambled data bits are, serially and bit-by-bit, outputted from the final-stage 1-bit adder of the adding circuit array 95. When output of the initial 8-bit scrambled data is completed in this way, immediately without a break, the next 8 bits are similarly scrambled, and the scrambled data bits are outputted from the final-stage 1-bit adder of the adding circuit array 95. Thereafter, similarly, the following data (ID 1 and thereafter) is scrambled in predetermined units (8 bits, i.e., 1 byte), and is supplied to the ECC encoding circuit 61 as scrambled data 11a.

Among the 0/1 bit array of the 8-bit (1-byte) unit obtained serially in this way, the portion corresponding to the specific data structured by the initial, predetermined number of bytes (e.g., 1 byte) is used as the trigger of the scrambling. Because this is not needed as recording information, it is discarded (or ignored) in the recording processing after. Because contents which are the same as the discarded portion corresponding to the specific data are included in the scrambled data thereafter as well, they can be discarded.

<Case of Input Data Shown in FIG. 25>

The circuit operations themselves of the scrambling circuit 57 are the same as in the case of input data shown in FIG. 24. However, in the case of input data shown in FIG. 24, the trigger for scrambling is included in the time-variable data (the preset data 4), whereas, the case of input data shown in FIG. 25 differs in that the trigger for scrambling is fixed data (copyright managing information CPR_MAI). Because the triggers for scrambling are different for input data shown in FIG. 24 and input data shown in FIG. 25, even if the same scrambling circuit is used, the scrambled data 11a with respect to the input data shown in FIG. 24 and the scrambled data 11b with respect to the input data shown in FIG. 25 are different bit arrays.

In the scrambling circuit 57 of FIG. 30, the adding circuit array 95 does not form a processing loop (the added result of the final-stage 1-bit adder is not fed-back to another adder input). Thus, even if an error arises for some reason in the scrambling processing, that error does not extend to more than 8 bits. Namely, because the error propagation distance is limited to 8 bits, the reliability in the scrambling circuit operation improves.

FIG. 31 is a circuit diagram showing an example of the descrambling circuit 58. Here, in the same way as the scrambling circuit 57, the bit array which is the object of descrambling is processed bit-by-bit in units of 8 bits (1 byte).

The descrambling circuit 58 comprises the 8-bit shift register circuit 91, the 8-bit switch array 93 having a predetermined on/off pattern (the same as the on/off pattern of the switch array 93 of FIG. 30), and the adding circuit array 95 selectively connected to the respective bits r0 to r7 of the shift register circuit 91 via the switch array 93.

The shift register circuit 91 is initially cleared CLR, and in a state in which there is no input to the data port DATA, all of the bits r0 to r7 become "0". The shift register circuit 91 receives, bit-by-bit, the input to the data port DATA at the clock timing of the predetermined clock CK, and fetches the received bit data while successively bit shifting from bit r0 to r7.

The adding circuit array 95 has eight serially connected 1-bit adders connected selectively to the bits r0 to r7 of the shift register circuit 91. The descrambled bit array is inputted bit-by-bit from the head thereof to an initial-stage 1-bit adder (right end of the array 95) selectively connected to bit r0. Cumulative added results of the 1-bit adders of the adding circuit array 95 are outputted from the initial-end 1-bit adder (the left end of array 95). The bit array of the descrambled results formed of ID 1, IED 2, CPR_MAIb 8b, and main data 6a or ID 1, IED 2, reserve area 35, and main data 6a is obtained from the final-stage 1-bit adder.

<Case of the Data 17 Shown in FIG. 26 Being Descrambled>

The descrambling circuit 58 of FIG. 31 operates as follows with respect to scrambled data 17.

The scrambled data type and the data 23 of the position of the preset data, and the scrambled data 17 are input to the data port DATA of the shift register circuit 91 successively. This data (a 0/1 bit array of 8 bits) is, synchronously with the timing of the clock CK, fetched successively and bit-by-bit from the head thereof at the bits r0 to r7 of the shift register circuit 91.

The bits r0 to r7 of the shift register circuit 91 are connected to the adding circuit array 95, which comprises 8 serially-connected 1-bit adders, via the 8-bit switch array 93 having the same on/off pattern as the switch array 93 of FIG. 30. The adding circuit array 95 1-bit-adds (binarily adds), cumulatively and in real time, the 1-bit data ("0" or "1") set at the shift register bit of the position which is on among the switch array 93, and outputs the added results ("0" or "1" of 1 bit) from the final-stage 1-bit adder (the 1-bit adder of the left end to which the register r7 is connected). The output of the final-stage 1-bit adder (1-bit added results) is the descrambled data.

Similarly, synchronously with the timing of the clock CK, the data bits before descrambling are, serially and bit-by-bit, fetched at the shift register 91, and input to the initial-stage 1-bit adder at the right end of the adding circuit array 95. Synchronously with the timing of the clock CK, the descrambled data bits are, serially and bit-by-bit, outputted from the final-stage 1-bit adder of the adding circuit array 95. When output of the initial 8-bit descrambled data is completed in this way, immediately without a break, the next 8 bits are similarly scrambled, and the scrambled data bits are outputted from the final-stage 1-bit adder of the adding circuit array 95. Thereafter, similarly, the following data is descrambled in predetermined units (8 bits, i.e., 1 byte), and the descrambled output A is obtained.

Among the 0/1 bit array of the 8-bit (1-byte) unit obtained serially in this way, the portion corresponding to the specific data structured by the initial, predetermined number of bytes (e.g., 1 byte) is used as the cue for starting descrambling processing. Because this is not needed as reproduction information, it is discarded (or ignored) in the recording processing after. Because contents which are the same as the discarded portion corresponding to the specific data (SD-A) are included in the scrambled data thereafter as well, they can be discarded.

<Case of the Data 18 Shown in FIG. 27 Being Descrambled>

The circuit operations themselves of the descrambling circuit are the same as in the case of data 17. However, in the case of data 17, the trigger for the descrambling is included in the time-varying data (preset data 4), whereas the case of data 18 differs in that the trigger for descrambling is fixed data (copyright managing information CPR_MAI).

In this descrambling circuit as well, the adding circuit array 95 does not form a processing loop (the added result of the final-stage 1-bit adder is not fedback to another adder input). Thus, even if an error arises for some reason in the descrambling processing, that error does not extend to 8 bits or more. Namely, because the error propagation distance is limited to 8 bits, the reliability in the descrambling circuit operation improves.

<Feature of the Embodiment of FIG. 31>

If the descrambling circuit 58 has a feedback loop with respect to the input data, when an error arises in the input data for some reason (effects such defects in the information storage medium 21/22 and/or as dust or scratches at the medium surface), the error is propagated in processing thereafter by the circulating processing operation of the feedback loop. However, if no feedback loop is provided, even if an error is included in the input data, the place of the error is not fed-back (circulated), and will extinguish as is from the shift register circuit 91 after passing through the shift register circuit 91. Namely, by using a circuit structure not having a feedback loop, the characteristic that an error does not propagate for greater than or equal to the number of bits of the shift register circuit 91 (an error propagation suppressing characteristic) is obtained.

As described above, in accordance with the embodiment of the present invention, an improvement in the data format (recording data format) recorded on an information storage medium, or an improvement in the recording method or the reproduction method recording information onto an information storage medium, and an improvement in an information reproduction apparatus or an information recording and reproduction apparatus, are achieved, and simplification relating to positional detection of a synchronization code is aimed for, and reliability of detection of a synchronization code can be improved.

As examples in which the present invention is effective, the present invention is effective as a technique for ensuring compatibility between next-generation DVD formats, next-generation DVD-ROM recording formats, next-generation DVD-R, DVD-RW formats, next-generation DVD-ROM and DVD-R, DVD-RW or DVD-RAM. Further, the present invention can also be applied to communications equipment using the above-described data structure.

What is claimed is:

1. An information recording medium comprising:
a wobble groove including a general wobble pattern area and a specific wobble pattern area,
the recording medium configured to record recording data on the wobble groove by modulating the recording data into modulated data by a modulation method in which the recording data of m bits is converted into n channel bits and the number of continuous "0"s is 1 (at minimum) and forming recording marks according to the modulated data in the general wobble pattern area and the specific wobble pattern area of the wobble groove, the recording data forming error correction blocks,
wherein an intermediate data is placed between at least a part of the error correction blocks and at least another part of the error correction blocks, the intermediate data includes a post amble, the post amble and the part of the error correction blocks forms a unit of the recording data,
wherein
an end position of the general wobble pattern area is positioned in the unit of the recording data, and
the specific wobble pattern area records a specific wobble pattern used for locating a recording head position of a next unit of recording data, the specific wobble pattern differing from a general wobble pattern recorded in the general wobble pattern area.

2. The medium according to claim 1, wherein the specific wobble pattern area further records a constant wobble pattern which is a repetition of predetermined wobble patterns and recorded at the back of the specific wobble pattern.

3. The medium according to claim 2, wherein the error correction blocks are divided into user data units including sectors, and
the intermediate data is placed between two units of the user data.

4. The medium according to claim 2, wherein the error correction blocks include sectors and the post amble includes a synch code indicating a specific sector in the error correction block.

5. An information recording method for an information storage medium comprising a wobble groove including a general wobble pattern area and a specific wobble pattern area, the storage medium configured to record recording data on the wobble groove by modulating the recording data into modulated data by a modulation method in which the recording data of m bits is converted into n channel bits and the number of continuous "0"s is 1 (at minimum) and forming recording marks according to the modulated data in the general wobble pattern area and the specific wobble pattern area of the wobble groove, the recording data forming error correction blocks, wherein an intermediate data is placed between at least a part of the error correction blocks and at least another part of the error correction blocks, the intermediate data includes a post amble, the post amble and the part of the error correction blocks forms a unit of the recording data, wherein an end position of the general wobble pattern area is positioned in the unit of the recording data, and the specific wobble pattern area records a specific wobble pattern used for locating a recording head position of a next unit of recording data, the specific wobble pattern differing from a general wobble pattern recorded in the general wobble pattern area, the method comprising:

recording a part of the unit of recording data on the specific wobble pattern area.

6. The medium according to claim 5, wherein the specific wobble pattern area further records a constant wobble pattern which is a repetition of predetermined wobble patterns and recorded at the back of the specific wobble pattern.

7. The method according to claim 6, wherein the error correction blocks are divided into user data units including sectors, and the intermediate data is placed between two units of the user data.

8. The method according to claim 6, wherein the error correction blocks include sectors and the post amble includes a synch code indicating a specific sector in the error correction block.

9. An information reproducing method for an information storage medium including a wobble groove including a general wobble pattern area and a specific wobble pattern area, the storage medium configured to record recording data on the wobble groove by modulating the recording data into modulated data by a modulation method in which the recording data of m bits is converted into n channel bits and the number of continuous "0"s is 1 (at minimum) and forming recording marks according to the modulated data in the general wobble pattern area and the specific wobble pattern area of the wobble groove, the recording data forming error correction blocks, wherein an intermediate data is placed between at least a part of the error correction blocks and at least another part of the error correction blocks, the intermediate data includes a post amble, the post amble and the part of the error correction blocks forms a unit of the recording data, wherein an end position of the general wobble pattern area is positioned in the unit of the recording data, and the specific wobble pattern area records a specific wobble pattern used for locating a recording head position of a next unit of recording data, the specific wobble pattern differing from a general wobble pattern recorded in the general wobble pattern area, the method comprising:

reproducing the specific wobble pattern; and positioning a recording head position of a next unit of recording data based on the specific wobble pattern recorded in the specific wobble pattern area.

10. The method according to claim 6, wherein the error correction blocks are divided into user data units including sectors, and the intermediate data is placed between two units of the user data.

11. The method according to claim 6, wherein the error correction blocks include sectors and the post amble includes a synch code indicating a specific sector in the error correction block.

12. The medium according to claim 2, wherein the general wobble pattern area is adjacent the specific wobble pattern area such that the end portion of the unit of the recording data is recorded on the specific wobble pattern area that is used for locating the recording head position of the next recording data unit.

13. The medium according to claim 9, wherein the specific wobble pattern area further records a constant wobble pattern which is a repetition of predetermined wobble patterns and recorded at the back of the specific wobble pattern.

* * * * *